US005643711A

United States Patent [19]

Takada et al.

[11] Patent Number: 5,643,711

[45] Date of Patent: Jul. 1, 1997

[54] SILVER HALIDE PHOTOGRAPHIC LIGHT-SENSITIVE MATERIAL

[75] Inventors: Shunji Takada; Yoichi Suga; Hiroyuki Kawamoto, all of Minami-Ashigara, Japan

[73] Assignee: Fuji Photo Film Co., Ltd., Kanagawa, Japan

[21] Appl. No.: 179,571

[22] Filed: Jan. 10, 1994

Related U.S. Application Data

[63] Continuation of Ser. No. 780,341, Oct. 22, 1991, abandoned.

[30] Foreign Application Priority Data

Oct. 23, 1990 [JP] Japan .................................... 2-284771
Nov. 5, 1990 [JP] Japan .................................... 2-299659

[51] Int. Cl.[6] ............................. C03C 1/035; C03C 1/34

[52] U.S. Cl. ......................... 430/546; 430/551; 430/566; 430/567; 430/570; 430/607; 430/963

[58] Field of Search .................................... 430/566, 567, 430/570, 594, 607, 963, 546, 551

[56] References Cited

U.S. PATENT DOCUMENTS

| | | | |
|---|---|---|---|
| 3,930,863 | 1/1976 | Shiba et al. | 430/361 |
| 4,845,020 | 7/1989 | Itoh et al. | 430/445 |
| 5,028,520 | 7/1991 | Ito | 430/567 |
| 5,283,161 | 2/1994 | Toya et al. | 430/566 |

FOREIGN PATENT DOCUMENTS

| | | | |
|---|---|---|---|
| 0358187 | 3/1990 | European Pat. Off. | G03C 1/053 |
| 0452772 | 10/1991 | European Pat. Off. | G03C 1/34 |
| 130283 | 3/1978 | Germany | 430/607 |
| 2089056 | 6/1982 | United Kingdom | G03C 1/06 |

OTHER PUBLICATIONS

Meier, H. Spectral Sensitization, Focal Press Limited, 1968, p. 74.

Research Disclosure No. 308119, Dec. 1989, pp. 993–998.

*Primary Examiner*—Janet C. Baxter

*Attorney, Agent, or Firm*—Sughrue, Mion, Zinn, Macpeak & Seas

[57] ABSTRACT

A silver halide photographic light-sensitive material having at least one light-sensitive silver halide emulsion layer on a support is disclosed. The light-sensitive silver halide emulsion layer contains tabular silver halide grains having an average aspect ratio of 2 or more and contains a compound represented by the following formula (I) and/or the oxidized product thereof:

$$X_1—A—X_2 \qquad \text{Formula (I)}$$

wherein $X_1$ and $X_2$ each represent $OR_1$ or

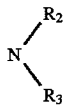

wherein $R_1$ represents a hydrogen atom or a group capable of being converted to a hydrogen atom upon hydrolysis, and $R_2$ and $R_3$ each represent hydrogen, alkyl, aryl, heterocyclic, heterocyclic sulfonyl, heterocyclic carbonyl, sulfamoyl, or carbamoyl, A represents arylene, and at least one of the groups representative of $X_1$, $X_2$, and A is substituted by a group which accelerates adsorption to a silver halide grain.

14 Claims, No Drawings

SILVER HALIDE PHOTOGRAPHIC LIGHT-SENSITIVE MATERIAL

This is a continuation of application Ser. No. 07/780,341, filed Oct. 22, 1991 abandoned.

BACKGROUND OF THE INVENTION

1. Field of the Invention

The present invention relates to a photographic light-sensitive material having an improved resistance to pressure and, more particularly, to a silver halide photographic light-sensitive material which contains tabular silver halide grains having an average aspect ratio of 2 or more, a light-sensitive material containing silver halide grains having a grain surface containing 2 mol % or more of silver iodide, and a color photographic light-sensitive material containing regular crystal grains.

2. Description of the Related Art

Generally, various pressures are applied to a photographic light-sensitive material coated with a silver halide emulsion. For example, a photographic negative film for general purposes is taken up by a patrone, bent when loaded in a camera, or pulled upon winding up of a frame.

On the other hand, a sheet-like film such as a printing light-sensitive material or a direct medical roentgen light-sensitive material is often bent because it is directly handled by human hands.

In addition, all kinds of light-sensitive materials are subjected to a high pressure when cut or processed.

When various pressures are applied to a photographic light-sensitive material as described above, silver halide grains are pressurized via gelatin as a carrier (binder) of the silver halide grains or a plastic film as a support. It is known that photographic properties of a photographic light-sensitive material are changed when a pressure is applied to silver halide grains, as reported in detail in, e.g., K. B. Mather, J. Opt. Soc. Am., 38. 1054 (1984); P. Faelens and P. de Smet. Sci. et. Ind Phot., 25. No. 5. 178 (1954); and P. Faelens. J. Phot. Sci. 2. 105 (1954).

Recently, a strict demand has arisen for a photographic silver halide emulsion, i.e., a demand has arisen for higher levels of toughness such as storage stability and a resistance to pressure in addition to photographic properties such as sensitivity and image quality such as graininess and sharpness. However, it is obvious that pressure marks are enlarged as the sensitivity is increased. Therefore, an emulsion having high sensitivity with less pressure marks is desired. JP-A-63-220228 ("JP-A" means Unexamined Published Japanese Patent Application) discloses tabular grains having improved exposure intensity dependency, storage stability, and a resistance to pressure. However, an improvement in pressure marks caused by scratching in a camera or scratching by a nail is unsatisfactory.

According to the extensive studies made by the present inventors, it is found that fog caused upon application of a pressure to the light-sensitive material is increased if a sensitizing dye is adsorbed on silver halide grains. This phenomenon significantly occurs in tabular grains having large specific surface areas. In order to prevent desorption (especially at a high humidity) of a sensitizing dye from silver halide grains in the light-sensitive material, adsorption of the sensitizing dye is sometimes performed at a high temperature (50° C. or more). However, this operation increases pressure marks, too. In addition, although a method of performing adsorption of a sensitizing dye before chemical sensitization is available as a method of increasing sensitivity, this method also increases pressure marks.

JP-A-2-285346 discloses an improvement in resistance to pressure of a silver halide photographic light-sensitive material containing tabular grains, by hydroquinones. Since, however, the hydroquinones do not have any adsorption group to silver halide grains, they are precipitated on the surface of the light-sensitive material when the material is stored at a high humidity.

To increase the sensitivity and to improve the image quality by the sensitivity increasing technique are central subjects of silver salt photography. Efforts have been made to realize high sensitivity and high image quality by selecting a halogen composition near the grain surface to improve the spectral sensitization sensitivity, by using a thiocyanic acid compound to further improve the spectral sensitization sensitivity, by executing reduction sensitization for silver halide grains to prevent recombination, by using regular crystal grains to obtain a high contrast image, and by combining these techniques. Since, however, each of these techniques has a drawback of enlarging pressure marks, it is difficult to satisfactorily achieve the effects of the techniques in practical applications.

SUMMARY OF THE INVENTION

It is an object of the present invention to provide a light-sensitive material, having high sensitivity and an improved resistance to pressure.

The present inventors have made extensive studies and achieved the above object of the present invention by the following means.

(1) A silver halide photographic light-sensitive material having at least one light-sensitive silver halide emulsion layer on a support, wherein the light-sensitive emulsion layer contains tabular silver halide grains having an average aspect ratio of 2 or more and contains a compound represented by the following formula (I) and/or the oxidized product thereof:

$$X_1—A—X_2 \qquad \text{Formula (I)}$$

(wherein $X_1$ and $X_2$ each represent $OR_1$ or

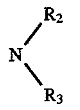

(wherein $R_1$ represents a hydrogen atom or a group capable of being a hydrogen atom by hydrolysis, and $R_2$ and $R_3$ each represent hydrogen, alkyl, aryl, heterocyclic, heterocyclic sulfonyl, heterocyclic carbonyl, sulfamoyl, or carbamoyl, A represents arylene, and in at least one of $X_1$, $X_2$, and A the hydrogen atom contained therein is substituted by an adsorption accelerating group to a silver halide grain.

(2) The silver halide photographic material according to item 1, wherein the tabular silver halide emulsion having an aspect ratio of 2 or more has been subjected to spectral sensitization using 40% or more of the saturated adsorption quantity of a sensitizing dye.

(3) A silver halide photographic light-sensitive material having at least one silver halide emulsion layer on a support, wherein at least one of the light-sensitive emulsion layers contains silver halide grains each having a grain surface containing 2 mol % or more of silver iodide, and at least one of the light-sensitive emulsion layers contains a compound represented by the following formula (I) and/or the oxidized product thereof:

$X_1$—A—$X_2$ Formula (I)

wherein each of $X_1$ and $X_2$ independently represents $OR_1$ or

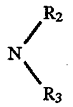

wherein $R_1$ represents a hydrogen atom or a group capable of being a hydrogen atom by hydrolysis, and each of $R_2$ and $R_3$ independently represents hydrogen, alkyl, aryl, heterocyclic, heterocyclic sulfonyl, heterocyclic carbonyl, sulfamoyl, or carbamoyl, A represents arylene, and in at least one of $X_1$, $X_2$, and A the hydrogen atom contained therein is substituted by an adsorption accelerating group to a silver halide grain.

(4) The silver halide photographic light-sensitive material described in item (3) above, wherein the light-sensitive material contains $3\times10^{-5}$ mol or more of a thiocyanic acid compound per mol of a silver halide.

(5) The silver halide photographic light-sensitive material described in item (3) above, wherein the emulsion grains are subjected to reduction sensitization.

(6) A silver halide color photographic light-sensitive material having at least one silver halide emulsion layer on a support, wherein at least one of the light-sensitive emulsion layers contains regular crystal grains, and at least one of the light-sensitive emulsion layers contains a compound represented by the following formula (I) and/or the oxidized product thereof:

$X_1$—A—$X_2$ Formula (I)

wherein each of $X_1$ and $X_2$ independently represents $OR_1$ or

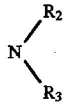

wherein $R_1$ represents a hydrogen atom or a group capable of being a hydrogen atom by hydrolysis, and each of $R_2$ and $R_3$ independently represents hydrogen, alkyl, aryl, heterocyclic, heterocyclic sulfonyl, heterocyclic carbonyl, sulfamoyl, or carbamoyl, A represents arylene, and in at least one of $X_1$, $X_2$, and A the hydrogen atom contained therein is substituted by an adsorption accelerating group to a silver halide grain.

(7) The silver halide photographic light-sensitive material described in item (6) above, wherein the light-sensitive material contains $3\times10^{-5}$ mol or more of a thiocyanic acid compound per mol of a silver halide.

(8) The silver halide photographic light-sensitive material described in item (6) above, wherein the emulsion grains are subjected to reduction sensitization.

(9) The silver halide color photographic light-sensitive material described in item (6) above, wherein a variation coefficient of a volume-equivalent sphere diameter of the emulsion grains is 20% or less.

The compound represented by formula (I) used in the present invention will be described below.

$X_1$—A—$X_2$ Formula (I)

wherein each of $X_1$ and $X_2$ independently represents $OR_1$ or

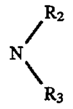

wherein $R_1$ represents a hydrogen atom or a group capable of being a hydrogen atom by hydrolysis under alkaline development condition, and each of $R_2$ and $R_3$ independently represents hydrogen, alkyl, aryl, heterocyclic, heterocyclic sulfonyl, heterocyclic carbonyl, sulfamoyl, or carbamoyl. Preferably, $R_2$ and $R_3$ represent hydrogen, alkyl, aryl, heterocyclic, sulfamoyl and carbamoyl. A represents arylene, and in at least one of $X_1$, $X_2$, and A the hydrogen atom contained therein is substituted by an adsorption accelerating group to a silver halide grain.

In formula (I), A represents a substituted or nonsubstituted arylene group (e.g., phenylene or naphthylene). Examples of the substituting group of A are halogen (e.g., fluorine, chlorine, and bromine), alkyl (preferably, alkyl having 1 to 20 carbon atoms), aryl (preferably, aryl having 6 to 20 carbon atoms), alkoxy (preferably, alkoxy having 1 to 20 carbon atoms), aryloxy preferably, aryloxy having 6 to 20 carbon atoms), alkylthio (preferably, alkylthio having 1 to 20 carbon atoms), arylthio (preferably, arylthio having 6 to 20 carbon atoms), acyl (preferably, acyl having 2 to 20 carbon atoms), acylamino (preferably, alkanoylamino having 1 to 20 carbon atoms and benzoylamino having 6 to 20 carbon atoms), nitro, cyano, oxycarbonyl (preferably, alkoxycarbonyl having 1 to 20 carbon atoms and aryloxycarbonyl having 6 to 20 carbon atoms), carboxy, sulfo, hydroxy, ureido (preferably, alkylureido having 1 to 20 carbon atoms and arylureido having 6 to 20 carbon atoms), sulfonamido (preferably, alkylsulfonamido having 1 to 20 carbon atoms and arylsulfonamido having 6 to 20 carbon atoms), sulfamoyl (preferably, alkylsulfamoyl having 1 to 20 carbon atoms and arylsulfamoyl having 6 to 20 carbon atoms), carbamoyl (preferably, alkylcarbamoyl having 1 to 20 carbon atoms and arylcarbamoyl having 6 to 20 carbon atoms), acyloxy (preferably, acyloxy having 1 to 20 carbon atoms), amino (nonsubstituted amino, and preferably, a secondary or tertiary amino group substituted by alkyl having 1 to 20 carbon atoms or aryl having 6 to 20 carbon atoms), a carbonate group (preferably, alkyl carbonate having 1 to 20 carbon atoms and aryl carbonate having 6 to 20 carbon atoms), sulfonyl (preferably, alkylsulfonyl having 1 to 20 carbon atoms and arylsulfonyl having 6 to 20 carbon atoms), sulfinyl (preferably, alkylsulfinyl having 1 to 20 carbon atoms, arylsulfinyl having 6 to 20 carbon atoms), and heterocyclic (pyridine, imidazole, and furan).

If two or more substituting groups are present, they may be the same or different. If two substituting groups are substituted on neighboring carbon atoms of a benzene ring, they may be coupled to form a 5- to 7-membered carbon ring or heterocyclic ring, and these rings may be saturated or nonsaturated.

Examples of the ring forming compound are cyclopenfane, cyclohexane, cycloheptane, cyclopentene, cyclohexadiene, cycloheptadiene, indane, norbornane, norbornene, benzene, and pyridine. These compounds may further have their substituting groups.

The total number of carbon atoms of the substituting group is preferably 1 to 20, and more preferably, 1 to 10.

Examples of the group represented by $R_1$ capable of being a hydrogen atom by hydrolysis are —$COR_4$ (wherein $R_4$ represents substituted or nonsubstituted alkyl, substituted or nonsubstituted aryl, and substituted or nonsubstituted amino) and

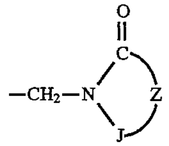

(wherein J represents

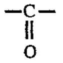

or $-SO_2-$ and Z represents a plurality of atoms required to form a heterocyclic ring having at least one 5- or 6-membered ring).

$R_2$ and $R_3$ independently represent a hydrogen, substituted or nonsubstituted alkyl, substituted or non-substituted aryl, substituted or nonsubstituted heterocyclic, substituted or nonsubstituted heterocyclic sulfonyl, substituted or nonsubstituted heterocyclic carbonyl, substituted or nonsubstituted sulfamoyl, and substituted or nonsubstituted carbamoyl. $R_2$ and $R_3$ may be the same or different and may be coupled to form a nitrogen-containing heterocyclic ring (e.g., morpholino, piperidino, pyrrolidino, imidazolyl, and piperadino). preferably, $R_2$ and $R_3$ represent hydrogen, substituted or nonsubstituted alkyl, substituted or nonsubstituted aryl, substituted ornonsubstituted heterocyclic, substituted or nonsubstituted sulfamoyl and substituted or nonsubstituted carbamoyl. Examples of the substituting group of $R_2$ and $R_3$ are the same as those enumerated above as the substituting groups of A.

The absorption accelerating group to a silver halide is represented by the following formula:

$$Y\text{-}(L)_m\text{-}$$

wherein Y represents the adsorption accelerating group to a silver halide, L represents a divalent coupling group, and m represents 0 or 1. Preferable examples of the adsorption accelerating group to a silver halide represented by Y are a thioamido group, a mercapto group, a group having a disulfide bond, and a 5- or 6-membered nitrogen-containing heterocyclic group. These heterocyclic group may be a part of a sensitizing dye.

The thioamido adsorption accelerating group represented by Y is a divalent group represented by

which may be a part of a cyclic structure or an acyclic thioamido group. A useful thioamido adsorption accelerating group can be selected from those disclosed in, e.g., U.S. Pat. Nos. 4,030,925, 4,031,127, 4,080,207, 4,245,037, 4,255,511, 4,266,013, and 4,276,364, and "Research Disclosure" Vol. 151, No. 15162 (November, 1976) and Vol. 176, No. 17626 (December, 1978).

Examples of the acyclic thioamido group are a thioureido group, a thiourethane group, and a dithiocarbamate group, and examples of the cyclic thioamido group are 4-thiazoline-2-thione, 4-imidazoline-2-thione, 2-thiohydantoin, rhodanine, thiobarbituric acid, tetrazoline-5-thione, 1,2,4-triazoline-3-thione, 1,3,4-thiadiazoline-2-thione, 1,3,4-oxadiazoline-2-thione, benzimidazoline-2-thione, benzoxazoline-2-thione, and benzothiazoline-2-thione. These groups may further have their substituting groups.

Examples of the mercapto group of Y are aliphatic mercapto, aromatic mercapto, and heterocyclic mercapto (if a nitrogen atom is present adjacent to a carbon atom to which an —SH group is bonded, the heterocyclic mercapto group is the same as a cyclic thioamido group which is a tautomer of the heterocyclic mercapto group, and examples of the cyclic thioamido group are the same as those enumerated above).

An example of the 5- or 6-membered nitrogen-containing heterocyclic group is a 5- or 6-membered nitrogen-containing heterocyclic ring consisting of a combination of nitrogen, oxygen, sulfur, and carbon. Preferable examples of the heterocyclic ring are benzotriazole, triazole, tetrazole, indazole, benzmindazole, imidazole, benzothiazole, thiazole, benzoxazole, oxazole, thiadiazole, oxadiazole, and triazine. These rings may be further substituted by proper substituting groups such as atoms required to form a sensitizing dye.

The sensitizing dye can be selected from those described in F. M. Hamer, "Heterocyclic Compounds—Cyanine dyes and related compounds", John Wiley & Sons, Newyork, London, 1964.

Examples of the substituting groups are the same as those enumerated above as the substituting groups of $R_2$, $R_3$, and $R_4$.

Of the groups represented by Y, preferable examples are a cyclic thioamido group (i.e., a mercapto-substituted nitrogen-containing heterocyclic ring such as a 2-mercaptothiadiazole group, a 3-mercapto-1,2,4-triazole group, a 5-mercaptotetrazole group, a 2-mercapto-1,3,4-oxadiazole group, and a 2-mercaptobenzoxazole group) and a nitrogen-containing heterocyclic group (e.g., a benzotriazole group, a benzimidazole group, and an indazole group).

In $X_1$, $X_2$, and A, two or more $Y-(L)_m-$ groups may be substituted, and they may be the same or different.

An example of the divalent coupling group represented by L is an atom or an atom group containing at least one of C, N, S, and O. More specifically, examples of the group are alkylene, alkenylene, alkinylene, arylene, —O—, —S—, —NH—, —N=, —CO—, and $-SO_2-$ (these groups may have substituting groups), and combinations thereof.

Examples are $-CONH-$, $-NHCONH-$, $SO_2NH-$, $-COO-$, $-NHCOO-$, 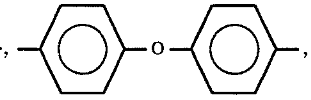 ,

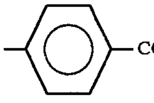 $CONHCH_2CH_2-$, $-CH_2-$, $-(CH_2)_2-$, $-(CH_2)_3-$, 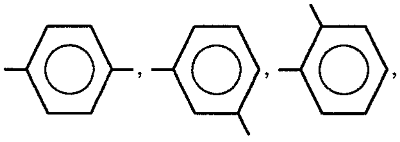 ,

-continued

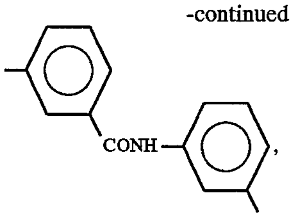,

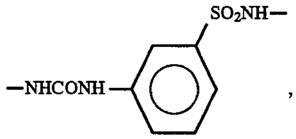,

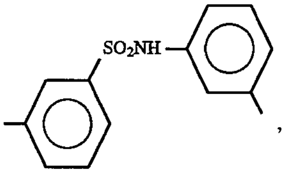,

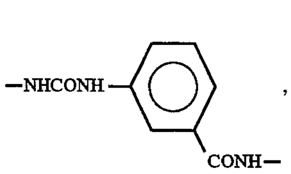, 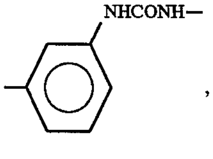,

—NHCONHCH$_2$CH$_2$CONH—, 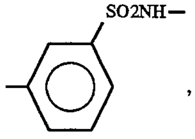,

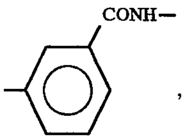, —CH$_2$CH$_2$SO$_2$NH—, and

—CH$_2$CH$_2$CONH—.

These groups may be further substituted by proper substituting groups. Examples of the substituting group are those enumerated above as the substituting groups of A. A preferable example of a compound represented by formula (I) is a compound represented by formula (II):

Formula (II)

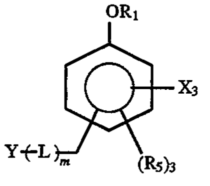

wherein each of $R_1$, Y, L, and m has the same meaning as defined in formula (I), $X_3$ has the same meaning as $X_1$ and $X_2$ in formula (I), and $R_5$ represents a hydrogen atom or a group capable of substituting a hydrogen atom on a benzene nucleus. Examples of the substitutable group are those enumerated above as the substituting groups of A. Three of $R_5$ may be the same or different.

$X_3$ preferably substitutes an ortho position or a para position of the —$OR_1$ group. —$OR_1$ is most preferable of those represented by X, and a hydrogen atom is more preferable as $R_1$.

The compounds represented by formula (I) may contain the oxdized product thereof, or consist the oxidized product thereof. Generally, the compounds represented by formula (I) is seemed to contain the oxidized product thereof by air oxidation and the like.

In the present invention, when the compound of formula (I) represents hydroquinones, the oxidized product thereof means corresponding p-quinones, and when the compound represents catechols, the oxidized product thereof means corresponding o-quinones.

Although preferable examples of a compound represented by formula (I) will be listed in Table A to be presented later, the present invention is not limited to these examples.

A representative example of a method of synthesizing a compound represented by formula (I) will be described below by way of its synthesis examples.

Synthesis Example Synthesis of Compound I-11

23.8 g (0.1 mol) of 5-phenylbenztriazolecarbonate, 25.2 g (0.11 mol) of 2-(4-aminophenyl)ethylhydroquinone, and 100 ml of DMAC were stirred at 120° C. (external temperature) for five hours in an oil bath under a nitrogen stream. Subsequently, DMAC was distilled off at a reduced pressure, and 200 ml of methanol were added. As a result, a small amount of a by-product consisting of black crystals remained as an insoluble matter. The insoluble matter was filtered out by suction filtration, and methanol was distilled off at a reduced pressure. The resultant reaction mixture was isolated and purified through a silica gel column (chloroform/methanol=4/1), and washed with methanol, thereby obtaining a target compound I-11. The yield was 14.4 (38.5%), and the melting point was 256° C. to 257° C.

A compound represented by formula (I) is added in an amount of preferably $1\times10^{-7}$ mol to $1\times10^{-2}$ mol, and most preferably, $1\times10^{-6}$ mol to $5\times10^{-3}$ mol per mol of a silver halide in all layers of a light-sensitive material.

A compound represented by formula (I) can be added to a hydrophilic colloid solution, and preferably, a silver halide emulsion solution.

When the compound is to be added to the silver halide emulsion solution, it can be added at an arbitrary timing from before the start of chemical sensitization to coating.

In the present invention, a "tabular grain" is a general term of grains having one twinning crystal face or two or more parallel twinning crystal faces. When all ions at lattice points on two sides of a (111) face have a mirror image relationship, this (111) face is a twinning crystal face. When this tabular grain is viewed from the above, its shape is a triangle, a hexagon, or a circular triangle or hexagon. The triangular, hexagonal, and circular grains have parallel triangular, hexagonal, and circular outer surfaces, respectively.

An average aspect ratio of the tabular grains is preferably 2 or more, more preferably, 3 or more, and most preferably, 4 or more. The upper limit of the average aspect ratio is preferably 8.

In the present invention, the average aspect ratio of tabular grains is an average value of values obtained by dividing grain diameters of tabular grains, each having an equivalent-circle diameter of a projected area of 0.1 μm or more, by the respective grain thicknesses. Measurement of the grain thickness can be easily performed as follows. That is, a metal is obliquely deposited together with a latex as a reference on a grain, the length of its shadow is measured on an electron micrograph, and the grain thickness is calculated with reference to the length of the shadow of the latex.

In the present invention, the grain size is a diameter of a circle having an area equal to a projected area of parallel outer surfaces of a grain.

The projected area of a grain can be obtained by measuring an area on an electron micrograph and correcting a photographing magnification.

The diameter of a tabular grain is preferably 0.15 to 5.0 μm, and its thickness is preferably 0.05 to 1.0 μm.

The size distribution of tabular grains is preferably monodisperse (in which a variation coefficient defined by the following equation is 20% or less) though it may be polydisperse.

$$\text{variation coefficient} = \frac{\text{standard deviation of grain size}}{\text{average grain size}} \times 100$$

A ratio of the tabular grains in an emulsion is preferably 30% or more, more preferably, 50% or more, and most preferably, 80% or more of the total projected area of all silver halide grains in the emulsion.

The tabular grain of the present invention may have a layered structure essentially having at least two different iodide compositions or chloride compositions in a silver halide grain or may have a homogeneous composition.

For example, an emulsion having a layered structure with different iodide compositions may be an emulsion containing a high iodide layer in the core portion and a low iodide layer in the outermost layer or an emulsion containing a low iodide layer in the core portion and a high iodide layer in the outermost layer. The layered structure may be constituted by three or more layers.

The tabular emulsion of the present invention can be prepared by the following precipitate formation method. That is, a dispersion medium is poured in a conventional silver halide precipitate formation reactor having a stirring mechanism. An amount of the dispersion medium poured in the reactor in the initial stage is normally at least about 10%, and preferably, 20% to 80% of an amount of the dispersion medium present in an emulsion in the final grain precipitate formation stage. The dispersion medium initially poured in the reactor is water or a dispersion medium of a deflocculant in water. This dispersion medium is mixed with another component, e.g., one or two or more silver halide ripening agents and/or a metal doping agent (to be described later) if necessary. When a deflocculant is to be initially poured, the concentration of the deflocculant is preferably at least 10%, and most preferably, at least 20% of the total deflocculant amount present in the final stage of the silver halide precipitate formation. An additional dispersion medium added together with silver and halide salt to the reactor can be supplied from another jet. Generally, in order to increase the ratio of the deflocculant, the ratio of the dispersion medium is adjusted after the supply of halide salt is completed.

Less than 10 wt % of bromide salt used in formation of silver halide grains are generally poured in the reactor in the initial stage to adjust the bromide ion concentration in the dispersion medium at the start of the silver halide precipitate formation. In addition, the dispersion medium in the reactor does not essentially contain iodine ions in the initial stage because thick nontabular grains are easily formed if iodine ions are present before silver, bromide salt, and chloride salt are simultaneously added. In this case, "does not essentially contain iodine ions" means that iodine ions are present in only an unsatisfactory amount, as compared with bromide ions, by which they cannot be precipitated as an independent silver iodide phase (β-AgI or γ-AgI). The iodide concentration in the reactor before silver salt is supplied is preferably kept at less than 0.5 mol % of the total halide ion concentration in the reactor. If the pBr of the dispersion medium is initially too high, the thickness of formed tabular grains is comparatively increased, and the thickness distribution of the grains is widened. In addition, an amount of nontabular grains is increased. If the pBr is too low, nontabular grains are easily formed. The pBr is defined as a negative value of a logarithm of the bromide ion concentration.

During precipitate formation, silver salt, bromide salt, chloride salt, and iodide salt are added to the reactor in accordance with a conventional method of the precipitate formation of silver halide grains. Generally, an aqueous solution of soluble silver salt such as silver nitrate is supplied in the reactor simultaneous with supply of bromide salt, chloride salt, and iodide salt. Bromide salt, chloride salt, and iodide salt are supplied as an aqueous salt solution such as an aqueous solution of soluble ammonium, an alkaline metal (e.g., sodium or potassium), an alkaline earth metal (e.g., magnesium or calcium), or halide salt. Silver salt is supplied in the reactor independently of bromide salt, chloride salt, and iodide salt at least in the initial stage. Bromide salt, chloride salt, and iodide salt may be added either independently or as a mixture.

When silver salt is supplied in the reactor, a grain nucleus formation step is started. When the supply of silver, bromide salt, chloride salt, and iodide salt is continued, a group of grain nuclei useful as precipitate formation positions of silver iodide is formed. A grain growth step is started by the precipitate formation of silver bromide, silver chloride, and silver iodide on existing grain nuclei. Although a method described in JP-A-63-11928 can be referred to as the nucleus formation conditions, the present invention is not limited to this method. For example, the nucleus formation temperature may be 5° C. to 55° C.

The size distribution of tabular grains formed in accordance with the present invention is largely affected by the concentrations of bromide salt, chloride salt, and iodide salt in the growth step. If the pBr is too low, tabular grains having high aspect ratios are formed, but a variation coefficient of a projected area of the grains is very large. Tabular grains having a small variation coefficient of a projected area can be formed by maintaining the pBr between about 2.2 to 5.

Provided that the above pBr condition is satisfied, the concentrations and the supply rates of silver salt, bromide salt, chloride salt, and iodide salt may be the same as those conventionally used. Although silver salt and halide salt are preferably supplied at a concentration of 0.1 to 5 mol per liter, a concentration range wider than those conventionally used, e.g., a range of 0.01 per liter to saturation can be adopted. In the most preferable precipitate forming method, the supply rates of silver and halide salt are increased to shorten a precipitate formation time. The supply rates of silver salt and halide salt can be increased by increasing the rates of supplying the dispersion medium, silver salt, and halide salt, or by increasing the concentrations of silver salt and halide salt in the dispersion medium to be supplied. The variation coefficient of a projected area of grains can be further decreased by maintaining the addition rates of silver salt and halide salt close to a critical value for causing formation of new grain nuclei as described in JP-A-55-142329.

A gelatin amount in the reactor during the nucleus formation has an extreme effect on the grain size distribution. The gelatin concentration is preferably 0.5 to 10 wt %, and more preferably, 0.5 to 6 wt %.

The rotation rate of stirring and the reactor shape also have effects on the grain size distribution.

A stirring/mixing apparatus is preferably an apparatus for adding and mixing a reaction solution in a solution, as described in U.S. Pat. No. 3,785,777, and the rotation rate of stirring must not be too low or too high. If the rotation rate of stirring is too low, the formation ratio of nonparallel twinned crystal grains is increased. If the rotation rate of stirring is too high, the formation frequency of tabular grains is decreased, and the size distribution is widened.

The reactor most preferably has a semispherical bottom portion.

The tabular emulsion of the present invention may contain dislocations. As a method of forming dislocations, methods described in JP-A-63-220228 and Japanese patent application No. 1-314201 can be used.

The silver halide emulsion of the present invention may contain, in the tabular silver halide grain formation or physical ripening process, cadmium salt, zinc salt, thallium salt, iridium salt or its complex salt, rhodium salt or its complex salt, iron salt or iron complex salt as a metal doping agent.

Although the silver halide tabular emulsion of the present invention is normally spectrally sensitized, it is preferably spectrally sensitized before it is used.

A methine dye is normally used as a spectral sensitizing dye for use in the spectral sensitization of the silver halide tabular emulsion of the present invention. The methine dye includes a cyanine dye, a merocyanine dye, a composite dye, a composite merocyanine dye, a holopolar cyanine dye, a hemicyanine dye, a styryl dye, and a hemioxonol dye. In these dyes, any nucleus normally used as a basic heterocyclic nucleus in cyanine dyes can be used. Examples of the nucleus are a pyrroline nucleus, an oxazoline nucleus, a thiozoline nucleus, a pyrrole nucleus, an oxazole nucleus, a thiazole nucleus, a selenazole nucleus, an imidazole nucleus, a tetrazole nucleus, and a pyridine nucleus; a nucleus obtained by fusing an alicyclic hydrocarbon ring to each of the above nuclei; and a nucleus obtained by fusing an aromatic hydrocarbon ring to each of the above nuclei, e.g., an indolenine nucleus, a benzindolenine nucleus, an indole nucleus, a benzoxadole nucleus, a naphthooxadole nucleus, a benzothiazole nucleus, a naphthothiazole nucleus, a benzoselenazole nucleus, a benzimidazole nucleus, and a quinoline nucleus. These nuclei may be substituted on a carbon atom.

In a merocyanine dye or composite merocyanine dye, a 5- or 6-membered heterocyclic nucleus, e.g., a pyrazoline-5-one nucleus, a thiohydantoin nucleus, a 2-thiooxazoline-2,4-dione nucleus, a thiazoline-2,4-dione nucleus, a rhodanine nucleus, or a thiobarbituric acid nucleus can be used as a nucleus having a keto-methylene structure.

In addition to the above sensitizing dyes, examples of the spectral sensitizing dye are described in, e.g., West German Patent 929,080, U.S. Pat. Nos. 2,493,748, 2,503,776, 2,519,001, 2,912,329, 3,656,959, 3,672,897, 3,694,217, 4,025,349, 4,046,572, 2,688,545, 2,977,229, 3,397,060, 3,522,052, 3,527,641, 3,617,293, 3,628,964, 3,666,480, 3,672,898, 3,679,428, 3,703,377, 3,814,609, 3,837,862, and 4,026,707, British Patents 1,242,588, 1,344,281, and 1,507,803, JP-B-44-14030 ("JP-B" means Examined Published Japanese Patent Application), JP-B-52-24844, JP-B-43-4936, JP-B-53-12375, JP-A-52-110618, JP-A-52-109925, and JP-A-50-80827.

The saturated adsorption quantity of the sensitizing dye can be calculated from an adsorption isotherm obtained by centrifugally separating an emulsion to which the dye is adsorbed.

An addition amount of the sensitizing dye is preferably 40% or more, more preferably, 40% to 120%, and most preferably, 70% to 100% of the saturated adsorption quantity.

The sensitizing dye can be added in the silver halide grain formation process or the chemical sensitization process, or during coating.

As a method of adding the sensitizing dye during silver halide emulsion grain formation, U.S. Pat. No. 4,225,666 and 4,828,972 and JP-A-61-103149 can be referred to. As a method of adding the sensitizing dye in the silver halide emulsion desalting step, EP 291,339-A and JP-A-64-52137 can be referred to. As a method of adding the sensitizing dye in the chemical sensitization step, JP-A-59-48756 can be referred to.

In addition to the sensitizing dye, a dye not having a spectral sensitizing effect or a substance essentially not absorbing visible light but exhibiting supersensitization may be added to the emulsion. Examples of the substance are an aminostyl compound substituted by a nitrogen-containing heterocyclic group (described in, e.g., U.S. Pat. Nos. 2,933,390 or 3,635,721), an aromatic organic acid formaldehyde condensate (described in, e.g., U.S. Pat. No. 3,743,510), cadmium salt, and an azaindene compound. Combinations described in U.S. Pat. Nos. 3,615,613, 3,615,641, 3,617,295, and 3,635,721 are most useful.

A tabular silver halide emulsion of the present invention is normally subjected to chemical sensitization. The chemical sensitization can be performed by, e.g., a method described in H. Frieser ed., "Die Grundlagen der Photographischen Prozesse mit Silverhalogeniden", 1968, PP. 675 to 734.

That is, the following methods can be used singly or in a combination thereof: a sulfur sensitizing method using a compound (e.g., thiosulfate, thioureas, mercapto compounds, or rhodanines) containing active gelatin or sulfur capable of reacting with silver; a reduction sensitizing method using a reducing substance (e.g., stannous chloride, amines, a hydrazine derivative, formamidinesulfinic acid, or a silane compound); and a noble metal sensitizing method using a noble metal compound (e.g., gold complex salt, or a complex salt of a metal of Group VIII of the periodic table such as Pt, Ir, or Pd).

The silver iodide content of the grain surface of the silver halide grain having a grain surface containing 2 mol % or more of silver halide of the present invention is preferably 2 mol % or more and 30 mol % or less.

In the preparation of silver halide grains having a surface containing 2 mol % or more of silver iodide, various conventional methods can be adopted as a method of controlling the silver iodide content near the surface of the grain. Examples of the method are: a method of adding an aqueous solution of water-soluble silver salt and an aqueous solution of a halide containing a water-soluble iodide to silver halide grains grown in the presence of protective colloid; a method of adding an aqueous solution of a halide containing a water-soluble iodide; and a method of adding an iodide, which is difficult to dissolve into water, such as silver iodide or silver iodobromide to perform ripening. Alternatively, silver halide grains containing an iodide may be physically ripened to distribute the iodide in the vicinity of the surfaces.

2 to 30 mol % of silver iodide contained in the surface of the silver halide grain of the present invention is preferably present as uniformly as possible on the surface in a (100)-face crystal and a (111)-face crystal. The grain preferably has a layered structure in which the entire surface of the grain is covered with a layer containing silver iodide. However, in a tetradecahedral grain having both (111) and (100) faces or a grain having both main and side faces such as a tabular grain, a structure in which only a specific face mainly contains silver iodide is also a preferable form of the present invention. That is, a case in which the surface of a grain is not entirely but partially covered with a layer containing silver iodide also belongs to the present invention.

In the formation of a layer having a surface containing 2 mol % or more of silver iodide, a spectral sensitizing dye such as cyanine or merocyanine or an antifoggant or stabilizer such as a mercapto compound, an azole compound, or an azaindene compound is preferably added. Similarly, addition of a silver halide solvent such as thiocyanic acid, thioether, or ammonia is also sometimes preferable.

The silver iodide content on the surface of the silver halide grain of the present invention can be detected by various surface element analyzing means. The use of XPS, Auger electron spectroscopy, or ISS is useful. XPS (X-ray Photoelectron Spectroscopy) is available as the simplest means having high precision, and the surface silver iodide content of the present invention is defined by a measurement value obtained by this method.

A depth which can be analyzed by the XPS (X-ray Photoelectron Spectroscopy) surface analyzing method is said to be about 10 Å.

The principle of the XPS method used in the analysis of the iodide content near the surface of the silver halide grain is described in Junichi Aihara et al., "Electron Spectroscopy", (Kyouritu Library 16, Kyouritu Shuppan, 1978).

In a standard measuring method of the XPS, Mg-Kα is used as excitation X-rays, and the intensity of photoelectrons (normally, I-$3d_{5/2}$ and Ag-$3d_{5/2}$) of each of iodine (I) and silver (Ag) released from silver halide grains in a proper sample form is measured.

To obtain the content of iodine, several types of standard samples, the iodine contents of which are known, are used to form a calibration curve of a photoelectron intensity ratio (intensity (I)/intensity (Ag)) between iodine (I) and silver (Ag), and the content is calculated from this calibration curve. In a silver halide emulsion, the XPS measurement must be performed after gelatin adsorbed on the surface of a silver halide grain is decomposed and removed by, e.g., a proteolytic enzyme.

A silver halide grain in which the grain surface contains 2 mol % or more of silver iodide means a silver halide grain in which the silver iodide content is 2 mol % or more when emulsion grains contained in one emulsion are analyzed by means for performing element analysis on the surface. In this case, if two or more types of emulsions are obviously mixed, proper preprocessing such as centrifugal separation or filtration must be performed to analyze each emulsion. More preferably, the emulsion has a silver iodide content of 2 to 30 mol % when the standard XPS measurement is performed.

The effect of the present invention is significant when the surface of a grain contains 2 mol % or more, preferably, 5.0 mol % or more, and more preferably, 7.5 to 15 mol % of silver iodide.

Although the surface halogen composition except for silver iodide is preferably silver bromide, 10 mol % or less of silver chloride may be contained.

The light-sensitive material of the present invention, which contains the emulsion containing the silver halide grains having surface iodide content of 2 mol % or more or silver halide regular grains, contains preferably $3\times10^{-5}$ mol or more, more preferably, $1\times10^{-4}$ mol or more, and most preferably, $1\times10^{-3}$ to $5\times10^{-2}$ mol of a thiocyanic acid compound per mol of a silver halide. Examples of the thiocyanic acid compound are sodium thiocyanate, potassium thiocyanate, and ammonium thiocyanate. Selenocyanic acid salt can be preferably used together with the thiocyanic acid compound as needed. The thiocyanic acid compound is preferably added before the chemical sensitization step though it can be added at any timing of during the grain formation, after the grain formation and before the washing, after the washing and before the chemical sensitization, during the chemical sensitization, after the chemical sensitization, and before the coating. Most preferably, the compound is added during the grain formation.

The regular crystal used in the present invention may be any of a cubic crystal consisting of (100) faces, an octahedral grain consisting of (111) faces, and a dodecahedral grain consisting of (110) faces disclosed in JP-B-55-42737 and JP-A-60-222842. In addition, an (hl1)-face grain represented by a (211)-face grain, an (hh1)-face grain represented by a (331)-face grain, an (hk0)-face grain represented by a (210)-face grain, and an (hk1)-face grain represented by a (321)-face grain as reported in Journal of Imaging Science Vol. 30, page 247, 1986, can be selectively used in accordance with the application though the preparation methods require improvements. Also, grains having two or more different types of faces such as a tetradecahedral grain having both (100) and (111) faces, a grain having both (100) and (110) faces, and a grain having both (111) and (110) faces can be used.

The grain size of an emulsion used in the present invention can be evaluated by an equivalent-circle diameter of a projected area obtained by using an electron microscope, an equivalent-sphere diameter of a grain volume calculated from the projected area and the grain thickness, or an equivalent-sphere diameter of the volume obtained by a calter counter. The grains may be selectively used from very fine grains having an equivalent-sphere diameter of 0.05 μm or less to large grains having an equivalent-sphere diameter exceeding 10 μm. It is preferred to use grains having a diameter of 0.1 to 3 μm as the light-sensitive silver halide grains.

The emulsion for use in the present invention, especially, which contains regular grains, is preferably a monodisperse emulsion having a narrow grain size distribution. As the scale representing the size distribution, a variation coefficient of the equivalent-circle diameter of the projected area or the equivalent-sphere diameter of the volume (the volume-equivalent sphere diameter) of the grain is sometimes used. The monodisperse emulsion containing regular crystal grains is preferably an emulsion having a size distribution in which the variation coefficient of the diameter of the sphere corresponding to the volume is 20% or less, more preferably, 15% or less, and most preferably, 10% or less.

The silver halide emulsion of the present invention, especially, which contains silver halide grains having surface iodide content of 2 mol % or more or silver halide regular grains, preferably has a distribution or a structure of a halide composition in the grains. A typical example of the structure is a core-shell type or double structure grain having different halogen compositions in the interior and the surface layer of the grain as disclosed in JP-A-43-13162, JP-A-61-215540, JP-A-60-222845, JP-A-60-143331, and JP-A-61-75337. The structure need not be a simple double structure but may be a triple structure as disclosed in JP-A-60-222844 or a multilayered structure having four or more layers. In addition, a thin silver halide layer having a different composition may be formed on the surface of a core-shell double structure grain.

In order to form a structure inside the grain, not only the above surrounding structure, but also a so-called junction structure may be used. Examples of the junction structure are disclosed in, e.g., JP-A-59-133540, JP-A-58-108526, EP 199,290A2, JP-B-58-24772, and JP-A-59-16254. A crystal to be junctioned having a composition different from that of a crystal serving as a host may be Junctioned on the edge, the corner, or the surface of the host crystal. Such a junction crystal can be formed regardless of whether the host crystal is homogeneous in halogen composition or has a core-shell type structure.

When two or more silver halides are present as a mixed crystal or with a structure in silver halide grains, it is important to control the silver halide distribution between the grains. A method of measuring the halogen composition between the grains is described in JP-A-60-254032. The halogen distribution between the grains is desirably uniform. In particular, an emulsion having high uniformity in which the variation coefficient is 20% or less is preferred. Another preferable form of an emulsion has a correlation between the grain size and the halogen composition. An example of the correlation is that a larger grain has a higher iodide content and a smaller grain has a lower iodide content. An opposite correlation or a correlation in another halogen composition may be selected in accordance with the application. For this purpose, it is preferred to mix two or more emulsions having different compositions.

The silver halide grains of the present invention can be subjected to at least one of sulfur sensitization, selenium sensitization, gold sensitization, palladium sensitization or a noble metal sensitization, and reduction sensitization in an arbitrary one of the silver halide emulsion manufacturing steps. It is preferred to combine two or more sensitization methods. Various types of emulsions can be prepared in accordance with the step in that the chemical sensitization is performed. The type is determined depending on whether a chemical sensitization nucleus is embedded in the interior of the grain, in a shallow position from the grain surface, or on the grain surface. Although the location of the chemical sensitization nucleus in the emulsion of the present invention can be selected in accordance with the application, it is generally preferable to form at least one type of a chemical sensitization nucleus near the surface of the grain.

One chemical sensitization which can be preferably performed in the present invention is chalcogen sensitization, noble metal sensitization, or a combination of the two, and can be performed by using active gelatin as described in T. H. James, "The Theory of the Photographic Process", 4th ed., Macmillan, 1977, pp. 67 to 76. Alternatively, the chemical sensitization can be performed at a pAg of 5 to 10, a pH of 5 to 8, and a temperature of 30° C. to 80° C. by using sulfur, selenium, tellurium, gold, platinum, palladium, iridium, or a combination of a plurality of these sensitizers as described in Research Disclosure Vol. 120, No. 12,008 (April, 1974), Research Disclosure Vol. 34, No. 13,452 (June, 1975), U.S. Pat. Nos. 2,642,361, 3,297,446, 3,772,031, 3,857,711, 3,901,714, 4,266,018, and 3,904,415, and British Patent 1,315,755. In the noble metal sensitization, salts of noble metals such as gold, platinum, palladium, and iridium can be used, and particularly, the gold sensitization, the palladium sensitization, and the use of the two are preferred. In the gold sensitization, a known compound such as chloroauric acid, potassium chloroaurate, potassium aurithiocyanate, gold sulfide, or gold selenide can be used. The palladium compound means a palladium divalent or tetravalent salt. A preferable palladium compound is represented by $R_2PdX_6$ or $R_2PdX_4$ wherein R represents hydrogen atom, an alkali metal atom, or an ammonium group and X represents a halogen atom, i.e., chlorine, bromine, or iodine.

Preferable examples of the palladium compound are $K_2PdCl_4$, $(NH_4)_2PdCl_6$, $Na_2PdCl_4$, $(NH_4)_2PdCl_4$, $Li_2PdCl_4$, $Na_2PdCl_6$, and $K_2PdBr_4$. The gold compound and the palladium compound are preferably used together with thiocyanate salt or selenocyanate salt.

As the sulfur sensitizer, hypo, a thiourea-based compound, a rhodanine-based compound, and sulfur-containing compounds described in U.S. Pat. Nos. 3,857,711, 4,266,018, and 4,054,457 can be used. As a so-called chemical sensitization assistant, a compound capable of suppressing fog and increasing sensitivity during the chemical sensitization such as azaindene, azapyridazine, or azapyrimidine is used. Examples of a chemical sensitization assistant modifier are described in U.S. Pat. Nos. 2,131,038, 3,411,914, and 3,554,757, JP-A-58-126526, and G. F. Duffin, "Photographic Emulsion Chemistry", Focal Press, PP. 138 to 143.

The emulsion of the present invention is preferably combined with gold sensitization. An amount of the gold sensitizer is preferably $1\times10^{-4}$ to $1\times10^{-7}$ mol, and more preferably, $1\times10^{-5}$ to $5\times10^{-7}$ mol per mol of a silver halide. A preferable amount of the palladium compound is $1\times10^{-3}$ to $5\times10^{-7}$ mol. A preferable amount of the thiocyan compound or the selenocyan compound is $5\times10^{-2}$ to $1\times10^{-6}$ mol.

An amount of the sulfur sensitizer for use in the silver halide grains of the present invention is preferably $1\times10^{-4}$ to $1\times10^{-7}$ mol, and more preferably, $1\times10^{-5}$ to $5\times10^{-7}$ mol per mol of a silver halide.

Selenium sensitization is available as a preferable sensitization method for the emulsion of the present invention. In the selenium sensitization, a known labile selenium compound is used. Examples of the selenium compound are colloidal metal selenium, selenoureas (e.g., N,N-dimethylselenourea and N,N-diethylselenourea), selenoketones, and selenoamides. The selenium sensitization is sometimes more preferable when performed together with the sulfur sensitization, the noble metal sensitization, or the both.

The silver halide emulsion of the present invention, which contains the silver halide grains having surface iodide content of 2 mol % or more or silver halide regular grains, is preferably subjected to reduction sensitization during the grain formation, after the grain formation and before or during the chemical sensitization, or after the chemical sensitization.

Reduction sensitization may be any of a method of adding a reduction sensitizer to the silver halide emulsion, a method called silver ripening in which grains are grown or ripened in a low-pAg atmosphere having a pAg of 1 to 7, and a method called high-pH ripening in which grains are grown or ripened in a high-pH atmosphere having a pH of 8 to 11. These methods can be used in combination of two or more thereof.

The method of adding a reduction sensitizer is preferable since the level of reduction sensitization can be finely controlled.

Examples of the reduction sensitizer are stannous chloride, ascorbic acid and its derivative, amines and polyamines, a hydrazine derivative, formamidinesulfinic acid, a silane compound, and a borane compound. In the present invention, these compounds may be selectively used or used in combination of two or more types thereof. Preferable compounds as the reduction sensitizer are stannous chloride, thiourea dioxide, dimethylamineborane, and ascorbic acid and its derivative. Although an addition amount of the reduction sensitizer depends on emulsion manufacturing conditions, it is preferably $10^{-7}$ to $10^{-3}$ mol per mol of a silver halide.

The reduction sensitizer can be dissolved in water or a solvent such as alcohols, glycols, ketones, esters, or amides and added during grain formation. Although the reduction sensitizer may be added to a reactor vessel beforehand, it is preferably added at an arbitrary timing during grain formation. The reduction sensitizer may be added to an aqueous solution of water-soluble silver salt or water-soluble alkali halide, and the resultant aqueous solution may be used to precipitate silver halide grains. In addition, it is also preferred to add a solution of a reduction sensitizer a plurality of times or continuously over a long time period as grain formation progresses.

The use of an oxidizing agent for silver is preferred in the manufacture of the reduction-sensitized emulsion of the present invention. The oxidizing agent for silver is a compound having an effect of converting metal silver into silver ions. In particular, a compound which converts very small silver grains by-produced in the silver halide grain formation process and chemical sensitization process into silver ions is effectively used. The produced silver ions may form silver salt which is difficult to dissolve into water such as a silver halide, silver sulfide, or silver selenide, or may form silver salt which is easy to dissolve into water such as silver nitrate. The oxidizing agent for silver may be either inorganic or organic. Examples of the inorganic oxidizing agent are ozone, hydrogen peroxide and its adducts (e.g., $NaBO_2$, $H_2O_2 \cdot 3H_2O$, $2NaCO_3 \cdot 3H_2O_2$, $Na_4P_2O_7 \cdot 2H_2O_2$, $2Na_2SO_4 \cdot H_2O_2 \cdot 2H_2O$), peroxy acid salt (e.g., $K_2S_2O_8$, $K_2C_2O_6$, and $K_2P_2O_8$), a peroxy complex compound (e.g., $K_2[Ti(O_2)C_2O_4] \cdot 3H_2O$, $4K_2SO_4 \cdot Ti(O_2)OH \cdot SO_4 \cdot SO_4 \cdot 2H_2O$, $Na_3[VO(O_2)(C_2O_4)_2 \cdot 6H_2O]$, permanganate (e.g., $KMnO_4$), oxygen acid salt, e.g., chromic acid salt (e.g., $K_2Cr_2O_7$), a halogen element, e.g., iodine or bromine, perhalogenate (e.g., potassium periodate), salt of a metal having a high valence (e.g., potassium hexacyanoferrate(II)), and thiosulfonate.

Examples of the organic oxidizing agent are quinones such as p-quinone, an organic peroxide such as peracetic acid and perbenzoic acid, and a compound which releases an active halogen (e.g., N-bromsuccinimide, chloramine T, and chloramine B).

Preferable examples of the oxidizing agent of the present invention are an inorganic oxidizing agent such as ozone, hydrogen peroxide and its adduct, a halogen element, and a thiosulfonate, and an organic oxidizing agent such as quinones. It is preferred to use both of the reduction sensitization described above and the oxidizing agents for silver. In this case, the reduction sensitization may be performed after the oxidizing agents are used or vice versa, or the two may be used at the same time. Any of these methods can be selectively performed in either the grain formation step or the chemical sensitization step.

A photographic emulsion used in the present invention is preferably, spectrally sensitized by methine dyes or the like in order to achieve the effect of the present invention. The methine dye includes a cyanine dye, a merocyanine dye, a composite dye, a composite merocyanine dye, a holopolar cyanine dye, a hemicyanine dye, a styryl dye, and a hemioxonol dye. The most useful dyes are those belonging to a cyanine dye, a merocyanine dye, and a composite merocyanine dye. In these dyes, any nucleus normally used as a basic heterocyclic nucleus in cyanine dyes can be used. Examples of the nucleus are a pyrroline nucleus, an oxazoline nucleus, a thiozoline nucleus, a pyrrole nucleus, an oxazole nucleus, a thiazole nucleus, a selenazole nucleus, an imidazole nucleus, a tetrazole nucleus, and a pyridine nucleus; a nucleus obtained by fusing an alicyclic hydrocarbon ring to each of the above nuclei; and a nucleus obtained by fusing an aromatic hydrocarbon ring to each of the above nuclei, e.g., an indolenine nucleus, a benzindolenine nucleus, an indole nucleus, a benzoxadole nucleus, a naphthooxadole nucleus, a benzothiazole nucleus, a naphthothiazole nucleus, a benzoselenazole nucleus, a benzimidazole nucleus, and a quinoline nucleus. These nuclei may be substituted on a carbon atom.

For a merocyanine dye or composite merocyanine dye, a 5- or 6-membered heterocyclic nucleus, e.g., a pyrazoline-5-one nucleus, a thiohydantoin nucleus, a 2-thiooxazoline-2,4-dione nucleus, a thiazoline-2,4-dione nucleus, a rhodanine nucleus, or a thiobarbituric acid nucleus can be used as a nucleus having a ketonmethylene structure.

These sensitizing dyes can be used either singly or in a combination of two or more thereof, and combinations of the sensitizing dyes are often used for a purpose of supersensitization. Typical examples of the combination are described in U.S. Pat. Nos. 2,688,545, 2,977,229, 3,397,060, 3,522,052, 3,527,641, 3,617,293, 3,628,964, 3,666,480, 3,672,898, 3,679,428, 3,703,377, 3,769,301, 3,814,609, 3,837,862, and 4,026,707, British Patents 1,344,281 and 1,507,803, JP-B-43-4936, JP-B-53-112375, JP-A-52-110618, and JP-A-52-109925.

The emulsion may contain, in addition to the sensitizing dye, a dye not having a spectral sensitizing effect or a substance essentially not absorbing visible light but exhibiting supersensitization.

The dye can be added to the emulsion at any timing conventionally known to be effective in emulsion preparation. Most ordinarily, the dye is added after completion of chemical sensitization and before coating. However, the dye can be added at the same time as a chemical sensitizer is added to simultaneously perform spectral sensitization and chemical sensitization as described in U.S. Pat. Nos. 3,628,969 and 4,225,666, added before chemical sensitization as described in JP-A-58-113928, or added before completion of silver halide precipitation to start spectral sensitization. In addition, as described in U.S. Pat. No. 4,225,666, the above compound can be separately added such that a part of the compound is added before chemical sensitization and the remaining part is added thereafter. That is, as described in U.S. Pat. No. 4,183,756, the compound can be added at any timing during silver halide grain formation.

The addition amount may be $4\times10^{-6}$ to $8\times10^{-3}$ mol per mol of a silver halide. More preferably, when the silver halide grain size is 0.2 to 1.2 μm, an addition amount of about $5\times10^{-5}$ to $2\times10^{-3}$ mol is more effective.

The photographic emulsion for use in the present invention can contain various compounds in order to prevent fog during manufacture, storage, or a photographic treatment of the light-sensitive material or to stabilize photographic properties. Examples of the compound are those known as an antifoggant or stabilizer, e.g., azoles such as benzothiazolium salt, nitroindazoles, triazoles, benzotriazoles, and benzimidazoles (especially a nitro- or halogen-substituted one); heterocyclic mercapto compounds such as mercaptothiazoles, mercaptobenzothiazoles, mercaptobenzimidazoles, mercaptothiadiazoles, mercaptotetrazoles (especially 1-phenyl-5-mercaptotetrazole), and mercaptopyrimidines; the heterocyclic mercapto compounds having a water-soluble group such as a carboxyl group or a sulfone group; a thioketo compound such as oxazolinethione; azaindenes such as tetraazaindenes (especially 4-hydroxy-substituted(1,3,3a,7)tetraazaindenes); benzenethiosulfonic acids; and benzenesulfinic acids.

Although these antifoggants or stabilizers are normally added after chemical sensitization is performed, they may be more preferably added during chemical ripening or before the chemical ripening is started. That is, in a silver halide emulsion grain formation process, the antifoggants or stabilizers can be added during addition of a silver salt solution, after the addition and before the chemical ripening is started, or during the chemical ripening (within preferably 50%, and more preferably, 20% of a chemical ripening time from the start of chemical ripening).

The addition amount of the above compounds used in the present invention cannot be uniquely determined because it depends on an addition method or a silver halide amount. However, the addition amount is preferably $10^{-7}$ to $10^{-2}$ mol, and more preferably, $10^{-5}$ to $10^{-2}$ mol per mol of a silver halide.

The effect of a compound represented by formula (I) of the present invention is apparently different from those obtained by the above general antifoggants. Therefore, even when the general antifoggant and a compound represented by formula (I) of the present invention are simultaneously used, the effect of the present invention can be achieved.

The present invention can be applied to a color light-sensitive material. The light-sensitive material of the present invention need only have at least one of silver halide emulsion layers, i.e., a blue-sensitive layer, a green-sensitive layer, and a red-sensitive layer formed on a support. The number or order of the silver halide emulsion layers and the non-light-sensitive layers are particularly not limited. A typical example is a silver halide photographic light-sensitive material having, on a support, at least one light-sensitive layers constituted by a plurality of silver halide emulsion layers which are sensitive to essentially the same color sensitivity but has different speed. In a multilayered silver halide color photographic light-sensitive material, the light-sensitive layers are unit light-sensitive layer sensitive to blue, green or red. The unit light-sensitive layers are generally arranged such that red-, green-, and blue-sensitive layers are formed from a support side in the order named. However, this order may be reversed or a layer sensitive to one color may be sandwiched between layers sensitive to another color in accordance with the application.

Non-light-sensitive layers such as various types of interlayers may be formed between the silver halide light-sensitive layers and as the uppermost layer and the lowermost layer.

The interlayer may contain, e.g., couplers and DIR compounds as described in JP-A-61-43748, JP-A-59-113438, JP-A-59-113440, JP-A-61-20037, and JP-A-61-20038 or a color mixing inhibitor which is normally used.

As a plurality of silver halide emulsion layers constituting each unit light-sensitive layer, a two-layered structure of high- and low-sensitivity emulsion layers can be preferably used as described in West German Patent 1,121,470 or British Patent 923,045. In this case, layers are preferably arranged such that the sensitivity is sequentially decreased toward a support, and a non-light-sensitive layer may be formed between the silver halide emulsion layers. In addition, as described in JP-A-57-112751, JP-A-62-200350, JP-A-62-206541, and JP-A-62-206543, layers may be arranged such that a low-sensitivity emulsion layer is formed remotely from a support and a high-sensitivity layer is formed close to the support.

More specifically, layers may be arranged from the farthest side from a support in an order of low-sensitivity blue-sensitive layer (BL)/high-sensitivity blue-sensitive layer (BH)/high-sensitivity green-sensitive layer (GH)/low-sensitivity green-sensitive layer (GL)/high-sensitivity red-sensitive layer (RH)/low-sensitivity red-sensitive layer (RL), an order of BH/BL/GL/GH/RH/RL, or an order of BH/BL/GH/GL/RL/RH.

In addition, as described in JP-B-55-34932, layers may be arranged from the farthest side from a support in an order of blue-sensitive layer/GH/RH/GL/RL. Furthermore, as described in JP-B-56-25738 and JP-B-62-63936, layers may be arranged from the farthest side from a support in an order of blue-sensitive layer/GL/RL/GH/RH.

As described in JP-B-49-15495, three layers may be arranged such that a silver halide emulsion layer having the highest sensitivity is arranged as an upper layer, a silver halide emulsion layer having sensitivity lower than that of the upper layer is arranged as an interlayer, and a silver halide emulsion layer having sensitivity lower than that of the interlayer is arranged as a lower layer, i.e., three layers having different sensitivities may be arranged such that the sensitivity is sequentially decreased toward the support. When a layer structure is constituted by three layers having different sensitivities, these layers may be arranged in an order of medium-sensitivity emulsion layer/high-sensitivity emulsion layer/low-sensitivity emulsion layer from the farthest side from a support in a layer sensitive to one color as described in JP-A-59-202464.

In addition, an order of high-sensitivity emulsion layer/low-sensitivity emulsion layer/medium-sensitivity emulsion layer or low-sensitivity emulsion layer/medium-sensitivity emulsion layer/high-sensitivity emulsion layer may be adopted.

Furthermore, the arrangement can be changed as described above even when four or more layers are formed.

As described above, various layer types and arrangements can be selected in accordance with the application of the light-sensitive material.

A preferable silver halide contained in photographic emulsion layers of the photographic light-sensitive material of the present invention is silver iodobromide, silver iodochloride, or silver iodochlorobromide containing about 30 mol % or less of silver iodide. The most preferable silver halide is silver iodobromide or silver iodochlorobromide containing about 2 mol % to about 10 mol % of silver iodide.

Silver halide grains contained in the photographic emulsion may have regular crystals such as cubic, octahedral, or tetradecahedral crystals, irregular crystals such as spherical or tabular crystals, crystals having crystal defects such as twinned crystal faces, or composite shapes thereof.

The silver halide may consist of fine grains having a grain size of about 0.2 μm or less or large grains having a projected area diameter of about 10 μm, and the emulsion may be either a polydisperse or monodisperse emulsion.

The silver halide photographic emulsion which can be used in the present invention can be prepared by methods described in, for example, Research Disclosure (RD) No. 17,643 (December, 1978), pp. 22 to 23, "I. Emulsion preparation and types", RD No. 18,716 (November, 1979), page 648, and RD No. 307,105 (November, 1989), pp. 863 to 865; P. Glafkides, "Chemie et Phisique Photographique", Paul Montel, 1967; G. F. Duffin, "Photographic Emulsion Chemistry", Focal Press, 1966; and V. L. Zelikman et al., "Making and Coating Photographic Emulsion", Focal Press, 1964.

Monodisperse emulsions described in, for example, U.S. Pat. Nos. 3,574,628 and 3,655,394 and British Patent 1,413,748 are also preferred.

Also, tabular grains having an aspect ratio of about 3 or more can be used in the present invention. The tabular grains can be easily prepared by methods described in, e.g., Gutoff, "Photographic Science and Engineering", Vol. 14, PP. 248 to 257 (1970); U.S. Pat. Nos. 4,434,226, 4,414,310, 4,433,048, and 4,499,520, and British Patent 2,112,157.

The crystal structure may be uniform, may have different halogen compositions in the interior and the surface layer thereof, or may be a layered structure. Alternatively, a silver halide having a different composition may be bonded by an epitaxial junction or a compound except for a silver halide such as silver rhodanide or zinc oxide may be bonded. A mixture of grains having various types of crystal shapes may be used.

The above emulsion may be of any of a surface latent image type in which a latent image is mainly formed on the surface of each grain, an internal latent image type in which a latent image is formed in the interior of each grain, and a type in which a latent image is formed on the surface and in the interior of each grain. However, the emulsion must be of a negative type. When the emulsion is of an internal latent image type, it may be a core/shell internal latent image type emulsion described in JP-A-63-264740. A method of preparing this core/shell internal latent image type emulsion is described in JP-A-59-133542. Although the thickness of a shell of this emulsion changes in accordance with development or the like, it is preferably 3 to 40 nm, and most preferably, 5 to 20 nm.

A silver halide emulsion layer is normally subjected to physical ripening, chemical ripening, and spectral sensitization steps before it is used. Additives for use in these steps are described in Research Disclosure Nos. 17,643, 18,716, and 307,105 and they are summarized in the following table.

In the light-sensitive material of the present invention, two or more types of emulsions different in at least one characteristic of a grain size, a grain size distribution, a halogen composition, a grain shape, and sensitivity can be mixed in one layer.

A surface-fogged silver halide grain described in U.S. Pat. No. 4,082,553, an internally fogged silver halide grain described in U.S. Pat. No. 4,626,498 or JP-A-59-214852, and colloidal silver can be preferably used in a light-sensitive silver halide emulsion layer and/or a substantially non-light-sensitive hydrophilic colloid layer. The internally fogged or surface-fogged silver halide grains are silver halide grains which can be uniformly (non-imagewise) developed in either a non-exposed portion or an exposed portion of the light-sensitive material. A method of preparing the internally fogged or surface-fogged silver halide grain is described in U.S. Pat. No. 4,626,498 or JP-A-59-214852.

A silver halide which forms the core of an internally fogged core/shell type silver halide grain may have the same halogen composition as or a different halogen composition from that of the other portion. Examples of the internally fogged or surface-fogged silver halide are silver chloride, silver chlorobromide, silver iodobromide, and silver chloroiodobromide. Although the grain size of these fogged silver halide grains is not particularly limited, an average grain size is 0.01 to 0.75 μm, and most preferably, 0.05 to 0.6 μm. The grain shape is also not particularly limited but may be a regular grain shape. Although the emulsion may be a polydisperse emulsion, it is preferably a monodisperse emulsion (in which at least 95% in weight or number of silver halide grains have a grain size falling within the range of ±40% of an average grain size).

In the present invention, a non-light-sensitive fine grain silver halide is preferably used. The non-light-sensitive fine grain silver halide means silver halide fine grains not sensitive upon imagewise exposure for obtaining a dye image and essentially not developed in development. The non-light-sensitive fine grain silver halide is preferably not fogged beforehand.

The fine grain silver halide contains 0 to 100 mol % of silver bromide and may contain silver chloride and/or silver iodide as needed. Preferably, the fine grain silver halide contains 0.5 to 10 mol % of silver iodide.

An average grain size (an average value of equivalent-circle diameters of projected areas) of the fine grain silver halide is preferably 0.01 to 0.5 μm, and more preferably, 0.02 to 0.2 μm.

The fine grain silver halide can be prepared by a method similar to a method of preparing normal light-sensitive material silver halide. In this preparation, the surface of a silver halide grain need not be subjected to either chemical sensitization or spectral sensitization. However, before the silver halide grains are added to a coating solution, a known stabilizer such as a triazole compound, an azaindene compound, a benzothiazolium compound, a mercapto compound, or a zinc compound is preferably added. This fine grain silver halide grain containing layer preferably contains a colloidal silver.

A coating silver amount of the light-sensitive material of the present invention is preferably 6.0 $g/m^2$ or less, and most preferably, 4.5 $g/m^2$ or less if the light-sensitive material contains tabular silver halide grains having an aspect ratio of 2 or more. If the light-sensitive material contains silver halide grains each containing 2 mol % or more of silver iodide on its surface or the light-sensitive material contains regular crystal grains, the coating silver amount is preferably 7.0 $g/m^2$ or less, and most preferably, 5.0 $g/m^2$ or less.

Known photographic additives usable in the present invention are also described in the above three RDs, and they are summarized in the following Tables I and II. Table I shows additives usable in a light-sensitive material containing tabular silver halide grains, and Table II shows additives usable in a light-sensitive material containing silver halide grains each containing 2 mol % or more of silver iodide on its surface or a light-sensitive material containing regular crystal grains.

TABLE I

| Additives | RD17643 Dec., 197B | RD18716 Nov., 1979 | RD307105 Nov., 1989 |
|---|---|---|---|
| 1. Chemical sensitizers | page 23 | page 648, right column | page 866 |
| 2. Sensitivity increasing agents | | page 648, right column | |
| 3. Spectral sensitizers, super sensitizers | pp. 23–24 | page 648, right column to page 649, right column | pp. 866–868 |
| 4. Brighteners | page 24 | page .647, right column | page 868 |
| 5. Antifoggants and stabilizers | pp. 24–25 | page 649. right column | pp. 868–870 |
| 6. Light absorbent. filter dye. ultraviolet absorbents | pp. 25–26 | page 649, right column to page 650. left column | page 873 |
| 7. Stain preventing agents | page 25, right column | page 650. left to right columns | page 872 |
| 8. Dye image stabilizer | page 25 | page 650, left column | page 872 |
| 9. Hardening agents | page 26 | page 651. left column | pp. 874–875 |
| 10. Binder | page 26 | page 651. left column | pp. 875–874 |
| 11. Plasticizers. lubricants | page 27 | page 650, right column | page 876 |
| 12. Coating aids. surface active agents | pp. 26–27 | page 650, right column | pp. 875–876 |
| 13. Antistatic agents | page 27 | page 650, right column | pp. 876–877 |
| 14. Matting agent | | | pp. B78–879 |

TABLE II

| Additives | RD17643 | RD18716 | RD307105 |
|---|---|---|---|
| 1. Chemical sensitizers | page 23 | page 648, right column | page 996 |
| 2. Sensitivity increasing agents | | page 648, right column | |
| 3. Spectral sensitizers, super sensitizers | pages 23–24 | page 648, right column to page 649, right column | 996, R to 998, R |
| 4. Brighteners | page 24 | | |
| 5. Antifoggants and stabilizers | pages 24–25 pages 24–25 | page 649, right column | 998, R to 1,000, R |
| 6. Light absorbent, filter dye, ultraviolet absorbents | pages 25–26 | page 649, right colum to page 650, left column | 1,103, L to 1,003, R |
| 7. Stain preventing agents | page 25, right column | page 650, left to right columns | |
| 8. Dye image stabilizer | page 25 | | |
| 9. Hardening agents | page 26 | page 651, left column | 1,004, R to 1,005, L |
| 10. Binder | page 26 | page 651, left column | 1,003, R to 1,004, R |
| 11. Plasticizers, lubricants | page 27 | page 650, right column | 1,006, L to 1,006, R |
| 12. Coating aids, surface active agents | pages 26–27 | page 650, right column | 1,005, L to 1,006, L |
| 13. Antistatic agents | page 27 | page 650, right column | 1,006, R to 1,007, L |

In order to prevent degradation in photographic properties caused by formaldehyde gas, a compound which can react with and fix formaldehyde described in U.S. Pat. Nos. 4,411,987 or 4,435,503 is preferably added to the light-sensitive material.

The light-sensitive material of the present invention preferably contains mercapto compounds described in U.S. Pat. Nos. 4,740,454 and 4,788,132, JP-A-62-18539, and JP-A-1-283551.

The light-sensitive material of the present invention preferably contains compounds for releasing a fogging agent, a development accelerator, a silver halide solvent, or precursors thereof described in JP-A-1-106052 regardless of a developed silver amount produced by the development.

The light-sensitive material of the present invention preferably contains dyes dispersed by methods described in WO 88/04794 and JP-A-1-502912 or dyes described in EP 317,308A, U.S. Pat. No. 4,420,555, and JP-A-1-259358.

Various color couplers can be used in the present invention, and specific examples of these couplers are described in patents described in above-mentioned Research Disclosure (RD), No. 17643, VII-C to VII-G and RD No. 307105, VII-C to VII-G.

Preferred examples of a yellow coupler are described in, e.g., U.S. Pat. Nos. 3,933,501, 4,022,620, 4,326,024, 4,401,752, and 4,248,961, JP-B-58-10739, British Patents 1,425,020 and 1,476,760, U.S. Pat. Nos. 3,973,968, 4,314,023, and 4,511,649, and EP 249,473A.

Examples of a magenta coupler are preferably 5-pyrazolone and pyrazoloazole compounds, and more preferably, compounds described in, e.g., U.S. Pat. Nos. 4,310,619 and 4,351,897, EP 73,636, U.S. Pat. Nos. 3,061,432 and 3,725,067, Research Disclosure No. 24220 (June 1984), JP-A-60-33552, Research Disclosure 10 No. 24230 (June 1984), JP-A-60-43659, JP-A-61-72238, JP-A-60-35730, JP-A-55-118034, and JP-A-60-185951, U.S. Pat. Nos. 4,500,630, 4,540,654, and 4,565,630, and WO No. 88/04795.

Examples of a cyan coupler are phenol and naphthol couplers, and preferably, those described in, e.g., U.S. Pat.

Nos. 4,052,212, 4,146,396, 4,228,233, 4,296,200, 2,369, 929, 2,801,171, 2,772,162, 2,895,826, 3,772,002, 3,758,308, 4,343,011, and 4,327,173, EP Disclosure 3,329,729, EP 121,365A and 249,453A, U.S. Pat. Nos. 3,446,622, 4,333, 999, 4,775,616, 4,451,559, 4,427,767, 4,690,889, 4,254,212, and 4,296,199, and JP-A-61-42658.

Typical examples of a polymerized dye-forming coupler are described in U.S. Pat. Nos. 3,451,820, 4,080,221, 4,367, 288, 4,409,320, and 4,576,910, British Patent 2,102,173, and EP 341,188A.

Preferable examples of a coupler capable of forming colored dyes having proper diffusibility are those described in U.S. Pat. No. 4,366,237, British Patent 2,125,570, EP 96,570, and West German Patent Application (OLS) No. 3,234,533.

Preferable examples of a colored coupler for correcting additional, undesirable absorption of a colored dye are those described in Research Disclosure No. 17643, VII-G, U.S. Pat. No. 4,163,670, JP-B-57-39413, U.S. Pat. Nos. 4,004, 929 and 4,138,258, and British Patent 1,146,368. A coupler for correcting unnecessary absorption of a colored dye by a fluorescent dye released upon coupling described in U.S. Pat. No. 4,774,181 or a coupler having a dye precursor group which can react with a developing agent to form a dye as a split-off group described in U.S. Pat. No. 4,777,120 may be preferably used.

Couplers releasing a photographically useful residue upon coupling are preferably used in the present invention. DIR couplers, i.e., couplers releasing a development inhibitor are described in the patents cited in the above-described RD No. 17643, VII-F, RD No. 307105, VII-F, JP-A-57-151944, JP-A-57-154234, JP-A-60-184248, JP-A-63-37346, JP-A-63-37350, and U.S. Pat. Nos. 4,248,962 and 4,782,012.

Preferable examples of a coupler for imagewise releasing a nucleating agent or a development accelerator are described in British Patents 2,097,140 and 2,131,188, JP-A-59-157638, and JP-A-59-170840. In addition, compounds for releasing a fogging agent, a development accelerator, or a silver halide solvent upon redox reaction with an oxidized form of a developing agent, described in JP-A-60-107029, JP-A-60-252340, JP-A-1-44940, and JP-A-1-45687, can also be preferably used.

Examples of a coupler which can be used in the light-sensitive material of the present invention are competing couplers described in, e.g., U.S. Pat. No. 4,130,427; poly-equivalent couplers described in, e.g., U.S. Pat. Nos. 4,283, 472, 4,338,393, and 4,310,618; a DIR redox compound releasing coupler, a DIR coupler releasing coupler, a DIR coupler releasing redox compound, or a DIR redox releasing redox compound described in, e.g., JP-A-60-185950 and JP-A-62-24252; couplers releasing a dye which turns to a colored form after being released described in EP 173,302A and 313,308A; bleaching accelerator releasing couplers described in, e.g., RD. Nos. 11,449 and 24,241 and JP-A-61-201247; a legand releasing coupler described in, e.g., U.S. Pat. No. 4,553,477; a coupler releasing a leuco dye described in JP-A-63-75747; and a coupler releasing a fluorescent dye described in U.S. Pat. No. 4,774,181.

The couplers for use in this invention can be added to the light-sensitive material by various known dispersion methods.

Examples of a high-boiling organic solvent to be used in the oil-in-water dispersion method are described in e.g. U.S. Pat. No. 2,322,027. Examples of a high-boiling organic solvent to be used in the oil-in-water dispersion method and having a boiling point of 175° C. or more at atmospheric pressure are phthalic esters (e.g., dibutylphthalate, dicyclohexylphthalate, di-2-ethylhexylphthalate, decylphthalate, bis(2,4-di-t-amylphenyl)phthalate, bis(2,4-di-t-amylphenyl)isophthalate, bis(1,1-di-ethylpropyl) phthalate), phosphates or phosphonates (e.g., triphenylphosphate, tricresylphosphate, 2-ethylhexyldiphenylphosphate, tricyclohexylphosphate, tri-2-ethylhexylphosphate, tridodecylphosphate, tributoxyethylphosphate, trichloropropylphosphate, and di-2-ethylhexylphenylphosphonate), benzoates (e.g., 2-ethylhexylbenzoate, dodecylbenzoate, and 2-ethylhexyl-p-hydroxybenzoate), amides (e.g., N,N-diethyldodecaneamide, N,N-diethyllaurylamide, and N-tetradecylpyrrolidone), alcohols or phenols (e.g., isostearylalcohol and 2,4-di-tert-amylphenol), aliphatic carboxylates (e.g., bis(2-ethylhexyl)sebacate, dioctylazelate, glyceroltributylate, isostearyllactate, and trioctylcitrate), an aniline derivative (e.g., N,N-dibutyl-2-butoxy-5-tert-octylaniline), and hydrocarbons (e.g., paraffin, dodecylbenzene, and diisopropylnaphthalene). An organic solvent having a boiling point of about 30° C. or more, and preferably, 50° C. to about 160° C. can be used as a co-solvent. Typical examples of the co-solvent are ethyl acetate, butyl acetate, ethyl propionate, methylethylketone, cyclohexanone, 2-ethoxyethylacetate, and dimethylformamide.

Steps and effects of a latex dispersion method and examples of a loadable latex are described in, e.g., U.S. Pat. No. 4,199,363 and West German Patent Application (OLS) Nos. 2,541,274 and 2,541,230.

Various types of an antiseptic agent or a mildewproofing agent are preferably added to the color light-sensitive material of the present invention. Examples of the antiseptic agent and the mildewproofing agent are 1,2-benzisothiazoline-3-one, n-butyl-p-hydroxybenzoate, phenol, 4-chloro-3,5-dimethylphenol, 2-phenoxyethanol, and 2-(4-thiazolyl)benzimidazole described in JP-A-63-257747, JP-A-62-272248, and JP-A-1-80941.

The present invention can be applied to various color light-sensitive materials. Examples of the material are a color negative film for a general purpose or a movie, a color reversal film for a slide or a television, color paper, a color positive film, and color reversal paper.

A support which can be suitably used in the present invention is described in, e.g., RD. No. 17643, page 28, RD. No. 18716, from the right column, page 647 to the left column, page 648, and RD. No. 307105, page 879.

In the light-sensitive material using the photographic emulsion of the present invention, the sum total of film thicknesses of all hydrophilic colloidal layers at the side having emulsion layers is preferably 28 μm or less, more preferably, 23 μm or less, much more preferably, 18 μm or less, and most preferably, 16 μm or less. A film swell speed $T_{1/2}$ is preferably 30 sec. or less, and more preferably, 20 sec. or less. The film thickness means a film thickness measured under moisture conditioning at a temperature of 25° C. and a relative humidity of 55% (two days). The film swell speed $T_{1/2}$ can be measured in accordance with a known method in the art. For example, the film swell speed $T_{1/2}$ can be measured by using a swell meter described in Photographic Science & Engineering, A. Green et al., Vol. 19, No. 2, pp. 124 to 129. When 90% of a maximum swell film thickness reached by performing a treatment by using a color developing agent at 30° C. for 3 min. and 15 sec. is defined as a saturated film thickness, $T_{1/2}$ is defined as a time required for reaching ½ of the saturated film thickness.

The film swell speed $T_{1/2}$ can be adjusted by adding a film hardening agent to gelatin as a binder or changing aging conditions after coating. A swell ratio is preferably 150% to 400%. The swell ratio is calculated from the maximum swell film thickness measured under the above conditions in accordance with a relation: (maximum swell film thickness−film thickness)/film thickness.

In the light-sensitive material of the present invention, hydrophilic colloid layers (called back layers) having a total dried film thickness of 2 to 20 μm are preferably formed on the side opposite to the side having emulsion layers. The back layers preferably contain, e.g., the light absorbent, the filter dye, the ultraviolet absorbent, the antistatic agent, the film hardener, the binder, the plasticizer, the lubricant, the coating aid, and the surfactant described above. The swell ratio of the back layers is preferably 150% to 500%.

The color photographic light-sensitive material according to the present invention can be developed by conventional methods described in RD. No. 17643, pp. 28 and 29, RD. No. 18716, the left to right columns, page 615, and RD. No. 307105, pp. 880 and 881.

A color developer used in development of the light-sensitive material of the present invention is an aqueous alkaline solution containing as a main component, preferably, an aromatic primary amine-based color developing agent. As the color developing agent, although an aminophenol-based compound is effective, a p-phenylenediamine-based compound is preferably used. Typical examples of the p-phenylenediamine-based compound are 3-methyl-4-amino-N,N-diethylaniline, 3-methyl-4-amino-N-ethyl-N-β-hydroxyethylaniline, 3-methyl-4-amino-N-ethyl-N-β-methanesulfonamidoethylaniline, 3-methyl-4-amino-N-ethyl-N-β-methoxyethylaniline, and sulfates, hydrochlorides and p-toluenesulfonates thereof. Of these compounds, 3-methyl-4-amino-N-ethyl-N-β-hydroxyethylaniline sulfate is most preferred. These compounds can be used in a combination of two or more thereof in accordance with the application.

In general, the color developer contains a pH buffering agent such as a carbonate, a borate, or a phosphate of an alkali metal, and a development restrainer or an antifoggant such as a bromide, an iodide, a benzimidazole, a benzothiazole, or a mercapto compound. If necessary, the color developer may also contain a preservative such as hydroxylamine, diethylhydroxylamine, a hydrazine sulfite, a phenylsemicarbazide, triethanolamine, or a catechol sulfonic acid; an organic solvent such as ethyleneglycol or diethyleneglycol; a development accelerator such as benzylalcohol, polyethyleneglycol, a quaternary ammonium salt or an amine; a dye forming coupler; a competing coupler; a fogging agent such as sodium boron hydride; an auxiliary developing agent such as 1-phenyl-3-pyrazolidone; a viscosity imparting agent; and a chelating agent such as aminopolycarboxylic acid, an aminopolyphosphonic acid, an alkylphosphonic acid, or a phosphonocarboxylic acid. Examples of the chelating agent are ethylenediaminetetraacetic acid, nitrilotriacetic acid, diethylenetriaminepentaacetic acid, cyclohexanediaminetetraacetic acid, hydroxyethyliminodiacetic acid, 1-hydroxyethylidene-1,1-diphosphonic acid, nitrilo-N,N,N-trimethylenephosphonic acid, ethylenediamine-N,N,N',N'-tetramethylenephosphonic acid, and ethylenediamine-di(o-hydroxyphenylacetic acid), and salts thereof.

In order to perform reversal development, black-and-white development is performed and then color development is performed. As a black-and-white developer, well-known black-and-white developing agents, e.g., a dihydroxybenzene such as hydroquinone, a 3-pyrazolidone such as 1-phenyl-3-pyrazolidone, and an aminophenol such as N-methyl-p-aminophenol can be singly or in a combination of two or more thereof.

The pH of the color and black-and-white developers is generally 9 to 12. Although a replenishment amount of the developer depends on a color photographic light-sensitive material to be processed, it is generally 3 liters or less per $m^2$ of the light-sensitive material. The replenishment amount can be decreased to be 500 ml or less by decreasing a bromide ion concentration in a replenishing solution. In order to decrease the replenishment amount, a contact area of a processing tank with air is preferably decreased to prevent evaporation and oxidation of the solution upon contact with air. The replenishment amount can be decreased by using a means capable of suppressing an accumulation amount of bromide ions in the developer.

A contact area of a photographic processing solution with air in a processing tank can be represented by an aperture defined below:

$$\text{Aperture} = \frac{\text{contact area (cm}^2\text{) of processing solution with air}}{\text{volume (cm}^3\text{) of processing solution}}$$

The above aperture is preferably 0.1 or less, and more preferably, 0.001 to 0.05. In order to reduce the aperture, a shielding member such as a floating cover may be provided on the liquid surface of the photographic processing solution in the processing tank. In addition, a method of using a movable cover described in JP-A-1-82033 or a slit developing method descried in JP-A-63-216050 may be used. The aperture is preferably reduced not only in color and black-and-white development steps but also in all subsequent steps, e.g., bleaching, bleach-fixing, fixing, washing, and stabilizing steps. In addition, a replenishing amount can be reduced by using a means of suppressing storage of bromide ions in the developing solution.

A color development time is normally two to five minutes. The processing time, however, can be shortened by setting a high temperature and a high pH and using the color developing agent at a high concentration.

The photographic emulsion layer is generally subjected to bleaching after color development. The bleaching may be performed either simultaneously with fixing (bleach-fixing) or independently thereof. In addition, in order to increase a processing speed, bleach-fixing may be performed after bleaching. Also, processing may be performed in a bleach-fixing bath having two continuous tanks, fixing may be performed before bleach-fixing, or bleaching may be performed after bleach-fixing, in accordance with the application. Examples of the bleaching agent are a compound of a multivalent metal such as iron(III), peroxides; quinones; and a nitro compound. Typical examples of the bleaching agent are an organic complex salt of iron(III), e.g., a complex salt of an aminopolycarboxylic acid such as ethylenediaminetetraacetic acid, diethylenetriaminepentaacetic acid, cyclohexanediamine-tetraacetic acid, methyliminodiacetic acid, and 1,3-diaminopropanetetraacetic acid, and glycoletherdiaminetetraacetic acid; or a complex salt of citric acid, tartaric acid, or malic acid. Of these compounds, an iron(III) complex salt of aminopolycarboxylic acid such as an iron(III) complex salt of ethylenediaminetetraacetic acid or 1,3-diaminopropanetetraacetic acid is preferred because it can increase a processing speed and prevent an environmental contamination. The iron(III) complex salt of aminopolycarboxylic acid is useful in both the bleaching and bleach-fixing solutions. The pH of the bleaching or bleach-fixing solution using the iron(III) complex salt of aminopolycarboxylic acid is normally 4.0 to 8. In order to increase the processing speed, however, processing can be performed at a lower pH.

A bleaching accelerator can be used in the bleaching solution, the bleach-fixing solution, and their pre-bath, if necessary. Useful examples of the bleaching accelerator are: compounds having a mercapto group or a disulfide group described in, e.g., U.S. Pat. No. 3,893,858, West German Patents 1,290,812 and 2,059,988, JP-A-53-32736, JP-A-53-57831, JP-A-53-37418, JP-A-53-72623, JP-A-53-95630, JP-A-53-104232, JP-A-53-124424, and JP-A-53-141623, and JP-A-53-28426, and Research Disclosure No. 17,129 (July, 1978); a thiazolidine derivative described in JP-A-50-140129; iodide salts described in JP-B-45-8506, JP-A-52-20832, JP-A-53-32735, U.S. Pat. No. 3,706,561, and JP-A-58-16235; polyoxyethylene compounds descried in West German Patents 977,410 and 2,748,430; a polyamine compound described in JP-B-45-8836; compounds descried in JP-A-49-40943, JP-A-49-59644, JP-A-53-94927, JP-A-54-35727, JP-A-55-26506, and JP-A-58-163940; and a bromide ion. Of these compounds, a compound having a mercapto group or a disulfide group is preferable since the compound has a large accelerating effect. In particular, compounds described in U.S. Pat. No. 3,893,858, West German Patent 1,290,812, and JP-A-53-95630 are preferred. A compound described in U.S. Pat. No. 4,552,834 is also preferable. These bleaching accelerators may be added in the light-sensitive material. These bleaching accelerators are useful especially in bleach-fixing of a photographic color light-sensitive material.

The bleaching solution or the bleach-fixing solution preferably contains, in addition to the above compounds, an organic acid in order to prevent a bleaching stain. The most preferable organic acid is a compound having an acid dissociation constant (pKa) of 2 to 5, e.g., acetic acid or propionic acid.

Examples of the fixing agent are thiosulfate, a thiocyanate, a thioether-based compound, a thiourea and a large amount of an iodide. Of these compounds, a thiosulfate, especially, ammonium thiosulfate can be used in the widest range of applications. In addition, a combination of thiosulfate and a thiocyanate, a thioether-based compound, or thiourea is preferably used. As a preservative of the bleach-fixing solution, a sulfite, a bisulfite, a carbonyl bisulfite adduct, or a sulfinic acid compound described in EP 294,769A is preferred. In addition, in order to stabilize the fixing solution or the bleach-fixing solution, various types of aminopolycarboxylic acids or organic phosphonic acids are preferably added to the solution.

In the present invention, 0.1 to 10 mol/l of a compound having a pKa of 6.0 to 9.0 are preferably added to the fixing solution or the bleach-fixing solution in order to adjust the pH. Preferable examples of the compound are imidazoles such as imidazole, 1-methylimidazole, 1-ethylimidazole, and 2-methylimidazole.

The total time of a desilvering step is preferably as short as possible as long as no desilvering defect occurs. A preferable time is one to three minutes, and more preferably, one to two minutes. A processing temperature is 25° C. to 50° C., and preferably, 35° C. to 45° C. Within the preferable temperature range, a desilvering speed is increased, and generation of a stain after the processing can be effectively prevented.

In the desilvering step, stirring is preferably as strong as possible. Examples of a method of strengthening the stirring are a method of colliding a jet stream of the processing solution against the emulsion surface of the light-sensitive material described in JP-A-62-183460, a method of increasing the stirring effect using rotating means described in JP-A-62-183461, a method of moving the light-sensitive material while the emulsion surface is brought into contact with a wiper blade provided in the solution to cause disturbance on the emulsion surface, thereby improving the stirring effect, and a method of increasing the circulating flow amount in the overall processing solution. Such a stirring improving means is effective in any of the bleaching solution, the bleach-fixing solution, and the fixing solution. It is assumed that the improvement in stirring increases the speed of supply of the bleaching agent and the fixing agent into the emulsion film to lead to an increase in desilvering speed. The above stirring improving means is more effective when the bleaching accelerator is used, i.e., significantly increases the accelerating speed or eliminates fixing interference caused by the bleaching accelerator.

An automatic developing machine for processing the light-sensitive material of the present invention preferably has a light-sensitive material conveyor means described in JP-A-60-191257, JP-A-191258, or JP-A-60-191259. As described in JP-A-60-191257, this conveyor means can significantly reduce carry-over of a processing solution from a pre-bath to a post-bath, thereby effectively preventing degradation in performance of the processing solution. This effect significantly shortens especially a processing time in each processing step and reduces a processing solution replenishing amount.

The photographic light-sensitive material of the present invention is normally subjected to washing and/or stabilizing steps after desilvering. An amount of water used in the washing step can be arbitrarily determined over a broad range in accordance with the properties (e.g., a property determined by use of a coupler) of the light-sensitive material, the application of the material, the temperature of the water, the number of water tanks (the number of stages), a replenishing scheme representing a counter or forward current, and other conditions. The relationship between the amount of water and the number of water tanks in a multi-stage counter-current scheme can be obtained by a method described in "Journal of the Society of Motion Picture and Television Engineering", Vol. 64, PP. 248–253 (May, 1955).

According to the above-described multi-stage counter-current scheme, the amount of water used for washing can be greatly decreased. Since washing water stays in the tanks for a long period of time, however, bacteria multiply and floating substances may be undesirably attached to the light-sensitive material. In order to solve this problem in the process of the color photographic light-sensitive material of the present invention, a method of decreasing calcium and magnesium ions can be effectively utilized, as described in JP-A-62-288838. In addition, a germicide such as an isothiazolone compound and cyabendazole described in JP-A-57-8542, a chlorine-based germicide such as chlorinated sodium isocyanurate, and germicides such as benzotriazole described in Hiroshi Horiguchi et al., "Chemistry of Antibacterial and Antifungal Agents", (1986), Sankyo Shuppan, Eiseigijutsu-Kai ed., "Sterilization, Antibacterial, and Antifungal Techniques for Microorganisms", (1982), Kogyogijutsu-Kai, and Nippon Bokin Bokabi Gakkai ed., "Dictionary of Antibacterial and Antifungal Agents", (1986), can be used.

The pH of the water for washing the photographic light-sensitive material of the present invention is 4 to 9, and preferably, 5 to 8. The water temperature and the washing time can vary in accordance with the properties and applications of the light-sensitive material. Normally, the washing time is 20 seconds to 10 minutes at a temperature of 15° C. to 45° C., and preferably, 30 seconds to 5 minutes at 25° C. to 40° C. The light-sensitive material of the present invention can be processed directly by a stabilizing agent in place of washing. All known methods described in JP-A-57-8543, JP-A-58-14834, and JP-A-60-220345 can be used in such stabilizing processing.

Stabilizing is sometimes performed subsequently to washing. An example is a stabilizing bath containing a dye stabilizing agent and a surface-active agent to be used as a final bath of the photographic color light-sensitive material. Examples of the dye stabilizing agent are an aldehyde such as formalin and glutaraldehyde, an N-methylol compound, hexamethylenetetramine, and an aldehyde sulfurous acid adduct.

Various chelating agents or antifungal agents can be added in the stabilizing bath.

An overflow solution produced upon washing and/or replenishment of the stabilizing solution can be reused in another step such as a desilvering step.

In the processing using an automatic developing machine or the like, if each processing solution described above is condensed by evaporation, water is preferably added to correct condensation.

The silver halide color light-sensitive material of the present invention may contain a color developing agent in order to simplify processing and increases a processing speed. For this purpose, various types of precursors of a color developing agent can be preferably used. Examples of the precursor are an indoaniline-based compound described in U.S. Pat. No. 3,342,597, Schiff base compounds described in U.S. Pat. No. 3,342,599 and Research Disclosure (RD) Nos. 14,850 and 15,159, an aldol compound described in RD No. 13,924, a metal salt complex described in U.S. Pat. No. 3,719,492, and an urethane-based compound described in JP-A-53-135628.

The silver halide color light-sensitive material of the present invention may contain various 1-phenyl-3-pyrazolidones in order to accelerate color development, if necessary. Typical examples of the compound are described in JP-A-56-64339, JP-A-57-144547, and JP-A-58-115438.

Each processing solution in the present invention is used at a temperature of 10° C. to 50° C. Although a normal processing temperature is 33° C. to 38° C., processing may be accelerated at a higher temperature to shorten a processing time, or image quality or stability of a processing solution may be improved at a lower temperature.

The silver halide light-sensitive material of the present invention can be applied to thermal development light-sensitive materials described in, e.g., U.S. Pat. No. 4,500,626, JP-A-60-133449, JP-A-59-218443, JP-A-61-238056, and EP 210,660A2.

The present invention will be described in more detail below by way of its examples, but the present invention is not limited to these examples.

EXAMPLE 1

(1) Preparation of Emulsion

An aqueous solution obtained by dissolving 6 g of potassium bromide and 30 g inactive gelatin in 3.7 l of distilled water was strongly stirred, and a 14% potassium bromide aqueous solution and a 20% silver nitrate aqueous solution were added to the above aqueous solution at constant flow rates over one minute by a double jet method at a temperature of 55° C. and a pBr of 1.0 (in this addition, 2.4% of the total silver amount were consumed).

An aqueous gelatin solution (17%, 300 cc) was added, and the resultant solution was stirred at 55° C. Thereafter, a 20% silver nitrate aqueous solution was added at a constant flow rate until the pBr reached 1.4 (in this addition, 5.0% of the total silver amount were consumed). In addition, a 20% potassium bromide solution and a 33% silver nitrate aqueous solution were added to the resultant solution by the double jet method over 43 minutes (in this addition, 50% of the total silver amount were consumed). An aqueous solution containing 8.3 g of potassium iodide was added to the resultant solution, and a 20% potassium bromide solution and a 33% silver nitrate aqueous solution were added by the double jet method over 39 minutes (in this addition, 42.6% of the total silver amount were consumed). The silver nitrate amount used in this emulsion was 425 g. Subsequently, after desalting was performed by a conventional flocculation method, gold-plus-sulfur sensitization was optimally performed to prepare a tabular silver iodobromide emulsion (emulsion A) having an average aspect ratio of 6.5 and an equivalent-sphere diameter of 0.8 μm.

(2) Formation of Coating Samples

Sensitizing dyes and compounds of the present invention or comparative compounds were added to the emulsion A as listed in Table 1, and each of the resultant emulsions was coated in an amount as shown in Table 2 on a triacetylcellulose film support having an undercoating layer, thereby forming samples S-1 to S-9.

TABLE 1

| Sample name | Sensitizing dye amount* (with respect to saturated covering quantity) | Compound of present invention or comparative example: Compound type** | Addition amount | Remarks |
|---|---|---|---|---|
| S-1 | 50% | | | Comparative Example |
| S-2 | 80% | | | Comparative Example |
| S-3 | 50% | I-11 | $1 \times 10^{-5}$ mol/mol Ag | Present Invention |
| S-4 | 80% | I-11 | $1 \times 10^{-5}$ mol/mol Ag | Present Invention |
| S-5 | 80% | I-9 | $1 \times 10^{-5}$ mol/mol Ag | Present Invention |
| S-6 | 80% | I-4 | $5 \times 10^{-6}$ mol/mol Ag | Present Invention |
| S-7 | 80% | I-4 | $5 \times 10^{-7}$ mol/mol Ag | Present Invention |
| S-8 | 80% | Comparative compound (1) | $1 \times 10^{-5}$ mol/mol Ag | Comparative Example |
| S-9 | 80% | Comparative compound (2) | $1 \times 10^{-5}$ mol/mol Ag | Comparative Example |

*Sensitizing dye

TABLE 1-continued

| Sample name | Sensitizing dye amount* (with respect to saturated covering quantity) | Compound of present invention or comparative example: Compound type** | Compound of present invention or comparative example: Addition amount | Remarks |
|---|---|---|---|---|

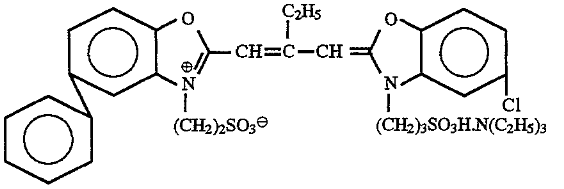

**The formulas of the compounds I-4, I-9, and I-11 are shown in Table A. The formulas of the comparative compounds (1) and (2) are as follows.

Comparative compound (1)

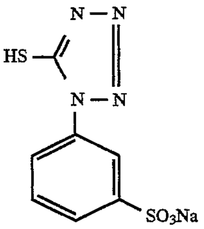

Comparative compound (2)

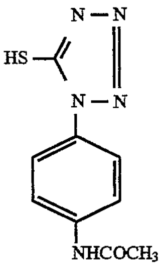

TABLE 2

| Emulsion Coating Conditions | |
|---|---|
| (1) Emulsion layer | |
| • Emulsion . . . Emulsion A | (silver $2.1 \times 10^{-2}$ mol/m$^2$) |
| • Coupler | ($1.5 \times 10^{-3}$ mol/m$^2$) |

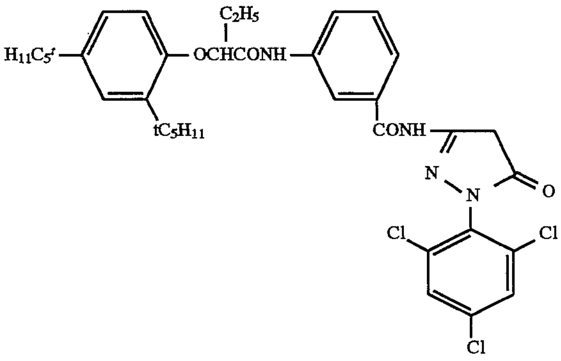

| | |
|---|---|
| • Tricresylphosphate | (1.10 g/m$^2$) |
| • Gelatin | (2.30 g/m$^2$) |

TABLE 2-continued

| Emulsion Coating Conditions | |
|---|---|
| (2) Protective layer | |
| • 2,4-dichloro-6-hydroxy-s-triazine sodium salt | (0.08 g/m$^2$) |
| • Gelatin | (1.80 g/m$^2$) |

These samples were left to stand at a temperature of 40° C. and a relative humidity of 70% for 14 hours and subjected to wedge exposure of 10 CMS for 1/100" through a yellow filter. The resultant samples were developed using the following processing solutions (Table 3), and their densities were measured. The response to pressure was tested as follows.

After each sample was left in an atmosphere at a relative humidity of 55% for three hours or more, a load of 4 g was applied to the sample in the same atmosphere by using a needle having a diameter of 0.1 mm, thereby scratching the emulsion surface at a speed of 1 cm/sec. After the sample was developed, its density was measured by an aperture having a diameter of 25 μm. The results are summarized in Table 4.

TABLE 3

Processing Method

| Process | Time | Temperature | Replenishing amount | Tank volume |
|---|---|---|---|---|
| Color development | 2 min. 45 sec. | 38° C. | 33 ml | 20 l |
| Bleaching | 6 min. 30 sec. | 38° C. | 25 ml | 40 l |
| Washing | 2 min. 10 sec. | 24° C. | 1,200 ml | 20 l |
| Fixing | 4 min. 20 sec. | 38° C. | 25 ml | 30 l |
| Washing (1) | 1 min. 05 sec. | 24° C. | Counter flow piping from (2) to (1) | 10 l |
| Washing (2) | 1 min. 00 sec. | 24° C. | 1,200 ml | 10 l |
| Stabilization | 1 min. 05 sec. | 38° C. | 25 ml | 10 l |
| Drying | 4 min. 20 sec. | 55° C. | | |

(A replenishing amount per meter of a 35-mm wide sample)

The compositions of the processing solutions will be presented below.

| | Mother solution (g) | Replenishment solution (g) |
|---|---|---|
| Color developing solution: | | |
| Diethylenetriamine-pentaacetic acid | 1.0 | 1.1 |
| 1-hydroxyethylidene-1,1-diphosphonic acid | 3.0 | 3.2 |
| Sodium sulfite | 4.0 | 4.4 |
| Potassium carbonate | 30.0 | 37.0 |
| Potassium bromide | 1.4 | 0.7 |
| Potassium iodide | 1.5 mg | — |
| Hydroxylamine sulfate | 2.4 | 2.8 |
| 4-(N-ethyl-N-β-hydroxylethylamino)-2-methylaniline sulfate | 4.5 | 5.5 |
| Water to make | 1.0 l | 1.0 l |
| pH | 10.05 | 10.10 |

-continued

| | Mother solution (g) | Replenishment solution (g) |
|---|---|---|
| Bleaching solution: | | |
| Ferric sodium ethylenediamine-tetraacetate trihydrate | 100.0 | 120.0 |
| ethylenediamine-tetraacetic acid disodium salt | 10.0 | 11.0 |
| Ammonium bromide | 140.0 | 160.0 |
| Ammonium nitrate | 30.0 | 35.0 |
| Ammonia water (27%) | 6.5 ml | 4.0 ml |
| Water to make | 1.0 l | 1.0 l |
| pH | 6.0 | 5.7 |
| Fixing solution: | | |
| Disodium ethylene-diaminetetraacetate | 0.5 | 0.7 |
| Sodium sulfite | 7.0 | 8.0 |
| Sodium bisulfite | 5.0 | 5.5 |
| Ammonium thiosulfate aqueous solution (70%) | 170.0 ml | 200.0 ml |
| Water to make | 1.0 l | 1.0 l |
| pH | 6.7 | 6.6 |
| Stabilizing solution: | | |
| Formalin (37%) | 2.0 ml | 3.0 ml |
| Polyoxyethylene-p-monononylphenylether (average polymeri-zation degree = 10) | 0.3 | 0.45 |
| ethylenediame-tetraacetic acid disodium salt | 0.05 | 0.08 |
| Water to make | 1.0 | 1.0 |
| pH | 5.8–8.0 | 5.8–8.0 |

TABLE 4

| Emulsion | Sensitiv-ity* | Fog increase caused by scratching | Remarks |
|---|---|---|---|
| S-1 | 80 | 0.20 | Comparative Example |
| S-2 | 100 | 0.32 | Comparative Example |
| S-3 | 78 | 0.14 | Present Invention |
| S-4 | 98 | 0.16 | Present Invention |
| S-5 | 102 | 0.15 | Present Invention |
| S-6 | 100 | 0.16 | Present Invention |
| S-7 | 103 | 0.20 | Present Invention |
| S-8 | 102 | 0.32 | Comparative Example |
| S-9 | 98 | 0.31 | Comparative Example |

*The sensitivity is represented by a relative value of a reciprocal of an exposure amount for giving a density of fog + 0.2.

It is apparent that the fog increase caused by scratching was decreased in samples S-3 to S-7 of the present invention. In addition, the fog increase caused by scratching was increased as the sensitizing dye amount was increased, and the compound of the present invention exhibited a significant effect when the dye amount was 80% of the saturated covering quantity.

EXAMPLE 2

The sensitizing dye of Example 1 was added before the chemical sensitization to form samples S-10 to S-18 (S-10 to S-18 correspond to S-1 to S-9, respectively).

As in Example 1, the fog increase caused by scratching was decreased by the compounds of the present invention.

EXAMPLE 3

(1) Preparation of Emulsion B

The amount of potassium bromide in the reactor vessel of the emulsion A of Example 1, and the gelatin amounts, the temperatures, and the addition time of the solution in the reactor vessel and the solution to be added to the reactor vessel were adjusted to prepare silver iodobromide tabular grains having an average aspect ratio of 6.8 and an equivalent-sphere diameter of 0.70 μm.

(2) Preparation of Emulsion C

A monodisperse octahedral silver iodobromide emulsion containing 3.5 mol % of iodide and having a homogeneous structure was prepared in accordance with a conventional method. The pH and pAg of the emulsion were adjusted to be 6.5 and 8.5, respectively, at a temperature of 40° C., and the gold-plus-sulfur sensitization was optimally performed. This emulsion comprised monodisperse octahedral grains having an equivalent-sphere diameter of 0.73 μm and a variation coefficient of 14%.

(3) Formation of Sample 101

A plurality of layers having the following compositions were coated on an undercoated triacetylcellulose film support to form a multilayered color light-sensitive material.

Compositions of Light-Sensitive Layers

Numerals corresponding to each component indicates a coating amount represented in units of $g/m^2$. The coating amount of a silver halide is represented by the coating amount of silver. The coating amount of a sensitizing dye is represented in units of mols per mol of a silver halide in the same layer.

| | |
|---|---|
| Layer 1: Antihalation layer | |
| Black colloidal silver silver | 0.18 |
| Gelatin | 1.40 |
| Layer 2: Interlayer | |
| 2,5-di-t-pentadecylhydroquinone | 0.18 |
| EX-1 | 0.07 |
| EX-3 | 0.02 |
| EX-12 | 0.002 |
| U-1 | 0.06 |
| U-2 | 0.08 |
| U-3 | 0.10 |
| HBS-1 | 0.10 |
| HBS-2 | 0.02 |
| Gelatin | 1.04 |
| Layer 3: Donor layer having interlayer effect on red-sensitive layer | |
| Emulsion (8) silver | 1.2 |
| Emulsion (3) silver | 2.0 |
| Sensitizing dye IV | $4 \times 10^{-4}$ |
| EX-10 | 0.10 |
| HBS-1 | 0.10 |
| HBS-2 | 0.10 |

-continued

| | |
|---|---|
| Gelatin | 2.0 |
| Layer 4: Interlayer | |
| EX-5 | 0.040 |
| HBS-1 | 0.020 |
| Gelatin | 0.80 |
| Layer 5: 1st red-sensitive emulsion layer | |
| Emulsion ① silver | 0.25 |
| Emulsion ② silver | 0.25 |
| Sensitizing dye I | $1.5 \times 10^{-4}$ |
| Sensitizing dye II | $1.8 \times 10^{-5}$ |
| Sensitizing dye III | $2.5 \times 10^{-4}$ |
| EX-2 | 0.335 |
| EX-10 | 0.020 |
| U-1 | 0.07 |
| U-2 | 0.05 |
| U-3 | 0.07 |
| HBS-1 | 0.060 |
| Gelatin | 0.87 |
| Layer 6: 2nd red-sensitive emulsion layer | |
| Emulsion ⑦ silver | 1.0 |
| Sensitizing dye I | $1.0 \times 10^{-4}$ |
| Sensitizing dye II | $1.4 \times 10^{-5}$ |
| Sensitizing dye III | $2.0 \times 10^{-4}$ |
| EX-2 | 0.400 |
| EX-3 | 0.050 |
| EX-10 | 0.015 |
| U-1 | 0.07 |
| U-2 | 0.05 |
| U-3 | 0.07 |
| Gelatin | 1.30 |
| Layer 7: 3rd red-sensitive emulsion layer | |
| Emulsion ④ silver | 1.60 |
| Sensitizing dye I | $1.0 \times 10^{-4}$ |
| Sensitizing dye II | $1.4 \times 10^{-5}$ |
| Sensitizing dye III | $2.0 \times 10^{-4}$ |
| EX-3 | 0.010 |
| EX-4 | 0.080 |
| EX-2 | 0.097 |
| HBS-1 | 0.22 |
| HBS-2 | 0.10 |
| Gelatin | 1.63 |
| Layer 8: Interlayer | |
| EX-5 | 0.040 |
| HBS-1 | 0.020 |
| Gelatin | 0.80 |
| Layer 9: 1st green-sensitive emulsion layer | |
| Emulsion ① silver | 0.15 |
| Emulsion ② silver | 0.15 |
| Sensitizing dye V | $3.0 \times 10^{-5}$ |
| Sensitizing dye VI | $1.0 \times 10^{-4}$ |
| Sensitizing dye VII | $3.8 \times 10^{-4}$ |
| Sensitizing dye IV | $5.0 \times 10^{-5}$ |
| EX-6 | 0.260 |
| EX-1 | 0.021 |
| EX-7 | 0.030 |
| EX-8 | 0.005 |
| HBS-1 | 0.100 |
| HBS-3 | 0.010 |
| Gelatin | 0.63 |
| Layer 10: 2nd green-sensitive emulsion layer | |
| Emulsion ③ silver | 0.45 |
| Sensitizing dye V | $2.1 \times 10^{-5}$ |
| Sensitizing dye VI | $7.0 \times 10^{-5}$ |
| Sensitizing dye VII | $2.6 \times 10^{-4}$ |
| Sensitizing dye IV | $5.0 \times 10^{-5}$ |
| EX-6 | 0.094 |
| EX-22 | 0.018 |
| EX-7 | 0.026 |
| HBS-1 | 0.160 |
| HBS-3 | 0.008 |
| Gelatin | 0.50 |

-continued

| | |
|---|---|
| Layer 11: 3rd green-sensitive emulsion layer | |
| Emulsion silver | 1.2 |
| Sensitizing dye V | $3.5 \times 10^{-5}$ |
| Sensitizing dye VI | $8.0 \times 10^{-5}$ |
| Sensitizing dye VII | $3.0 \times 10^{-4}$ |
| Sensitizing dye IV | $0.5 \times 10^{-5}$ |
| EX-13 | 0.015 |
| EX-11 | 0.100 |
| EX-1 | 0.025 |
| HBS-1 | 0.25 |
| HBS-2 | 0.10 |
| Gelatin | 1.54 |
| Layer 12: Yellow filter layer | |
| Yellow colloidal silver silver | 0.05 |
| EX-5 | 0.08 |
| HBS-1 | 0.03 |
| Gelatin | 0.95 |
| Layer 13: 1st blue-sensitive emulsion layer | |
| Emulsion ① silver | 0.08 |
| Emulsion ② silver | 0.07 |
| Emulsion ③ silver | 0.07 |
| Sensitizing dye VIII | $3.5 \times 10^{-4}$ |
| EX-9 | 0.721 |
| EX-8 | 0.042 |
| HBS-1 | 0.28 |
| Gelatin | 1.10 |
| Layer 14: 2nd blue-sensitive emulsion layer | |
| Emulsion B silver | 0.45 |
| Sensitizing dye VIII | $4.5 \times 10^{-4}$ |
| EX-9 | 0.154 |
| EX-10 | 0.007 |
| HBS-1 | 0.05 |
| Gelatin | 0.78 |
| Layer 15: 3rd blue-sensitive emulsion layer | |
| Emulsion ⑧ silver | 0.77 |
| Sensitizing dye VIII | $2.2 \times 10^{-4}$ |
| EX-9 | 0.20 |
| HBS-1 | 0.07 |
| Gelatin | 0.69 |
| Layer 16: 1st protective layer | |
| Emulsion ⑨ silver | 0.20 |
| U-4 | 0.11 |
| U-5 | 0.17 |
| HBS-1 | 0.05 |
| Gelatin | 1.00 |
| Layer 17: 2nd protective layer | |
| Polymethylacrylate grains (diameter = about 1.5 μm) | 0.54 |
| S-1 | 0.20 |
| Gelatin | 1.20 |

In addition to the above components, a gelatin hardener H-1, EX-14 to EX-21, and a surfactant were added to the respective layers. The contents of the emulsions ① to ⑨ used are summarized in Table 5 below, and the formulas of the compounds will be listed in Table B to be presented later.

TABLE 5

| Emulsion No. | Average AgI content (%) | Average grain size (μm) | Variation coefficient (%) according to grain size | Diameter/ thickness ratio | Silver amount ratio (AgI content %) |
|---|---|---|---|---|---|
| Emulsion ① | 4.0 | 0.45 | 27 | 1 | Core/sheel = 1/3(13/1), Double structure grain |
| Emulsion ② | 8.9 | 0.70 | 14 | 1 | Core/sheel = 3/7(25/2), Double structure grain |
| Emulsion ③ | 10 | 0.75 | 30 | 2 | Core/sheel = 1/2(24/3), Double structure grain |
| Emulsion ④ | 16 | 1.05 | 35 | 2 | Core/sheel = 4/6(40/0), Double structure grain |
| Emulsion ⑤ | 10 | 1.05 | 35 | 3 | Core/sheel = 1/2(24/3), Double structure grain |
| Emulsion ⑥ | 4.0 | 0.25 | 28 | 1 | Core/sheel = 1/3(13/1), Double structure grain |
| Emulsion ⑦ | 14.0 | 0.75 | 25 | 2 | Core/sheel = 1/2(42/0), Double structure grain |
| Emulsion ⑧ | 14.5 | 1.30 | 25 | 3 | Core/sheel = 37/63(34/3) Double structure grain |
| Emulsion ⑨ | 1 | 0.07 | 15 | 1 | Uniform grain |

Formation of Sample 102

An emulsion C was used in place of the emulsion B of the layer 14 of the sample 101, and the dye amount was changed to $2.8\times10^{-4}$ mol/mol Ag.

Formation of Sample 103

A compound (I-9 of Table A) of the present invention was added in an amount of $4\times10^{-5}$ g/m$^2$ to the layer 14 of the sample 101.

Formation of Sample 104

The dye amount of the layer 14 of the sample 101 was changed to $7.9\times10^{-4}$ mol/mol Ag.

Formation of Sample 105

The dye amount of the layer 14 of the sample 103 was changed to $7.9\times10^{-4}$ mol/mol Ag.

Formation of Sample 106

The compound (I-9) of the layer 14 of the sample 103 was changed to the comparative compound (1).

Formation of Sample 107

The compound (I-9) of the layer 14 of the sample 103 was changed to the comparative compound (2).

The samples 101 to 107 thus formed were wedge-exposed with white light and developed following the same procedures as in Example 1. (Not that the color development time was 3'15".)

The yellow density of each resultant sample was measured, and the sensitivity was represented by a relative value of a logarithm of a reciprocal of an exposure amount for giving a density of fog density+1.0.

The response to pressure was obtained by measuring a change in yellow density following the same procedures as in Example 1.

The sharpness was evaluated by measuring the MTF. The MTF was measured by a method described in "Journal of Applied Photographic Engineering", Vol. 6(1), PP. 1 to 8 (1980). The value of MTF was represented by a relative value of the value of the green-sensitive layer measured by a G filter assuming that the value of the sample 101 was 100.

TABLE 6

| Sample No. | Emulsion of layer 14 | Dye amount* | Compound of present invention or comparative example | Sensi-tivity | Fog increase caused by scratching | MTF | Remarks |
|---|---|---|---|---|---|---|---|
| 101 | Tabular grains having average aspect ratio of 6.8 (emulsion B) | 45% | — | 100 | 0.23 | 100 | Compara-tive Example |
| 102 | Monodisperse octahedral grains (emulsion C) | 45% | — | 95 | 0.10 | 70 | Compara-tive Example |
| 103 | Tabular grains having average aspect ratio of 6.8 (emulsion B) | 45% | I-9 | 100 | 0.14 | 100 | Present Inven-tion |
| 104 | Tabular grains having average aspect ratio of 6.8 (emulsion B) | 80% | — | 130 | 0.33 | 100 | Compara-tive Example |
| 105 | Tabular grains having average aspect ratio | 80% | I-9 | 130 | 0.16 | 100 | Present Inven- |

TABLE 6-continued

| Sample No. | Emulsion of layer 14 | Dye amount* | Compound of present invention or comparative example | Sensitivity | Fog increase caused by scratching | MTF | Remarks |
|---|---|---|---|---|---|---|---|
| | of 6.8 (emulsion B) | | | | | | tion |
| 106 | Tabular grains having average aspect ratio of 6.8 (emulsion B) | 45% | Comparative compound (1) | 98 | 0.21 | 100 | Comparative Example |
| 107 | Tabular grains having average aspect ratio of 6.8 (emulsion B) | 45% | Comparative compound (2) | 96 | 0.22 | 100 | Comparative Example |

*Dye amount is represented by the ratio to the Saturated adsarption quantity.

When the tabular grains (emulsion B) were used, an amount of pressure marks was significantly increased though the sharpness of the green-sensitive layer was improved. The amount of pressure marks can be decreased by the compounds of the present invention. When the amount of the sensitizing dye was increased to improve the sensitivity (i.e., to achieve the advantage of the tabular grains), the pressure mark amount was further increased. However, this increase was eliminated by the compounds of the present invention.

EXAMPLE 4

(1) Preparation of Emulsion

Silver iodobromide double twinned crystal grains having an average iodide content of 20 mol %, an average equivalent-sphere diameter of 0.55 μm, a variation coefficient of a grain size of 18%, and an average aspect ratio of 4.0 were used as seed crystals to perform shell formation by a controlled double jet method for 30 minutes under the conditions that the silver potential in an aqueous gelatin solution was −40 mV. A core/shell ratio (silver amount) was set at 1:2, and a potassium bromide/potassium iodide ratio was changed within the range of 100:0 to 91:9 in the composition of the halogen solution. When 10% of the shell formation were finished, $2\times10^{-5}$ mol/mol Ag of a thiourea dioxide solution were added to perform reduction sensitization. In an emulsion added with $2\times10^{-3}$ mol/mol Ag of a sodium thiocyanate solution when 80% of the shell formation were finished, the control of the silver potential was corrected to 0 mV, and addition of the halogen solution was continued until the potential returned to −40 mV after a silver nitrate solution was finished.

Thus, six emulsions 1 to 6 shown in Table 7 were prepared.

Table 7 shows the surface iodide contents of the emulsions used in Example 4 measured using the XPS. Subsequently, desairing was performed by a conventional flocculation method, the sensitizing dye (A) of the Example 1 was added, and chloroauric acid, sodium thiosulfate, dimethylselenourea, and sodium thiocyanate were added to optimally perform chemical sensitization.

TABLE 7

| Sample name | Emulsion name | Surface iodide content | Thiocyanic acid | Thiourea dioxide | Compound of present invention or comparative example* | | Sensitivity | Fog | Fog increase caused by scratching | Remarks |
|---|---|---|---|---|---|---|---|---|---|---|
| S-41 | Emulsion-1 | 10 mol % | $2\times10^{-3}$ mol | $2\times10^{-5}$ mol | | | 145 | 0.16 | 0.32 | Comparative Example |
| S-42 | Emulsion-1 | 10 mol % | $2\times10^{-3}$ mol | $2\times10^{-5}$ mol | I-4 | $10^{-5}$ mol | 142 | 0.14 | 0.16 | Present Invention |
| S-43 | Emulsion-1 | 10 mol % | $2\times10^{-3}$ mol | $2\times10^{-5}$ mol | I-9 | $10^{-5}$ mol | 148 | 0.15 | 0.17 | Present Invention |
| S-44 | Emulsion-1 | 10 mol % | $2\times10^{-3}$ mol | $2\times10^{-5}$ mol | I-11 | $5\times10^{-6}$ mol | 142 | 0.16 | 0.15 | Present Invention |
| S-45 | Emulsion-1 | 10 mol % | $2\times10^{-3}$ mol | $2\times10^{-5}$ mol | Comparative compound (1) | $10^{-5}$ mol | 140 | 0.13 | 0.30 | Comparative Example |
| S-46 | Emulsion-1 | 10 mol % | $2\times10^{-3}$ mol | $2\times10^{-5}$ mol | Comparative compound (2) | $10^{-5}$ mol | 148 | 0.13 | 0.28 | Comparative Example |
| S-47 | Emulsion-2 | 10 mol % | $2\times10^{-3}$ mol | None | | | 129 | 0.15 | 0.28 | Comparative Example |
| S-48 | Emulsion-2 | 10 mol % | $2\times10^{-3}$ mol | None | I-9 | $10^{-5}$ mol | 131 | 0.16 | 0.14 | Present Invention |
| S-49 | Emulsion-3 | 9.5 mol % | None | None | | | 115 | 0.13 | 0.23 | Comparative Example |
| S-50 | Emulsion-3 | 9.5 mol % | None | None | I-9 | $10^{-5}$ mol | 110 | 0.13 | 0.13 | Present Invention |
| S-51 | Emulsion-4 | 5.5 mol % | $2\times10^{-3}$ mol | None | | | 135 | 0.15 | 0.25 | Comparative Example |
| S-52 | Emulsion-4 | 5.5 mol % | $2\times10^{-3}$ mol | None | I-9 | $10^{-5}$ mol | 138 | 0.15 | 0.13 | Present Invention |
| S-53 | Emulsion-5 | 2.6 mol % | None | None | | | 106 | 0.14 | 0.20 | Comparative |

TABLE 7-continued

| Sample name | Emulsion name | Surface iodide content | Thiocyanic acid | Thiourea dioxide | Compound of present invention or comparative example* | | Sensitivity | Fog | Fog increase caused by scratching | Remarks |
|---|---|---|---|---|---|---|---|---|---|---|
| S-54 | Emulsion-5 | 2.6 mol % | None | None | I-9 | $10^{-5}$ mol | 107 | 0.13 | 0.17 | Example Present Invention |
| S-55 | Emulsion-6 | 0.5 mol % | None | None | | | 100 | 0.15 | 0.18 | Comparative Example |
| S-56 | Emulsion-6 | 0.5 mol % | None | None | I-9 | $10^{-5}$ mol | 90 | 0.14 | 0.16 | Comparative Example |

*Comparative compounds 91) and (2) are the same as shown in Example 1

(2) Formation of Coating Samples

Each of the compounds of the present invention and comparative examples listed in Table 7 was added to the emulsions 1 to 6, and each resultant emulsion was coated on a triacetylcellulose film support having an undercoating layer under the conditions shown in Table 2 shown in Example 1, thereby forming 16 types of coating samples (S-41 to S-56).

Sensitivities and fog increases caused by scratching of these samples are measured following the same procedure as in Example 1. The results are shown in Table 7.

As is apparent from Table 7, to increase the iodide content on the grain surface, the use of a comparatively large amount of a thiocyanate compound, and the reduction sensitization are effective to increase the sensitivity, but the fog increase caused by scratching is significant. Each compound of the present invention can decrease the fog increase caused by scratching without essentially decreasing the sensitivity. Such a significant effect cannot be obtained by a conventionally known mercapto compound.

EXAMPLE 5

Emulsions D and E in each of which an average grain size of final grains was 1.05 μm and their aspect ratio was about 3.5 were prepared following the same procedures as for the emulsions 1 and 6 of Example 4. It was confirmed by the XPS that the surface iodide content of the emulsion D was 9.6 mol % and that of the emulsion E was 0.5 mol %. The emulsions D and E were added with sensitizing dyes I, II, and III in amounts listed in the layer 7 shown in the description of compositions of light-sensitive layers and optimally subjected to gold-plus-sulfur sensitization, thereby preparing emulsions D-1 and E-1. Similarly, the emulsions D and E were added with sensitizing dyes IV, V, VI, and VII in amounts listed in the layer 11 shown in the description of compositions of light-sensitive layers and optimally subjected to gold-plus-sulfur sensitization, thereby preparing emulsions D-2 and E-2. Similarly, the emulsions D and E were added with a sensitizing dye VIII in an amount listed in the layer 15 and optimally subjected to gold-plus-sulfur sensitization, thereby preparing emulsions D-3 and E-3.

A plurality of layers having the following compositions were coated on an undercoated triacetylcellulose film support to form a multilayered color photographic light-sensitive material. In a sample 501, the emulsions D-1, D-2, and D-3 were used in the layers 7, 11, and 15, respectively. In a sample 502, a compound I-4 of the present invention was added in an amount of $10^{-5}$ mol per mol of a silver halide to the emulsions (D-1, D-2, and D-3) of the layers 7, 11, and 15. In a sample 503, a compound I-9 was added in an amount of $10^{-5}$ mol per mol of a silver halide to the emulsions (D-1, D-2, and D-3) of the layers 7, 11, and 15. In a sample 504, the emulsions E-1, E-2, and E-3 were used in the respective layers. The contents of emulsions ⑪ to ⑰ used in these samples are shown Table 8.

TABLE 8

| Emulsion No. | Average AgI content (%) | Average grain size (μm) | Variation coefficient (%) according to grain size | Diameter/thickness ratio | Silver amount ratio (AgI content %) |
|---|---|---|---|---|---|
| Emulsion ⑪ | 4.0 | 0.45 | 27 | 1 | Core/sheel = 1/3(13/1), Double structure grain |
| Emulsion ⑫ | 8.9 | 0.70 | 14 | 1 | Core/sheel = 3/7(25/2), Double structure grain |
| Emulsion ⑬ | 10 | 0.75 | 30 | 2 | Core/sheel = 1/2(24/3), Double structure grain |
| Emulsion ⑭ | 4.0 | 0.25 | 35 | 2 | Core/sheel = 1/3(13/1), Double structure grain |
| Emulsion ⑮ | 14 | 0.75 | 28 | 1 | Core/sheel = 1/2(42/0), Double structure grain |
| Emulsion ⑯ | 14.5 | 1.30 | 25 | 3 | Core/sheel = 37/63(34/3) Double structure grain |
| Emulsion ⑰ | 1 | 0.07 | 25 | 2 | homogeneous grain |

Compositions of Light-sensitive Layers

Numerals corresponding to each component indicates a coating amount represented in units of g/$m^2$. The coating amount of a silver halide is represented by the coating amount of silver. The coating amount of a sensitizing dye is represented in units of mols per mol of a silver halide in the same layer.

| | | |
|---|---|---|
| Layer 1: Antihalation layer | | |
| Black colloidal silver | silver | 0.18 |
| Gelatin | | 1.40 |
| Layer 2: Interlayer | | |
| 2,5-di-t-pentadecylhydroquinone | | 0.18 |
| EX-1 | | 0.07 |
| EX-3 | | 0.02 |
| EX-12 | | 0.002 |
| U-1 | | 0.06 |
| U-2 | | 0.08 |
| U-3 | | 0.10 |
| HBS-1 | | 0.10 |
| HBS-2 | | 0.02 |
| Gelatin | | 1.04 |
| Layer 3: Donor layer having interlayer effect on red-sensitive layer | | |
| Emulsion ⑯ | silver | 1.2 |
| Emulsion ⑬ | silver | 2.0 |
| Sensitizing dye IV | | $4 \times 10^{-4}$ |
| EX-10 | | 0.10 |
| HBS-1 | | 0.10 |
| HBS-2 | | 0.10 |
| Gelatin | | 0.87 |
| Layer 4: Interlayer | | |
| EX-5 | | 0.040 |
| HBS-1 | | 0.020 |
| Gelatin | | 0.10 |
| Layer 5: 1st red-sensitive emulsion layer | | |
| Emulsion ⑪ | silver | 0.25 |
| Emulsion ⑫ | silver | 0.25 |
| Sensitizing dye I | | $1.5 \times 10^{-4}$ |
| Sensitizing dye II | | $1.8 \times 10^{-5}$ |
| Sensitizing dye III | | $2.5 \times 10^{-4}$ |
| EX-2 | | 0.335 |
| EX-10 | | 0.020 |
| U-1 | | 0.07 |
| U-2 | | 0.05 |
| U-3 | | 0.07 |
| HBS-1 | | 0.060 |
| Gelatin | | 0.87 |
| Layer 6: 2nd red-sensitive emulsion layer | | |
| Emulsion ⑮ | silver | 1.0 |
| Sensitizing dye I | | $1.5 \times 10^{-4}$ |
| Sensitizing dye II | | $1.8 \times 10^{-5}$ |
| Sensitizing dye III | | $2.5 \times 10^{-4}$ |
| EX-2 | | 0.400 |
| EX-3 | | 0.050 |
| EX-10 | | 0.015 |
| U-1 | | 0.07 |
| U-2 | | 0.05 |
| U-3 | | 0.07 |
| Gelatin | | 1.30 |
| Layer 7: 3rd red-sensitive emulsion layer | | |
| Emulsion D-1 or E-1 | silver | 1.60 |
| (Sensitizing dye I | | $1.0 \times 10^{-4}$ |
| Sensitizing dye II | | $1.4 \times 10^{-5}$ |
| Sensitizing dye III | | $2.0 \times 10^{-4}$) |
| EX-3 | | 0.010 |
| EX-4 | | 0.080 |
| EX-2 | | 0.097 |
| HBS-1 | | 0.22 |
| HBS-2 | | 0.10 |
| Gelatin | | 1.63 |
| Layer 8: Interlayer | | |
| EX-5 | | 0.040 |
| HBS-1 | | 0.020 |
| Gelatin | | 0.80 |

-continued

| | | |
|---|---|---|
| Layer 9: 1st green-sensitive emulsion layer | | |
| Emulsion ⑪ | silver | 0.15 |
| Emulsion ⑫ | silver | 0.15 |
| Sensitizing dye V | | $3.0 \times 10^{-5}$ |
| Sensitizing dye VI | | $1.0 \times 10^{-4}$ |
| Sensitizing dye VII | | $3.8 \times 10^{-4}$ |
| Sensitizing dye IV | | $5.0 \times 10^{-5}$ |
| EX-6 | | 0.260 |
| EX-1 | | 0.021 |
| EX-7 | | 0.030 |
| EX-8 | | 0.005 |
| HBS-1 | | 0.100 |
| HBS-3 | | 0.010 |
| Gelatin | | 0.63 |
| Layer 10: 2nd green-sensitive emulsion layer | | |
| Emulsion ⑬ | silver | 0.45 |
| Sensitizing dye V | | $2.1 \times 10^{-5}$ |
| Sensitizing dye VI | | $7.0 \times 10^{-5}$ |
| Sensitizing dye VII | | $2.6 \times 10^{-4}$ |
| Sensitizing dye IV | | $5.0 \times 10^{-5}$ |
| EX-6 | | 0.094 |
| EX-22 | | 0.018 |
| EX-7 | | 0.026 |
| HBS-1 | | 0.160 |
| HBS-3 | | 0.008 |
| Gelatin | | 0.50 |
| Layer 11: 3rd green-sensitive emulsion layer | | |
| Emulsion D-2 or E-2 | silver | 1.2 |
| (Sensitizing dye V | | $3.5 \times 10^{-5}$ |
| Sensitizing dye VI | | $8.0 \times 10^{-5}$ |
| Sensitizing dye VII | | $3.0 \times 10^{-4}$ |
| Sensitizing dye IV | | $0.5 \times 10^{-5}$) |
| EX-13 | | 0.015 |
| EX-11 | | 0.100 |
| EX-1 | | 0.025 |
| HBS-1 | | 0.25 |
| HBS-2 | | 0.10 |
| Gelatin | | 1.54 |
| Layer 12: Yellow filter layer | | |
| Yellow colloidal silver | silver | 0.05 |
| EX-5 | | 0.08 |
| HBS-1 | | 0.03 |
| Gelatin | | 0.95 |
| Layer 13: 1st blue-sensitive emulsion layer | | |
| Emulsion ⑪ | silver | 0.08 |
| Emulsion ⑫ | silver | 0.07 |
| Emulsion ⑭ | silver | 0.07 |
| Sensitizing dye VIII | | $3.5 \times 10^{-4}$ |
| EX-9 | | 0.721 |
| EX-8 | | 0.042 |
| HBS-1 | | 0.28 |
| Gelatin | | 1.10 |
| Layer 14: 2nd blue-sensitive emulsion layer | | |
| Emulsion ⑮ | silver | 0.45 |
| (Sensitizing dye VIII | | $3.0 \times 10^{-4}$ |
| EX-9 | | 0.154 |
| EX-10 | | 0.007 |
| HBS-1 | | 0.05 |
| Gelatin | | 0.78 |
| Layer 15: 3rd blue-sensitive emulsion layer | | |
| Emulsion D-3 or E-3 | silver | 0.77 |
| (Sensitizing dye VIII | | $2.2 \times 10^{-4}$) |
| EX-9 | | 0.20 |
| HBS-1 | | 0.07 |
| Gelatin | | 0.69 |
| Layer 16: 1st protective layer | | |
| Emulsion ⑰ | silver | 0.20 |
| U-4 | | 0.11 |
| U-5 | | 0.17 |
| HBS-1 | | 0.05 |

-continued

| | |
|---|---|
| Gelatin | 1.00 |
| Layer 17: 2nd protective layer | |
| Polymethylacrylate grains (diameter = about 1.5 μm) | 0.54 |
| S-1 | 0.20 |
| Gelatin | 1.20 |

In addition to the above components, a gelatin hardener H-1, EX-14 to EX-21, and a surfactant were added to the respective layers. The formulas of the compounds used will be listed in Table B to be presented later.

The samples 501 to 504 thus formed were wedge-exposed with white light and developed following the same procedures as in Example 1. (Note that the color development time was 3'15".)

The response to pressure was evaluated following the same procedures as in Example 1.

In any of the red-, green-, and blue-sensitive layers of the multilayered coating sample, the emulsions D-1, D-2, and D-3 (sample 501) had higher sensitivities than those of the emulsions E-1, E-2, and E-3 (sample 5-4) but caused a significant increase in scratch fog and therefore could not be put into practical use. It was confirmed that the samples 502 and 503 added with the compound I-4 or I-9 of the present invention significantly improved the scratch fog without decreasing the sensitivity. Therefore, when the emulsions and the compounds of the present invention are simultaneously used, both of the high sensitivity and the high resistance to pressure can be achieved.

EXAMPLE 6

An ammoniacal silver nitrate aqueous solution (50% of the total silver amount) was added to an aqueous gelatin solution containing potassium bromide and potassium iodide by a single-jet method over two minutes, and physical ripening was performed for 15 minutes. Thereafter, the silver nitrate aqueous solution and an aqueous solution mixture of potassium bromide and potassium iodide were added by a double-jet method to grow grains, thereby preparing an emulsion F. The emulsion F comprised so-called potato-like irregular grains. The grain size (equivalent-sphere diameter) was 1.3 μm, the size distribution (variation coefficient) was 18%, and the average silver iodide content was 4 mol %.

Octahedral silver bromide grains having a grain size of 0.3 μm were used as seed crystals and a silver nitrate aqueous solution and an aqueous solution mixture of potassium bromide and potassium iodide were added by the double-jet method (control potential=−40 mv) to grow grains. The flow rate of the addition solution was accelerated to be a linear function with respect to a time such that the final rate was 10 times the initial rate, thereby preparing an emulsion G. The emulsion G comprised octahedral regular crystal grains having a (111) face ratio of 98%. The grain size (equivalent-sphere diameter) was 1.3 μm, the size distribution (variation coefficient) was 8%, and the average silver iodide content was 4 mol %.

After desalted, the emulsions F and G were added with the compound (B) and then added with chloroauric acid, sodium thiosulfate, dimethylselenourea, and sodium thiocyanate, thereby optimally performing chemical sensitization.

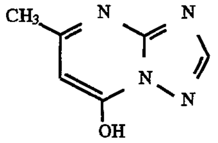

Compound (B)

In the grain formation step of the emulsion G, when 90% of the total silver amount were added, sodium thiocyanate was added in an amount of $2\times10^{-3}$ mol per mol of silver, and the control silver potential was changed to −10 mV. After the silver nitrate solution was finished, addition of the halogen solution was continued until the potential returned to −40 mV. This emulsion was similarly subjected to chemical sensitization to prepare an emulsion H.

In the grain formation step of the emulsion H, thiourea dioxide was added in an amount of $2\times10^{-5}$ mol per mol of silver when 20% of the total silver amount were added, thereby performing reduction sensitization. Similarly, chemical sensitization was performed to prepare an emulsion I. The emulsions F to I were added with compounds of the present invention or comparative examples shown in Table 9 and coated on undercoated triacetylcellulose film supports under the conditions shown in Table 2, thereby forming samples 601 to 612. Tests were conducted following the same procedures as in Example 1 except that exposure was performed by using a blue filter. The test results are summarized in Table 9. As is apparent from Table 9, the present invention is excellent in sensitivity, gradation, and a resistance to pressure.

TABLE 9

| Sample name | Emulsion name | Form of grains | Thiocyanic acid | Thiourea dioxide | Compound of present invention or comparative example | | Sensitivity | Fog | Fog increase caused by scratching | Remarks |
|---|---|---|---|---|---|---|---|---|---|---|
| S-601 | Emulsion-I | Regular crystal octahedron | $2\times10^{-3}$ mol | $2\times10^{-5}$ mol | | | 121 | 1.10 | 0.35 | Comparative Example |
| S-602 | Emulsion-I | Regular crystal octahedron | $2\times10^{-3}$ mol | $2\times10^{-5}$ mol | I-4 | $1\times10^{-5}$ mol | 118 | 1.14 | 0.15 | Present Invention |
| S-603 | Emulsion-I | Regular crystal octahedron | $2\times10^{-3}$ mol | $2\times10^{-5}$ mol | I-9 | $1\times10^{-5}$ mol | 122 | 1.10 | 0.17 | Present Invention |
| S-604 | Emulsion-I | Regular crystal | $2\times10^{-3}$ mol | $2\times10^{-5}$ mol | I-11 | $1\times10^{-6}$ mol | 120 | 1.12 | 0.16 | Present Invention |

TABLE 9-continued

| Sample name | Emulsion name | Form of grains | Thiocyanic acid | Thiourea dioxide | Compound of present invention or comparative example | | Sensitivity | Fog | Fog increase caused by scratching | Remarks |
|---|---|---|---|---|---|---|---|---|---|---|
| S-605 | Emulsion-I | Regular crystal octahedron | $2 \times 10^{-3}$ mol | $2 \times 10^{-5}$ mol | Comparative compound (1) | $1 \times 10^{-5}$ mol | 115 | 1.05 | 0.33 | Comparative Example |
| S-606 | Emulsion-I | Regular crystal octahedron | $2 \times 10^{-3}$ mol | $2 \times 10^{-5}$ mol | Comparative compound (2) | $1 \times 10^{-5}$ mol | 118 | 1.03 | 0.32 | Comparative Example |
| S-607 | Emulsion-H | Regular crystal octahedron | $2 \times 10^{-3}$ mol | None | | | 115 | 1.15 | 0.30 | Comparative Example |
| S-608 | Emulsion-H | Regular crystal octahedron | $2 \times 10^{-3}$ mol | None | I-9 | $1 \times 10^{-5}$ mol | 113 | 1.13 | 0.16 | Present Invention |
| S-609 | Emulsion-G | Regular crystal octahedron | None | None | | | 105 | 1.10 | 0.23 | Comparative Example |
| S-610 | Emulsion-G | Regular crystal octahedron | None | None | I-9 | $1 \times 10^{-5}$ mol | 100 | 1.13 | 0.16 | Present Invention |
| S-611 | Emulsion-F | Potato-like irregular | None | None | | | 100 | 0.85 | 0.13 | Comparative Example |
| S-612 | Emulsion-F | Potato-like irregular | None | None | I-9 | $1 \times 10^{-5}$ mol | 92 | 0.83 | 0.12 | Comparative Example |

EXAMPLE 7

The emulsions I and F of Example 6 were added to the layers 9 and 12 of a multilayered coating sample having the following compositions of light-sensitive layers. The emulsion I, the emulsion F, the emulsion I and the compound I-4 of the present invention, and the emulsion I and the compound I-9 of the present invention were added to samples 701, 702, 703, and 704, respectively. When the samples 703 to 704 were subjected to sensitometry following the same procedures as in Example 1, each of the samples 703 and 704 of the present invention had high sensitivity, hard gradation, and practically satisfactory response to pressure, i.e., exhibited preferable characteristics.

Compositions of Light-Sensitive Layers

The coating amount of a silver halide and colloidal silver is represented in units of $g/m^2$ of silver, that of couplers, additives, and gelatin is represented in units of $g/m^2$. The coating amount of a sensitizing dye is represented in units of mols per mol of a silver halide in the same layer.

| | |
|---|---|
| Layer 1: Antihalation layer | |
| Black colloidal silver | 0.2 |
| Gelatin | 1.3 |
| UV-1 | 0.05 |
| UV-2 | 0.05 |
| UV-3 | 0.10 |
| UV-4 | 0.10 |
| Oil-1 | 0.10 |
| Oil-2 | 0.10 |
| Layer 2: Interlayer | |
| Gelatin | 1.0 |
| Layer 3: 1st red-sensitive emulsion layer | |
| Silver iodobromide emulsion (AgI = 7.1 mol %, octahedral multiple structure grain, volume-equivalent sphere diameter = 0.4 μm, variation coefficient of equivalent-sphere diameter = 15%) coating silver amount | 1.0 |
| Gelatin | 2.0 |
| S-1 | $2.8 \times 10^{-4}$ |
| S-2 | $2.0 \times 10^{-4}$ |
| S-3 | $1.0 \times 10^{-5}$ |
| Cp-1 | 0.40 |
| Cp-2 | 0.040 |
| Cp-3 | 0.020 |
| Cp-4 | 0.0020 |
| Oil-1 | 0.15 |
| Oil-2 | 0.15 |
| Layer 4: 2nd red-sensitive emulsion layer | |
| Silver iodobromide emulsion (AgI = 7.7 mol %, octahedral multiple structure grain, volume-equivalent sphere diameter = 0.8 μm, variation coefficient of equivalent-sphere diameter = 10%) coating silver amount | 1.20 |
| Gelatin | 0.8 |
| S-1 | $2.0 \times 10^{-4}$ |
| S-2 | $1.5 \times 10^{-4}$ |
| S-3 | $8.0 \times 10^{-6}$ |
| Cp-1 | 0.30 |
| Cp-2 | 0.03 |
| Cp-3 | 0.03 |
| Cp-4 | 0.002 |
| Oil-1 | 0.12 |
| Oil-2 | 0.12 |
| Layer 5: 3rd red-sensitive emulsion layer | |
| Silver iodobromide emulsion (AgI = 8 mol %, octahedral multiple structure grain, volume-equivalent sphere diameter = 1.1 μm, variation coefficient of equivalent-sphere diameter = 13%) coating silver amount | 1.0 |
| Gelatin | 1.50 |
| S-1 | $1.5 \times 10^{-4}$ |
| S-2 | $1.5 \times 10^{-4}$ |
| S-3 | $8.0 \times 10^{-6}$ |
| Cp-1 | 0.10 |

-continued

| | |
|---|---|
| Cp-2 | 0.10 |
| Oil-1 | 0.05 |
| Oil-2 | 0.05 |
| Layer 6: Interlayer | |
| Gelatin | 0.70 |
| Cpd-11 | 0.03 |
| Oil-1 | 0.05 |
| Layer 7: 1st green-sensitive emulsion layer | |
| Silver iodobromide emulsion (AgI = 7 mol %, octahedral multiple structure grain, volume-equivalent sphere diameter = 0.4 μm, variation coefficient of equivalent-sphere diameter = 15%) coating silver amount | 1.10 |
| Gelatin | 2.50 |
| S-4 | $2.4 \times 10^{-4}$ |
| S-5 | $2.4 \times 10^{-4}$ |
| S-6 | $1.2 \times 10^{-4}$ |
| S-7 | $5.0 \times 10^{-5}$ |
| Cp-5 | 0.15 |
| Cp-6 | 0.10 |
| Cp-7 | 0.03 |
| Cp-8 | 0.02 |
| Oil-1 | 0.30 |
| Oil-2 | 0.30 |
| Layer 8: 2nd green-sensitive emulsion layer | |
| Silver iodobromide emulsion (AgI = 7.3 mol %, octahedral multiple structure grain, volume-equivalent sphere diameter = 0.7 μm, variation coefficient of equivalent-sphere diameter = 9%) coating silver amount | 1.10 |
| Gelatin | 0.80 |
| S-4 | $2.0 \times 10^{-4}$ |
| S-5 | $1.9 \times 10^{-4}$ |
| S-6 | $1.1 \times 10^{-4}$ |
| S-7 | $4.0 \times 10^{-5}$ |
| Cp-5 | 0.10 |
| Cp-6 | 0.070 |
| Cp-7 | 0.030 |
| Cp-8 | 0.025 |
| Oil-1 | 0.20 |
| Oil-2 | 0.20 |
| Layer 9: 3rd green-sensitive emulsion layer | |
| Silver iodobromide emulsion Emulsion I or F coating silver amount | 1.20 |
| Gelatin | 1.80 |
| S-4 | $1.3 \times 10^{-4}$ |
| S-5 | $1.3 \times 10^{-4}$ |
| S-6 | $9.0 \times 10^{-5}$ |
| S-7 | $3.0 \times 10^{-5}$ |
| Cp-6 | 0.20 |
| Cp-7 | 0.03 |
| Oil-1 | 0.20 |
| Oil-2 | 0.05 |
| Layer 10: Yellow filter layer | |
| Gelatin | 1.2 |
| Yellow colloid | 0.08 |

-continued

| | |
|---|---|
| Cpd-12 | 0.1 |
| Oil-1 | 0.3 |
| Layer 11: 1st blue-sensitive emulsion layer | |
| Silver iodobromide emulsion (AgI = 6.5 mol %, octahedral multiple structure grain, volume-equivalent sphere diameter = 0.4 μm, variation coefficient of equivalent-sphere diameter = 9%) coating silver amount | 0.20 |
| Silver iodobromide emulsion (AgI = 7 mol %, octahedral multiple structure grain, volume-equivalent sphere diameter = 0.8 μm, variation coefficient of equivalent-sphere diameter = 9%) coating silver amount | 0.45 |
| Gelatin | 1.75 |
| S-7 | $1.0 \times 10^{-4}$ |
| S-8 | $2.0 \times 10^{-4}$ |
| Cp-9 | 0.45 |
| Cp-10 | 0.50 |
| Oil-1 | 0.20 |
| Oil-2 | 0.10 |
| Layer 12: 2nd blue-sensitive emulsion layer | |
| Silver iodobromide emulsion Emulsion I or F coating silver amount | 1.10 |
| Gelatin | 1.20 |
| S-7 | $1.0 \times 10^{-4}$ |
| S-8 | $1.0 \times 10^{-4}$ |
| Cp-9 | 0.25 |
| Oil-1 | 0.060 |
| Oil-2 | 0.030 |
| Layer 13: 1st protective layer | |
| Fine grain silver iodobromide (average grain size = 0.08 μm, AgI = 2 mol %) | 0.40 |
| Gelatin | 1.30 |
| UV-1 | 0.05 |
| UV-2 | 0.05 |
| UV-3 | 0.10 |
| UV-4 | 0.10 |
| UV-5 | 0.03 |
| Oil-1 | 0.1 |
| Oil-2 | 0.1 |
| Layer 14: 2nd protective layer | |
| Gelatin | 0.50 |
| Surfactant (W-11) | |
| Polymethylmethacrylate grains | 0.2 |
| Slip agent (B-11) | 0.03 |
| H-1 | 0.4 |

In addition to the above components, a coating aid W-12, a dispersion aid W-13, film hardeners H-11 and H-12, formalin scavengers Cpd-13 and Cpd-14, compounds Cpd-15 and Cpd-16 as antiseptic agents, a stabilizer Cpd-17, and antifoggants Cpd-18 and Cpd-19 were added. The names or formulas of the compounds used will be listed in Table C to be presented later.

TABLE A

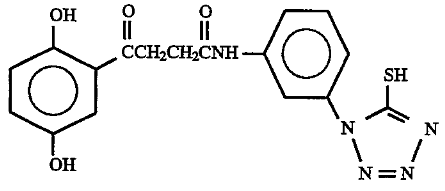

I-1

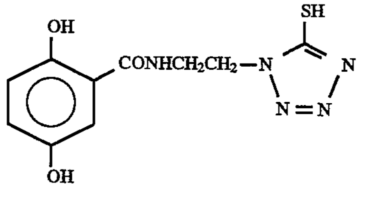

I-2

TABLE A-continued
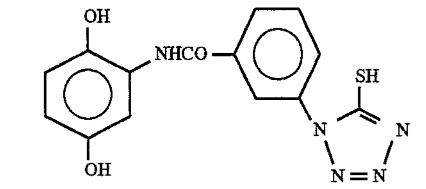
I-3
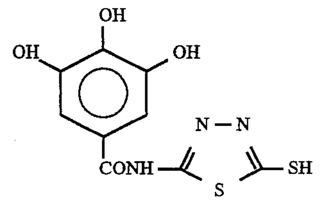
I-4
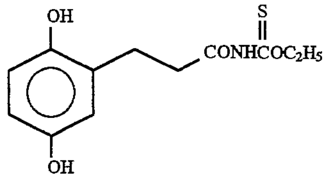
I-5
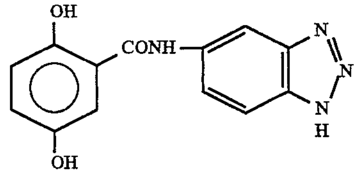
I-6
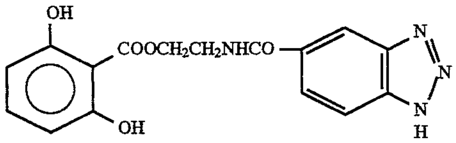
I-7
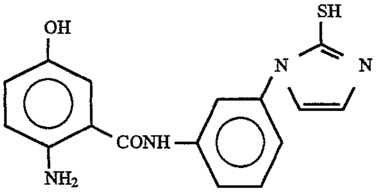
I-8
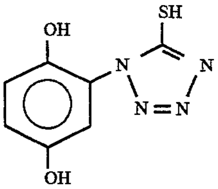
I-9
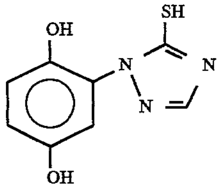
I-10
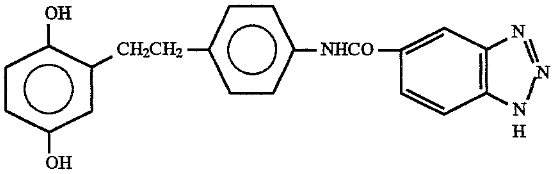
I-11
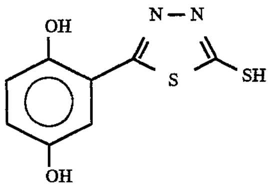
I-12
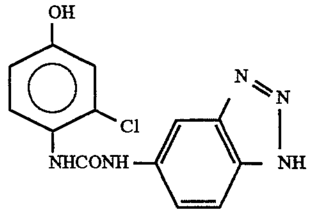
I-13
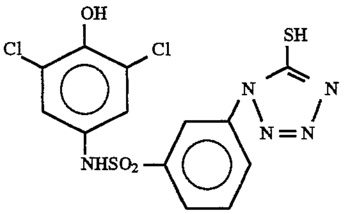
I-14
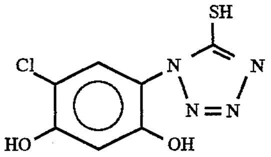
I-15
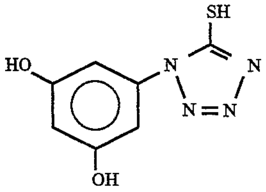
I-16
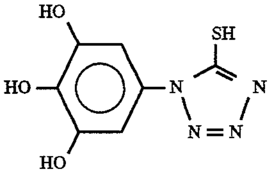
I-17

TABLE A-continued
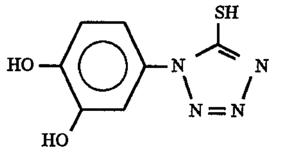
I-18
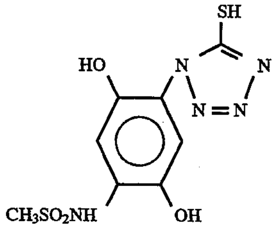
I-19
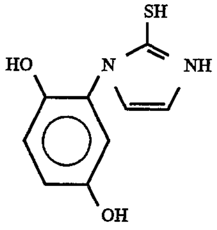
I-20
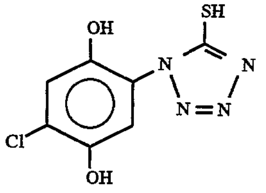
I-21
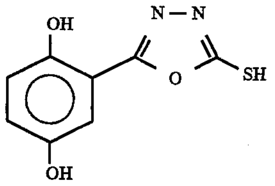
I-22
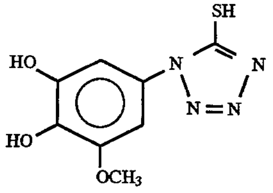
I-23
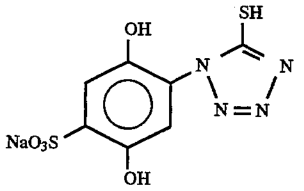
I-24
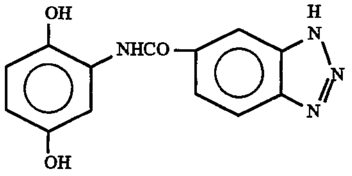
I-25
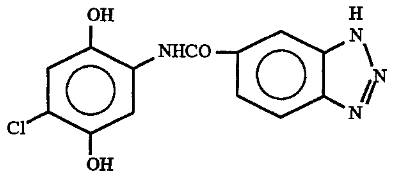
I-26
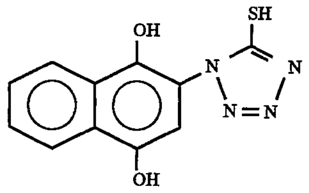
I-27
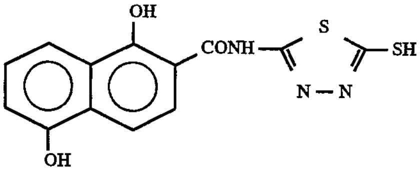
I-28
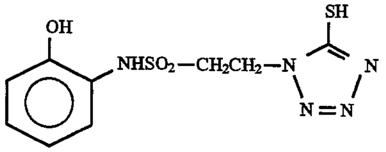
I-29
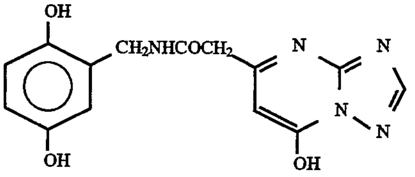
I-30
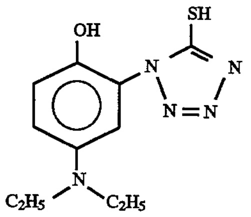
I-31

TABLE A-continued
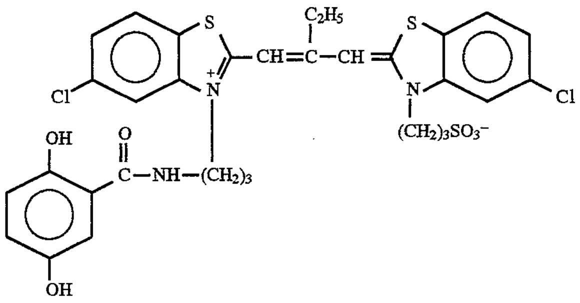
I-32
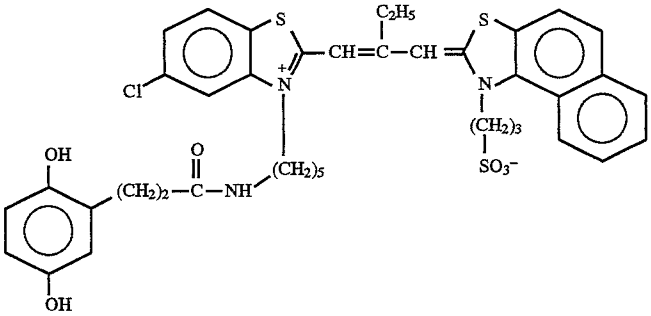
I-33
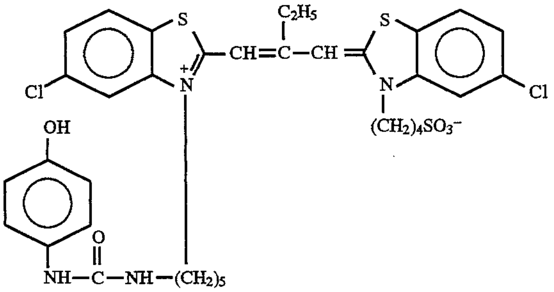
I-34
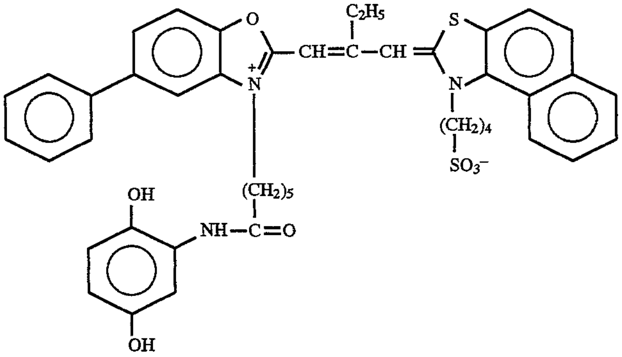
I-35
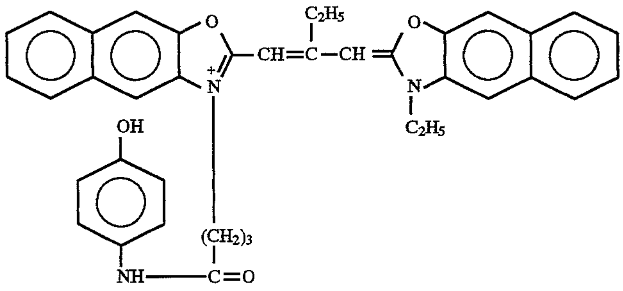
I-36

TABLE A-continued
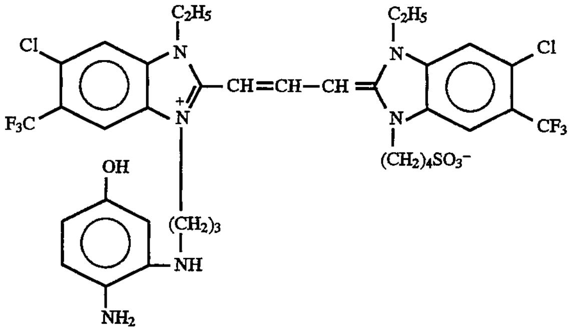
I-37
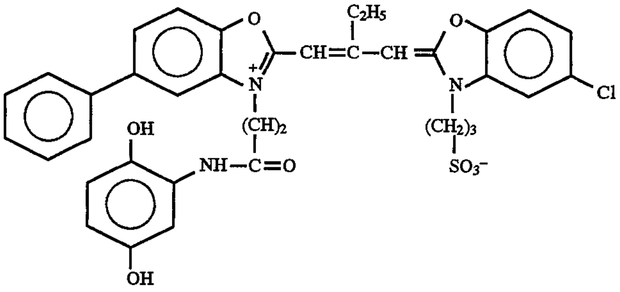
I-38
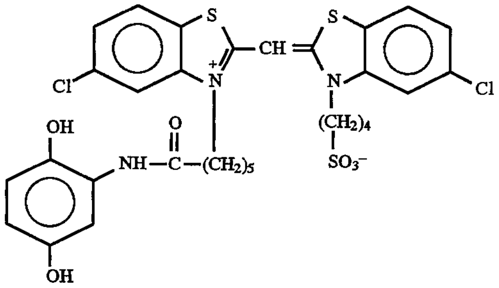
I-39
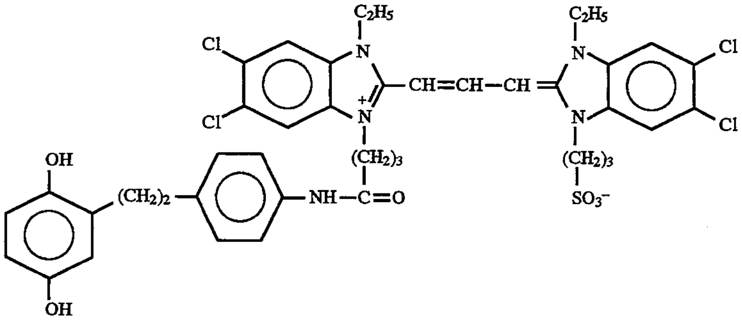
I-40
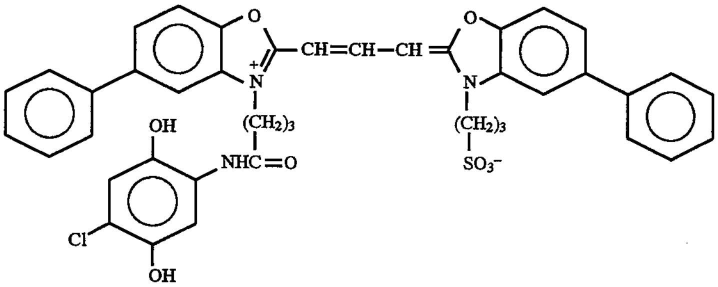
I-41

TABLE A-continued
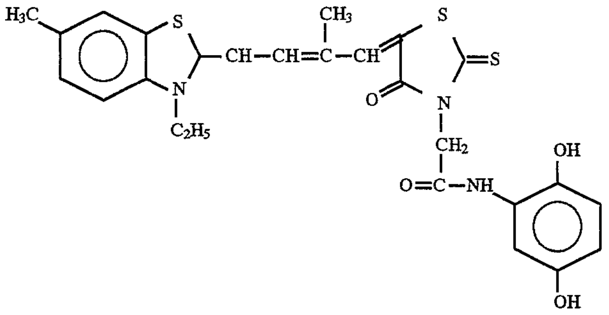
I-42
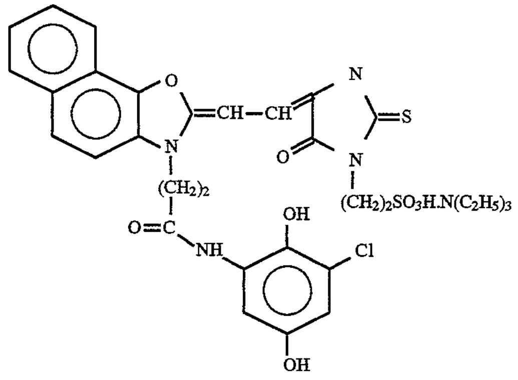
I-43
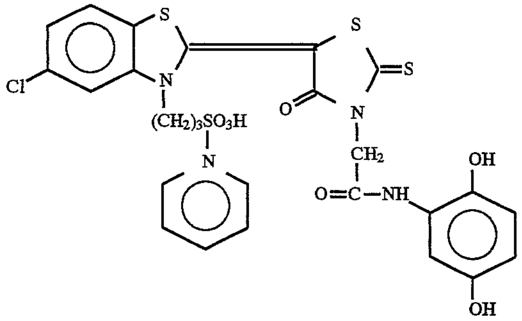
I-44
TABLE B
EX-1
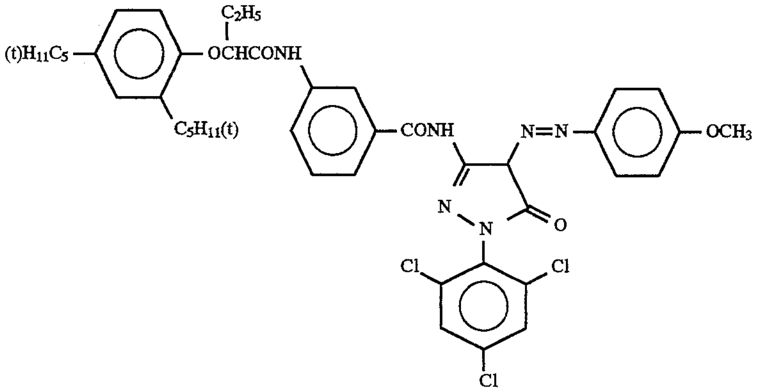

TABLE B-continued
EX-2
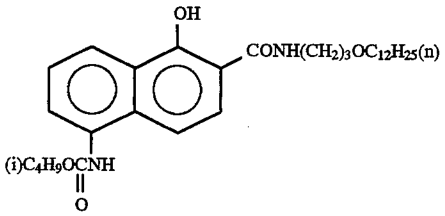
EX-3
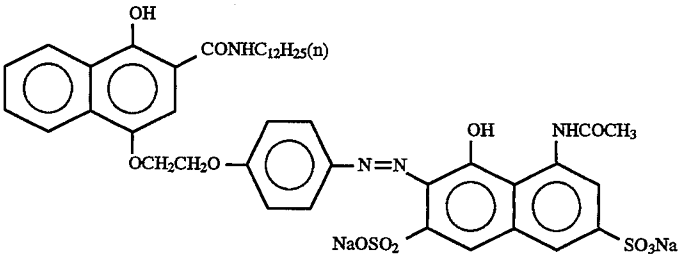
EX-4
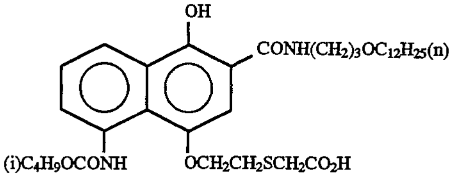
EX-5
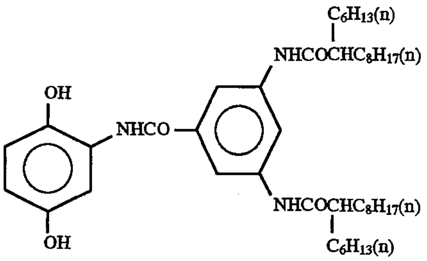
EX-6
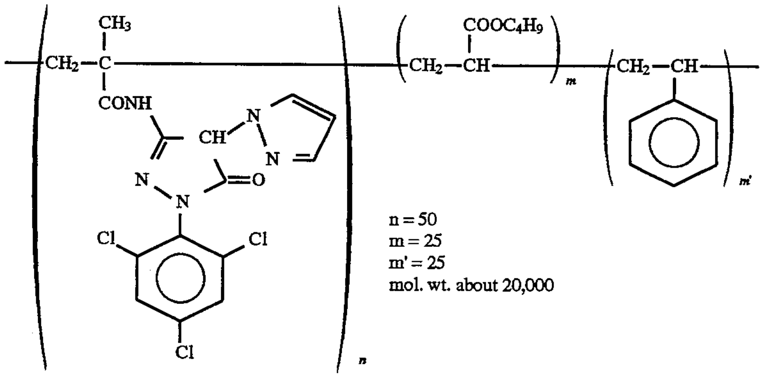
n = 50
m = 25
m' = 25
mol. wt. about 20,000
EX-7
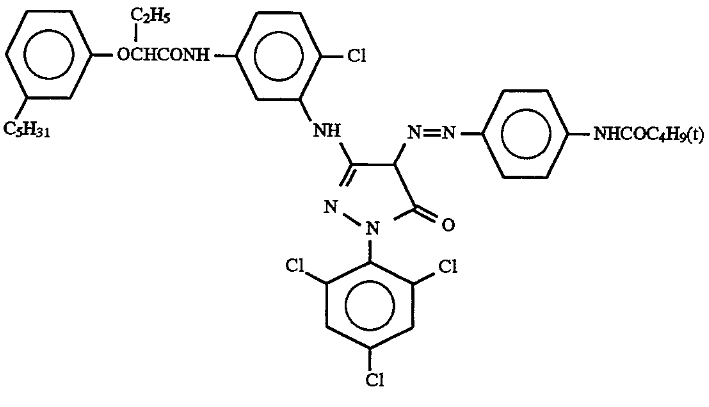

TABLE B-continued
EX-8
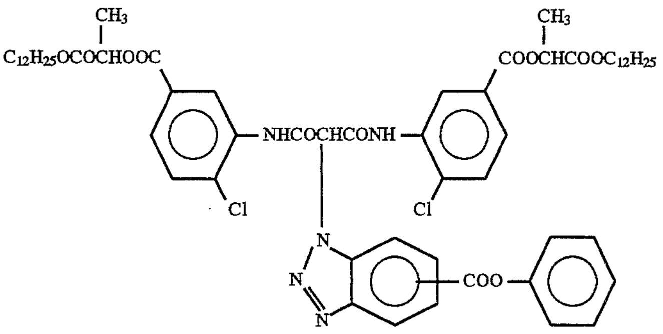
EX-9
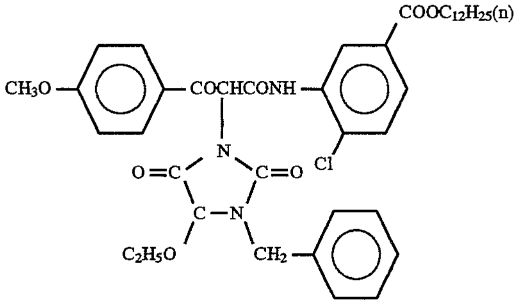
EX-10
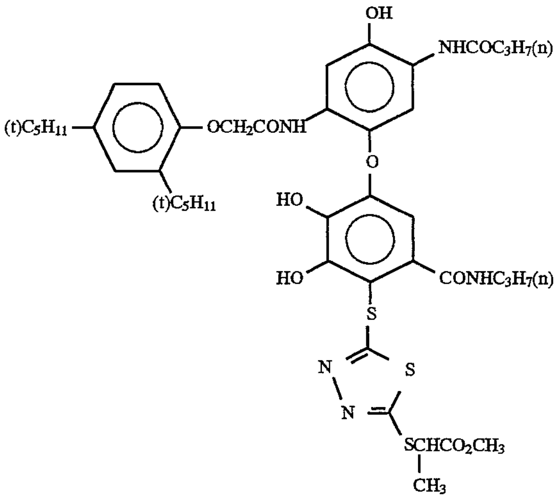
EX-11
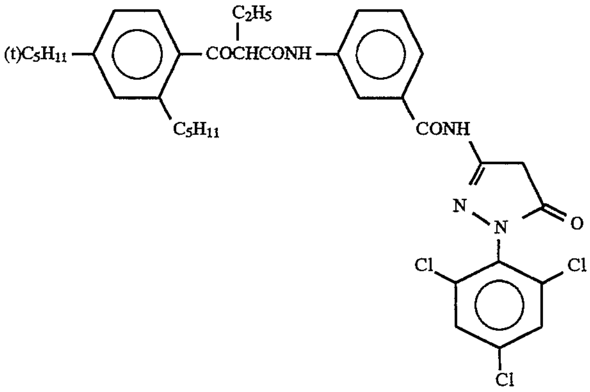

TABLE B-continued
EX-12
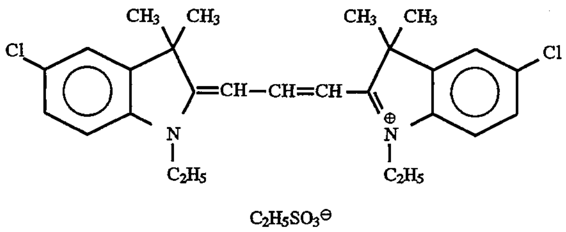
EX-13
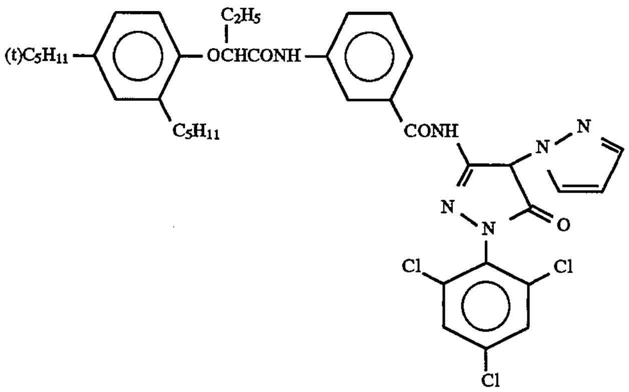
U-1
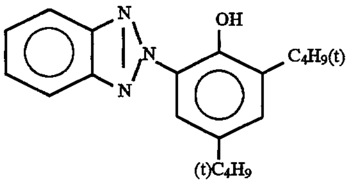
U-2
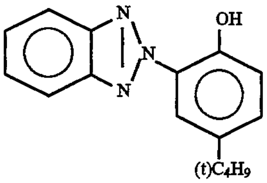
U-3
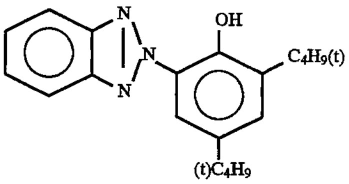
U-4
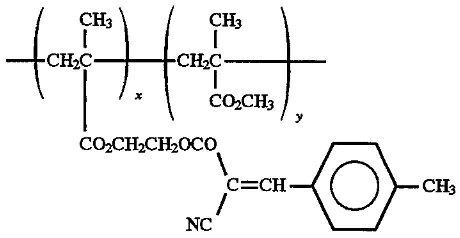
x:y = 70:30 (wt%)
UV-5
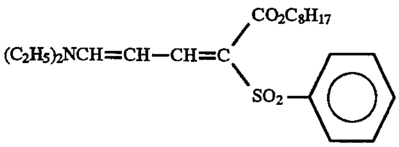
HBS-1
tricresyl phosphate
HBS-2
di-n-butyl phtalate
HBS-3
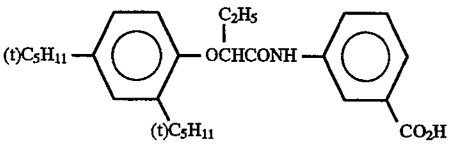

TABLE B-continued
Sensitizing dye I
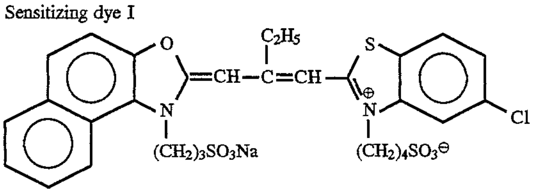
Sensitizing dye II
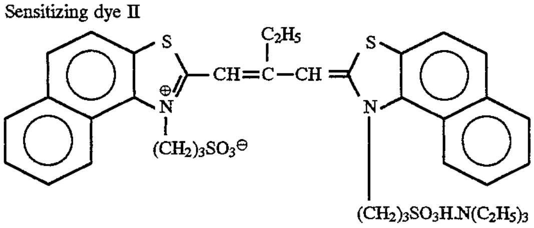
Sensitizing dye III
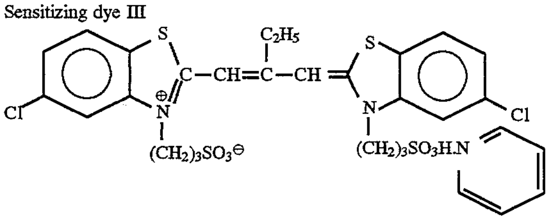
Sensitizing dye IV
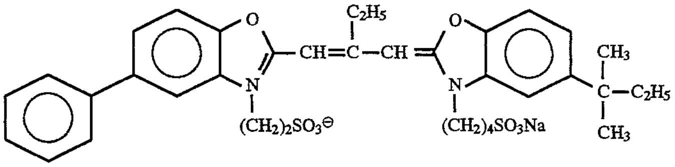
Sensitizing dye V
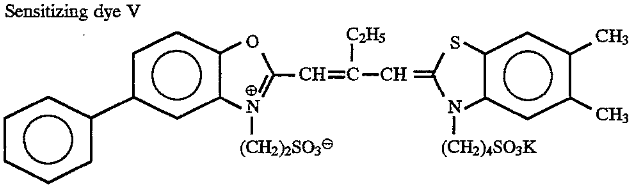
Sensitizing dye VI
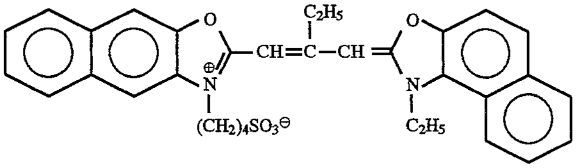
Sensitizing dye VII
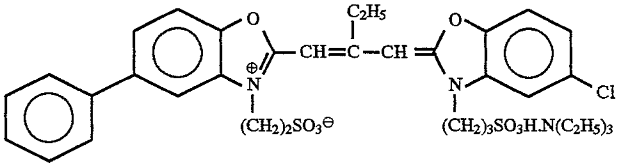
Sensitizing dye VIII
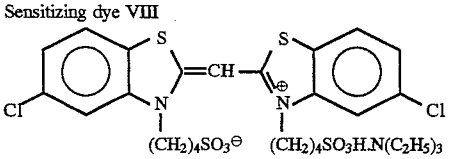
S-1
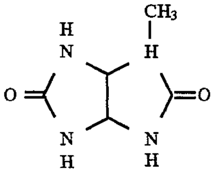

TABLE B-continued
H-1
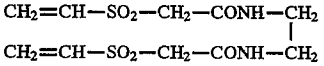
EX-14
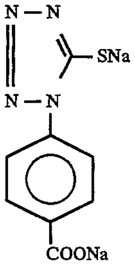
EX-15
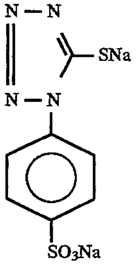
EX-16
Copolymer of polyvinylpyrrolidone and polyvinylalcohol
EX-17
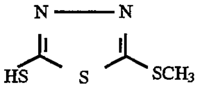
EX-18
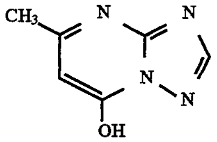
EX-19
1, 2-benzisothiazoline-3-one
EX-20
n-buthyl p-hydroxybenzoate
EX-21
2-phenoxyethanol
EX-22
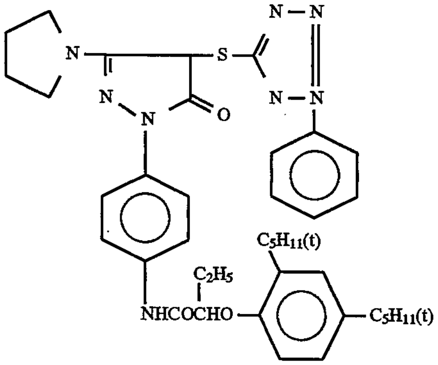
TABLE C
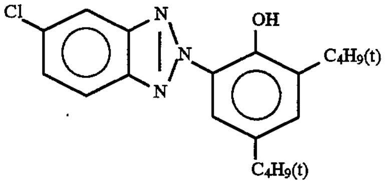
UV-1
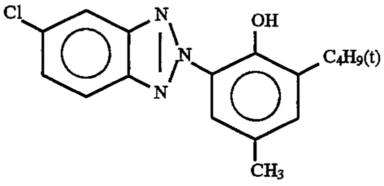
UV-2

TABLE C-continued
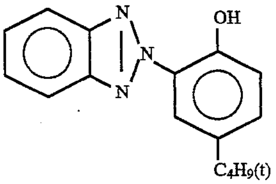
U-3
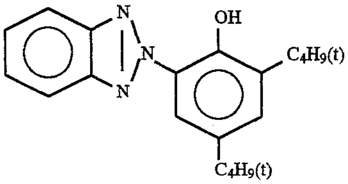
UV-4
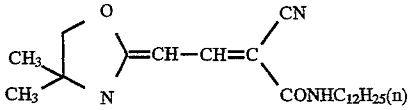
UV-5
tricresyl phosphate Oil-1
dibutyl phtalate Oil-2
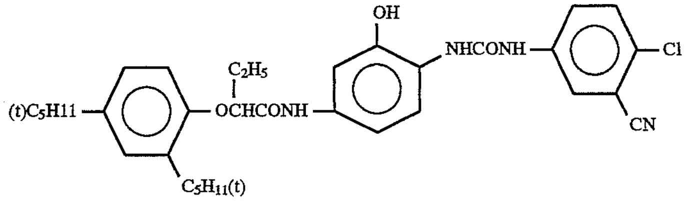
Cp-1
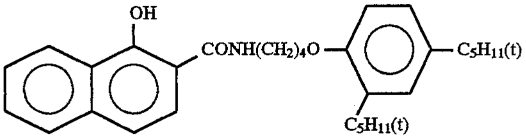
Cp-2
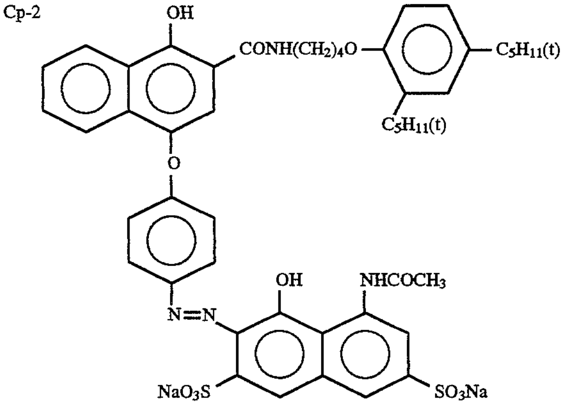
Cp-3
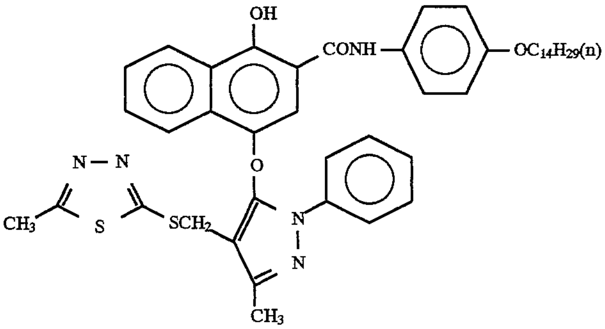
Cp-4

TABLE C-continued
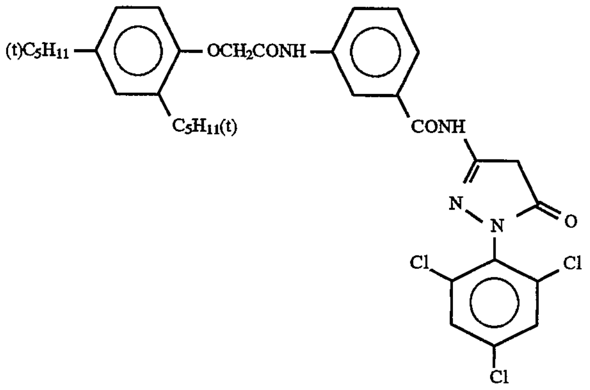
Cp-5
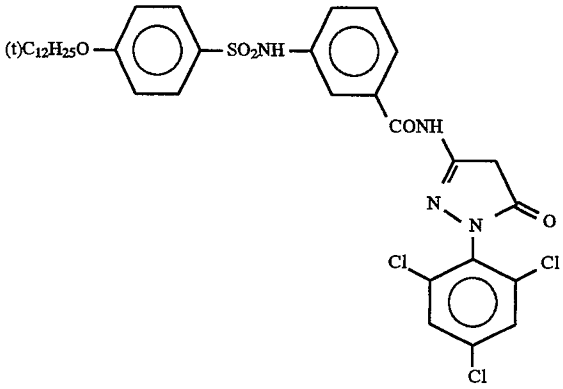
Cp-6
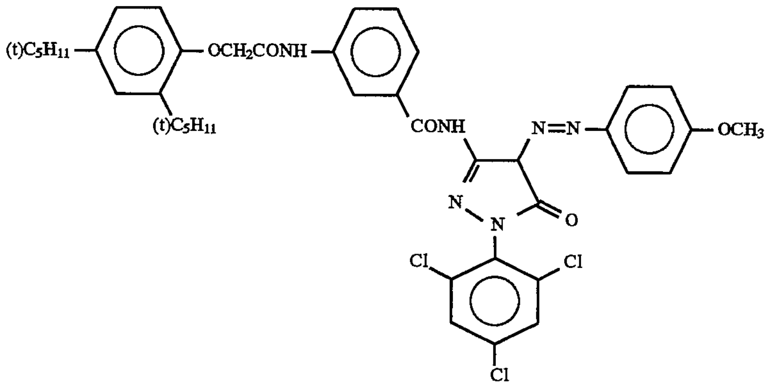
Cp-7
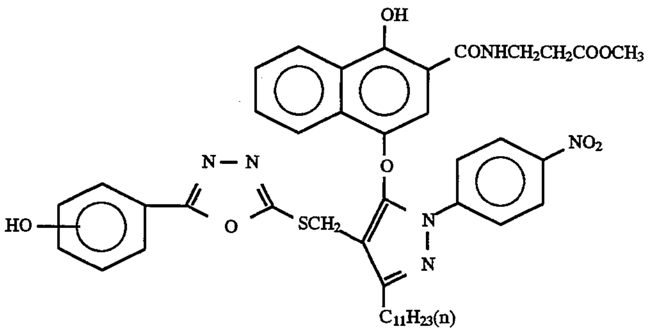
Cp-8

TABLE C-continued
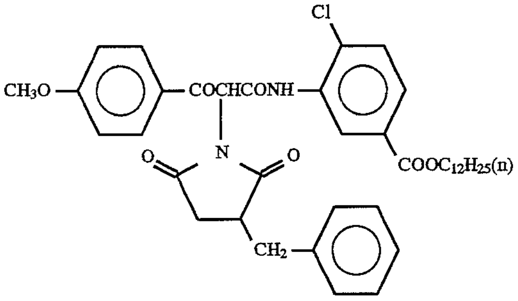
Cp-9
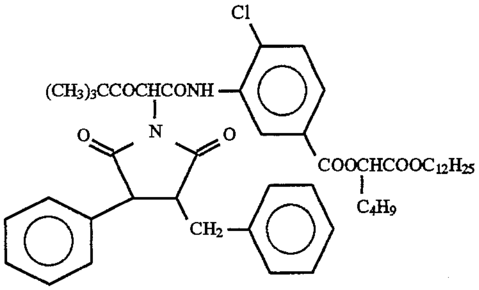
Cp-10
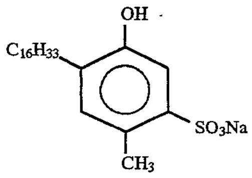
Cpd-11
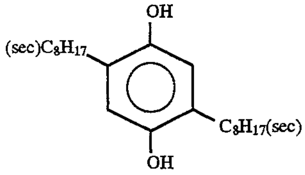
Cpd-12
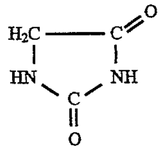
Cpd-13
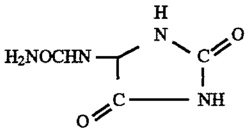
Cpd-14
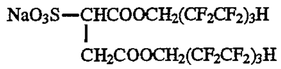
W-11
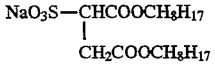
W-12
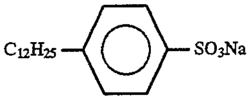
W-13
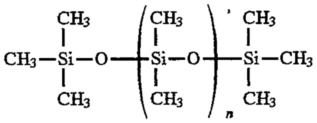
B-11
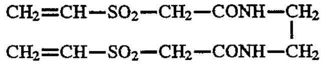
H-1
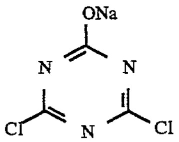
H-11
$\{(CH_2=CHSO_2CH_2)_2CCH_2SO_2(CH_2)_2\}_2N(CH_2)_2SO_3K$
H-12
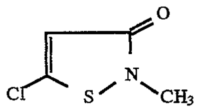
Cpd-15
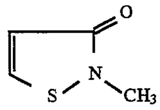
Cpd-16
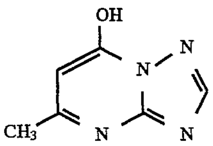
Cpd-17
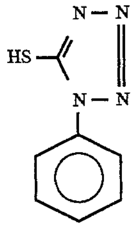
Cpd-18

TABLE C-continued

| | | | |
|---|---|---|---|
| 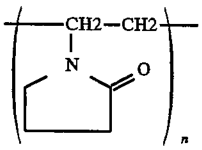 | Cpd-19 | 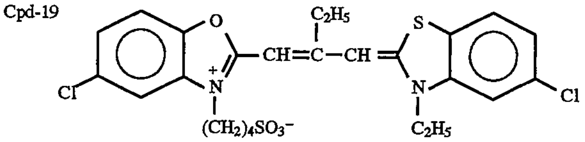 | S-1 |
| 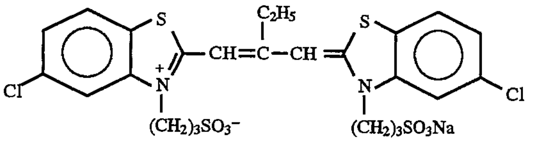 | S-2 | 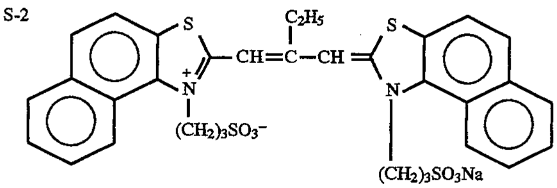 | S-3 |
| | | 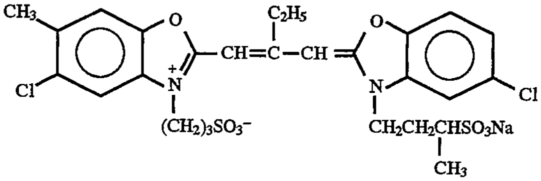 | S-4 |
| | | 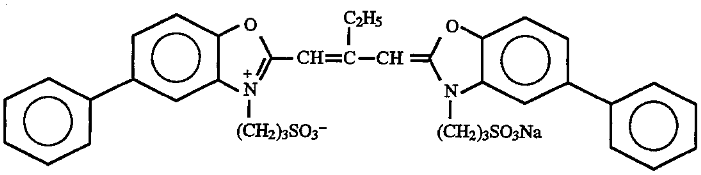 | S-5 |
| | | 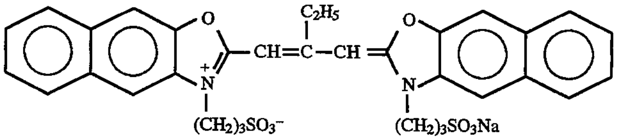 | S-6 |
| | | 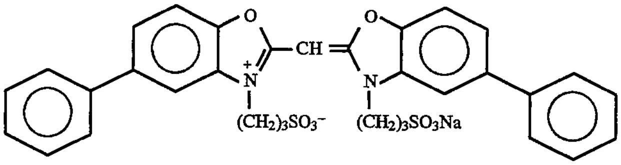 | S-7 |
| | | 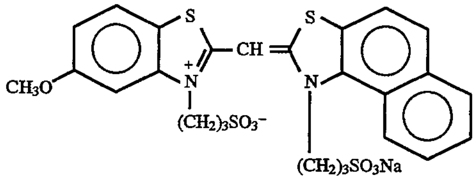 | S-8 |

What is claimed is:

1. A silver halide color photographic light-sensitive material having at least one light-sensitive silver halide emulsion layer on a support, wherein said material contains a coupler dispersed in an oil, and said light-sensitive silver halide emulsion layer contains a tabular silver halide emulsion comprised of tabular silver halide grains having an average aspect ratio of 2 or more in which said tabular silver halide emulsion has been subjected to spectral sensitization using 40% or more of the saturated adsorption quantity of a sensitizing dye and wherein said light-sensitive emulsion layer contains a compound represented by the following formula (II) and/or the oxidized product thereof which is added directly to said silver halide emulsion:

(II)

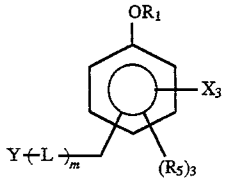

wherein $X_3$ represents $OR_1$ or

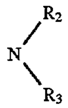

wherein $R_1$ represents a hydrogen atom or a group capable of being converted to a hydrogen atom upon hydrolysis, and $R_2$ and $R_3$ each represent hydrogen, alkyl, aryl, heterocyclic, heterocyclic sulfonyl, heterocyclic carbonyl, sulfamoyl, or carbamoyl, Y represents a group which accelerates adsorption to a silver halide grain and is a thioamido group, a mercapto group, a group having a disulfide bond, or a 5 or 6-membered nitrogen-containing heterocyclic group that may be part of a sensitizing dye, L represents a divalent coupling group selected from the group consisting of

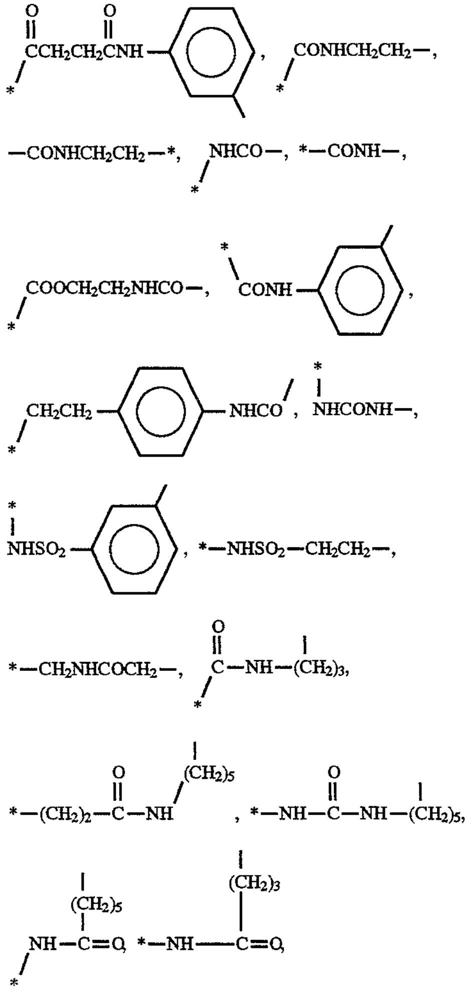

-continued

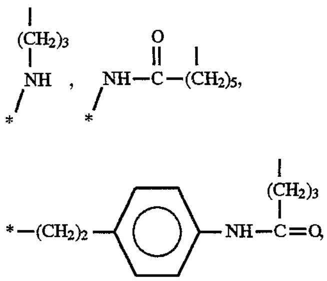

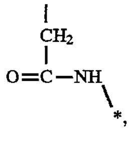

and

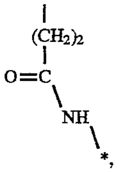

where * represents the location where the L group is attached to the benzene ring, m represents 0 or 1, and $R_5$ represents a hydrogen atom, a halogen atom, an alkyl group, an aryl group, an alkoxy group, an aryloxy group, an alkylthio group, an arythio group, an acyl group, an acylamino group, a nitro group, a cyano group, an oxycarbonyl group, a carboxy group, a sulfo group, a hydroxy group, a ureido group, a sulfonamido group, a sulfamoyl group, a carbamoyl group, an acyloxy group, an amino group, a carbonate group, a sulfonyl group, a sulfinyl group or a heterocyclic group, and each $R_5$ may be the same or different.

2. The silver halide color photographic material according to claim 1, wherein m is 1.

3. A silver halide color photographic light-sensitive material having at least one light-sensitive silver halide emulsion layer on a support, wherein said material contains a coupler dispersed in an oil, and at least one light-sensitive emulsion layer contains a silver halide emulsion comprised of silver halide grains having a grain surface containing 2 mol % or more of silver iodide and a compound represented by the following formula (II) and/or the oxidized product thereof which is added directly to said silver halide emulsion:

(II)

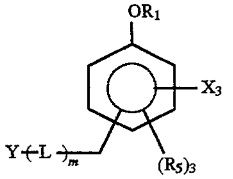

wherein $X_3$ represents $OR_1$ or

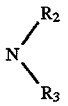

wherein $R_1$ represents a hydrogen atom or a group capable of being converted to a hydrogen atom upon hydrolysis, and $R_2$ and $R_3$ each represent hydrogen, alkyl, aryl, heterocyclic, heterocyclic sulfonyl, heterocyclic carbonyl, sulfamoyl, or carbamoyl, Y represents a group which accelerates adsorption to a silver halide grain and is a thioamido group, a mercapto group, a group having a disulfide bond, or a 5 or 6-membered nitrogen-containing heterocyclic group that may be part of a sensitizing dye, L represents a divalent coupling group selected from the group consisting of

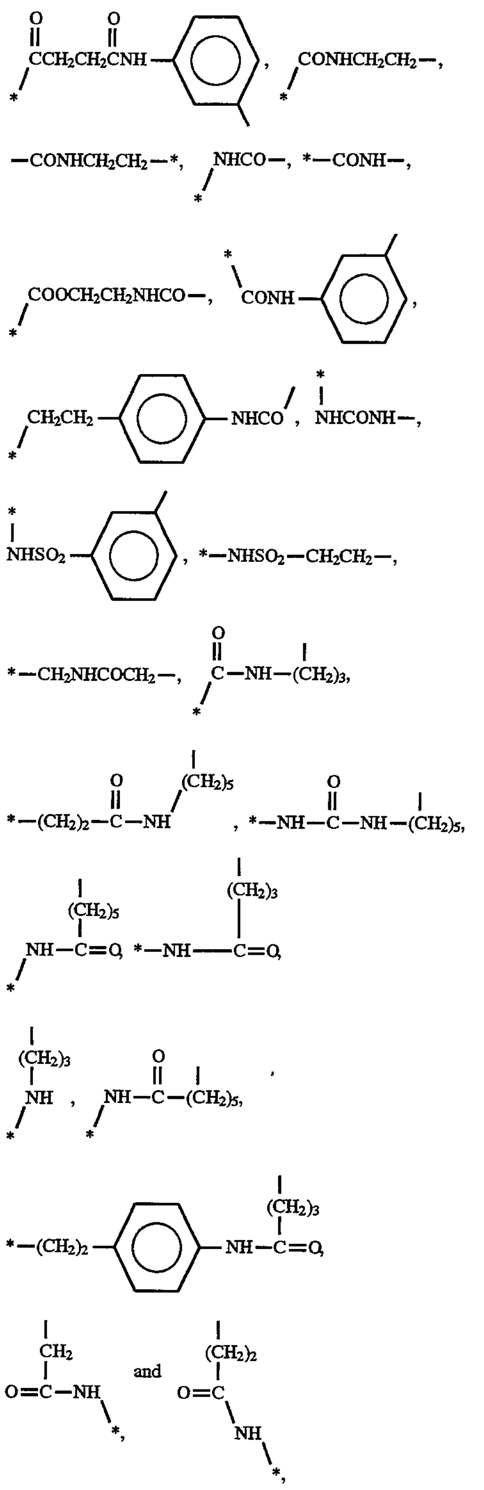

where * represents the location where the L group is attached to the benzene ring, m represents 0 or 1, and $R_5$ represents a hydrogen atom, a halogen atom, an alkyl group, an aryl group, an alkoxy group, an aryloxy group, an alkylthio group, an arythio group, an acyl group, an acylamino group, a nitro group, a cyano group, an oxycarbonyl group, a carboxy group, a sulfo group, a hydroxy group, a ureido group, a sulfonamido group, a sulfamoyl group, a carbamoyl group, an acyloxy group, an amino group, a carbonate group, a sulfonyl group, a sulfinyl group or a heterocyclic group, and each $R_5$ may be the same or different, and wherein said silver halide grains have been subjected to reduction sensitization.

4. The silver halide photographic light-sensitive material according to claim 3, wherein said light-sensitive material contains $3\times10^{-5}$ mol or more of a thiocyanic acid compound per mol of silver halide.

5. The silver halide color photographic material according to claim 3, wherein m is 1.

6. A silver halide color photographic light-sensitive material having at least one light-sensitive silver halide emulsion layer on a support, wherein said material contains a coupler dispersed in an oil, and at least one light-sensitive emulsion layer contains a silver halide emulsion comprised of silver halide grains having a grain surface containing 2 mol % or more of silver iodide and a compound represented by the following formula (II) and/or the oxidized product thereof which is added directly to said silver halide emulsion:

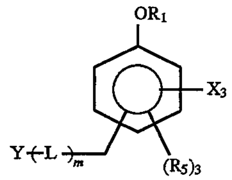

(II)

wherein $X_3$ represents $OR_1$ or

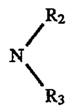

wherein $R_1$ represents a hydrogen atom or a group capable of being converted to a hydrogen atom upon hydrolysis, and $R_2$ and $R_3$ each represent hydrogen, alkyl, aryl, heterocyclic, heterocyclic sulfonyl, heterocyclic carbonyl, sulfamoyl, or carbamoyl, Y represents a group which accelerates adsorption to a silver halide grain and is a thioamido group, a mercapto group, a group having a disulfide bond, or a 5 or 6-membered nitrogen-containing heterocyclic group that may be part of a sensitizing dye, L represents a divalent coupling group selected from the group consisting of

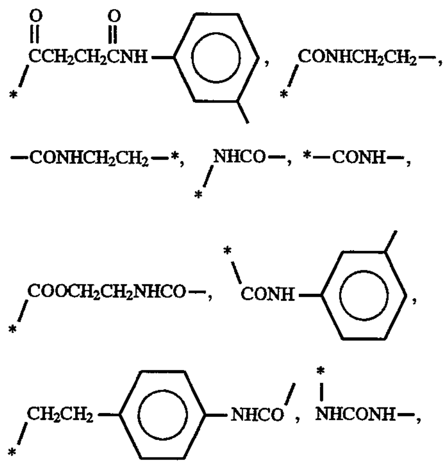

-continued

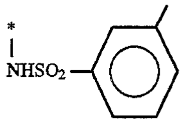, *—NHSO$_2$—CH$_2$CH$_2$—,

*—CH$_2$NHCOCH$_2$—, 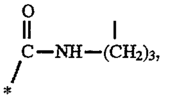

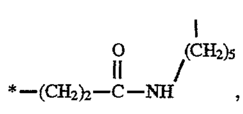, 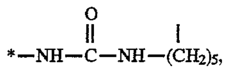

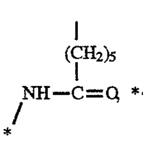, 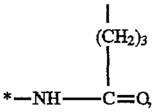

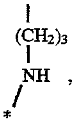, 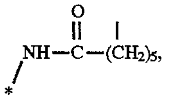

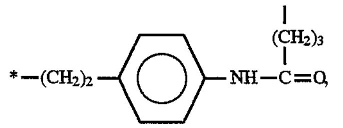

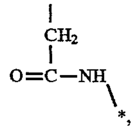 and 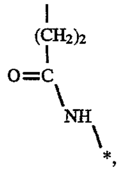

where * represents the location where the L groups is attached to the benzene ring, m represents 0 or 1, and $R_5$ represents a hydrogen atom, a halogen atom, an alkyl group, an aryl group, an alkoxy group, an aryloxy group, an alkylthio group, an arythio group, an acyl group, an acylamino group, a nitro group, a cyano group, an oxycarbonyl group, a carboxy group, a sulfo group, a hydroxy group, a ureido group, a sulfonamido group, a sulfamoyl group, a carbamoyl group, an acyloxy group, an amino group, a carbonate group, a sulfonyl group, a sulfinyl group or a heterocyclic group, and each $R_5$ may be the same or different, and wherein the silver halide emulsion contains $3\times10^{-5}$ mol or more of a thiocyanic acid compound per mol of silver halide.

7. The silver halide color photographic material according to claim 6, wherein m is 1.

8. A method for forming a silver halide color photographic light-sensitive material having at least one light-sensitive silver halide emulsion layer on a support, comprising providing the material with a coupler dispersed in an oil and forming at least one light-sensitive silver halide emulsion layer with a tabular silver halide emulsion comprised of tabular silver halide grains having an average aspect ratio of 2 or more in which said tabular silver halide emulsion has been subjected to spectral sensitization using 40% or more of the saturated adsorption quantity of a sensitizing dye, and adding directly to said light-sensitive emulsion layer a compound represented by the following formula (II) and/or the oxidized product thereof

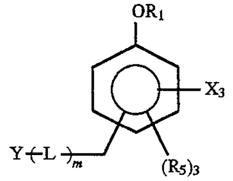 (II)

wherein $X_3$ represents $OR_1$ or

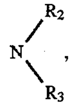, wherein $R_1$ represents a hydrogen atom or a group capable of being converted to a hydrogen atom upon hydrolysis, and $R_2$ and $R_3$ each represent hydrogen, alkyl, aryl, heterocyclic, heterocyclic sulfonyl, heterocyclic carbonyl, sulfamoyl, or carbamoyl, Y represents a group which accelerates adsorption to a silver halide grain and is a thioamido group, a mercapto group, a group having a disulfide bond, or a 5 or 6-membered nitrogen-containing heterocyclic group that may be part of a sensitizing dye, L represents a divalent coupling group selected from the group consisting of

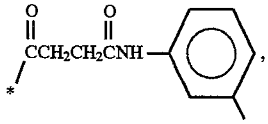, 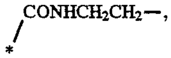

—CONHCH$_2$CH$_2$—*, 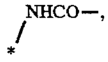, *—CONH—,

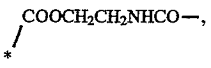, 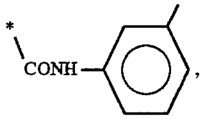,

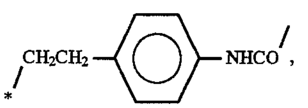, 

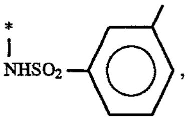, *—NHSO$_2$—CH$_2$CH$_2$—,

*—CH$_2$NHCOCH$_2$—, 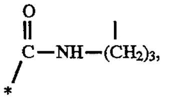

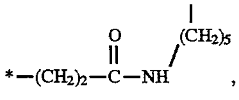, 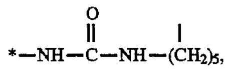

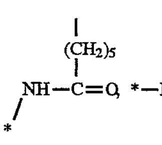 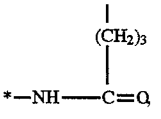

-continued

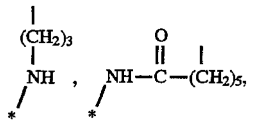

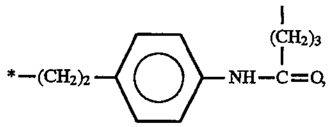

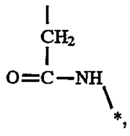

and

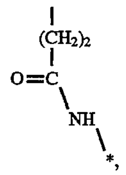

where * represents the location where the L group is attached to the benzene ring, m represents 0 or 1, and $R_5$ represents a hydrogen atom, a halogen atom, an alkyl group, an aryl group, an alkoxy group, an aryloxy group, an alkylthio group, an arythio group, an acyl group, an acylamino group, a nitro group, a cyano group, an oxycarbonyl group, a carboxy group, a sulfo group, a hydroxy group, a ureido group, a sulfonamido group, a sulfamoyl group, a carbamoyl group, an acyloxy group, an amino group, a carbonate group, a sulfonyl group, a sulfinyl group or a heterocyclic group, and each $R_5$ may be the same or different.

9. The method according to claim 8, wherein m is 1.

10. A method for forming a silver halide color photographic light-sensitive material having at least one light-sensitive silver halide emulsion layer on a support, comprising providing the material with a coupler dispersed in an oil and forming at least one light-sensitive emulsion layer with a silver halide emulsion comprised of silver halide grains having a grain surface containing 2 mol % or more of silver iodide and adding directly to the silver halide emulsion a compound represented by the following formula (II) and/or the oxidized product thereof:

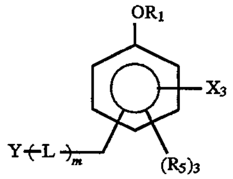

(II)

wherein $X_3$ represents $OR_1$ or

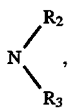

wherein $R_1$ represents a hydrogen atom or a group capable of being converted to a hydrogen atom upon hydrolysis, and $R_2$ and $R_3$ each represent hydrogen, alkyl, aryl, heterocyclic, heterocyclic sulfonyl, heterocyclic carbonyl, sulfamoyl, or carbamoyl, Y represents a group which accelerates adsorption to a silver halide grain and is a thioamido group, a mercapto group, a group having a disulfide bond, or a 5 or 6-membered nitrogen-containing heterocyclic group that may be part of a sensitizing dye, L represents a divalent coupling group selected from the group consisting of

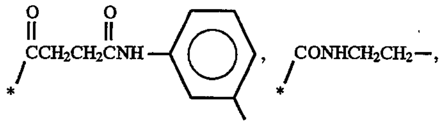

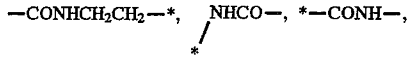

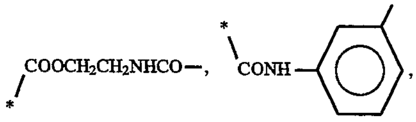

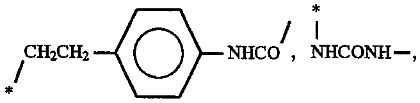

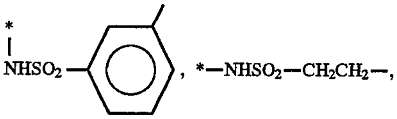

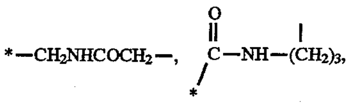

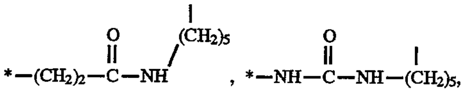

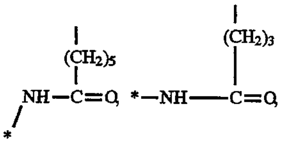

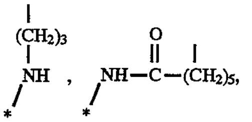

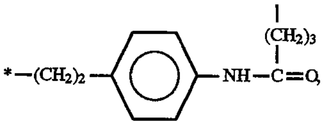

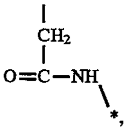

and

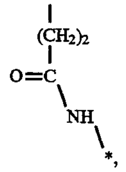

where * represents the location where the L group is attached to the benzene ring, m represents 0 or 1, and $R_5$ represents a hydrogen atom, a halogen atom, an alkyl group, an aryl group, an alkoxy group, an aryloxy group, an alkylthio group, an arythio group, an acyl group, an acylamino group, a nitro group, a cyano group, an oxycarbonyl group, a carboxy group, a sulfo group, a hydroxy group, a ureido group, a sulfonamido group, a sulfamoyl group, a carbamoyl group, an acyloxy group, an amino group, a carbonate group, a sulfonyl group, a sulfinyl group or a heterocyclic group, and wherein said silver halide grains have been subjected to reduction sensitization.

11. A method for forming a silver halide photographic light-sensitive material according to claim 10, wherein said light-sensitive material contains $3\times10^{-5}$ mol or more of a thiocyanic acid compound per mol of silver halide.

12. A method according to claim 10, wherein m is 1.

13. A method for forming a silver halide color photographic light-sensitive material having at least one silver halide emulsion layer on a support, comprising providing the material with a coupler dispersed in an oil and forming at least one light-sensitive emulsion layer with a silver halide emulsion comprised of silver halide grains having a grain surface containing 2 mol % or more of silver iodide and adding directly to the silver halide emulsion a compound represented by the following formula (II) and/or the oxidized product thereof:

(II)

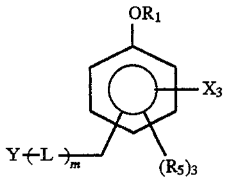

wherein $X_3$ represents $OR_1$ or

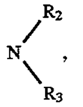

wherein $R_1$ represents a hydrogen atom or a group capable of being converted to a hydrogen atom upon hydrolysis, and $R_2$ and $R_3$ each represent hydrogen, alkyl, aryl, heterocyclic, heterocyclic sulfonyl, heterocyclic carbonyl, sulfamoyl, or carbamoyl, Y represents a group which accelerates adsorption to a silver halide grain and is a thioamido group, a mercapto group, a group having a disulfide bond, or a 5 or 6-membered nitrogen-containing heterocyclic group that may be part of a sensitizing dye, L represents a divalent coupling group selected from the group consisting of

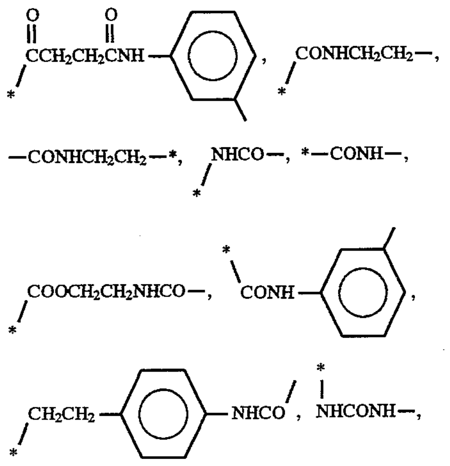

-continued

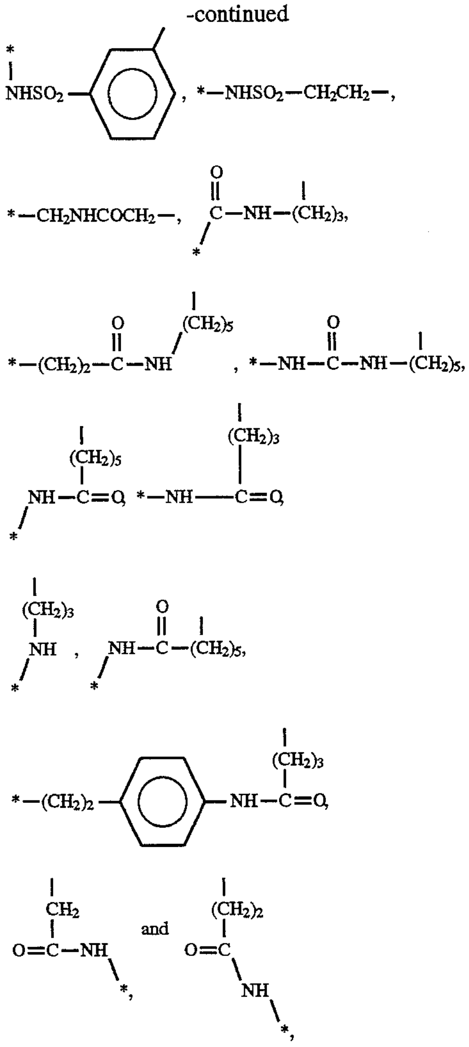

where * represents the location where the L group is attached to the benzene ring, m represents 0 or 1, $R_5$ represents a hydrogen atom, a halogen atom, an alkyl group, an aryl group, an alkoxy group, an aryloxy group, an alkylthio group, an arythio group, an acyl group, an acylamino group, a nitro group, a cyano group, an oxycarbonyl group, a carboxy group, a sulfo group, a hydroxy group, a ureido group, a sulfonamido group, a sulfamoyl group, a carbamoyl group, an acyloxy group, an amino group, a carbonate group, a sulfonyl group, a sulfinyl group or a heterocyclic group, and each of $R_5$ may be the same or different, and wherein the silver halide emulsion contains $3\times10^{-5}$ mol or more of a thiocyanic acid compound per mol of silver halide.

14. A method according to claim 13, wherein m is 1.

* * * * *